US011971530B2

(12) United States Patent
Shiraishi et al.

(10) Patent No.: US 11,971,530 B2
(45) Date of Patent: Apr. 30, 2024

(54) OBSERVATION APPARATUS, METHOD OF OPERATING OBSERVATION APPARATUS, AND OBSERVATION CONTROL PROGRAM

(71) Applicant: FUJIFILM CORPORATION, Tokyo (JP)

(72) Inventors: Yasushi Shiraishi, Kanagawa (JP); Katsuto Sumi, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 261 days.

(21) Appl. No.: 17/645,444

(22) Filed: Dec. 21, 2021

(65) Prior Publication Data

US 2022/0113528 A1 Apr. 14, 2022

Related U.S. Application Data

(60) Division of application No. 16/876,153, filed on May 18, 2020, now abandoned, which is a continuation of
(Continued)

(30) Foreign Application Priority Data

Nov. 22, 2017 (JP) .................................. 2017-225104

(51) Int. Cl.
*G02B 21/24* (2006.01)
(52) U.S. Cl.
CPC .................................. *G02B 21/245* (2013.01)
(58) Field of Classification Search
None
See application file for complete search history.

(56) References Cited

U.S. PATENT DOCUMENTS

2012/0002034 A1 1/2012 Matsunobu et al.
2015/0330776 A1 11/2015 Hayashi et al.
(Continued)

FOREIGN PATENT DOCUMENTS

DE 10321091 B4 * 6/2005 ............. G02B 21/16
DE 102015119255 A1 * 5/2017 ............. G02B 21/14
(Continued)

OTHER PUBLICATIONS

International Search Report issued in International Application No. PCT/JP2018/037249 dated Jan. 8, 2019.
Written Opinion of the ISA issued in International Application No. PCT/JP2018/037249 dated Jan. 8, 2019.
Extended European Search Report dated Nov. 27, 2020, issued in corresponding EP Patent Application No. 18881610.2.
(Continued)

*Primary Examiner* — Derek S. Chapel
(74) *Attorney, Agent, or Firm* — SOLARIS Intellectual Property Group, PLLC

(57) ABSTRACT

An observation apparatus includes an acquisition unit that acquires positional information indicating a position of a bottom surface of a support for supporting an observation target, an imaging optical system that forms an optical image showing the observation target supported by the support on an image plane, a focus adjustment unit that adjusts a focal position of the imaging optical system based on the positional information acquired by the acquisition unit, and a control unit that performs control for matching an inclination of the image plane on which the optical image is formed to an inclination of an imaging surface of an imaging element based on the positional information acquired by the acquisition unit.

5 Claims, 31 Drawing Sheets

Related U.S. Application Data application No. PCT/JP2018/037249, filed on Oct. 4, 2018.

(56) References Cited

U.S. PATENT DOCUMENTS

| | | | |
|---|---|---|---|
| 2018/0129030 A1 | 5/2018 | Schenk et al. | |
| 2019/0114465 A1 | 4/2019 | Shibata et al. | |
| 2022/0216119 A1* | 7/2022 | Takahashi | G03F 9/7026 |

FOREIGN PATENT DOCUMENTS

| | | | | |
|---|---|---|---|---|
| JP | 2012-014078 | A | | 1/2012 |
| JP | 4909732 | B2 | | 4/2012 |
| JP | 2013-34127 | A | | 2/2013 |
| JP | 2013034127 | A | * | 2/2013 |
| JP | 2016-142960 | A | | 8/2016 |
| WO | 2017/009383 | A2 | | 1/2017 |
| WO | 2017/00175783 | A1 | | 10/2017 |

OTHER PUBLICATIONS

English language translation of the following: Office action dated Feb. 2, 2021 from the JPO in a Japanese patent application No. 2019-556122 corresponding to the instant patent application.

English language translation of the following: Office action dated Jun. 8, 2021 from the JPO in a Japanese patent application No. 2019-556122 corresponding to the instant patent application.

Restriction Requirement dated Jun. 8, 2021 from the US Patent Office in a U.S. Appl. No. 16/876,153.

Non-Final Office Action issued by USPTO dated Sep. 29, 2021, in related U.S. Appl. No. 16/876,153.

English language translation of the following: Reconsideration Report by Examiner before Appeal dated Nov. 16, 2021 from the JPO in a Japanese patent application No. 2019-556122 corresponding to the instant patent application.

English language translation of the following: Notice of Termination of Reconsideration by Examiners before Appeal Proceedings dated Nov. 24, 2021 from the JPO in a Japanese patent application No. 2019-556122 corresponding to the instant patent application.

* cited by examiner

MOVEMENT DIRECTION (FORWARD PATH)

MOVEMENT DIRECTION (REARWARD PATH)

MOVEMENT DIRECTION (FORWARD PATH)

MOVEMENT DIRECTION (REARWARD PATH)

MOVEMENT DIRECTION (FORWARD PATH)

OBSERVATION APPARATUS, METHOD OF OPERATING OBSERVATION APPARATUS, AND OBSERVATION CONTROL PROGRAM

CROSS-REFERENCE TO RELATED APPLICATIONS

This application is a divisional application of U.S. application Ser. No. 16/876,153, filed May 18, 2020, which is a continuation application of International Application No. PCT/JP2018/037249, filed Oct. 4, 2018, the disclosures of which are incorporated herein by reference in their entirety. Further, this application claims priority from Japanese Patent Application No. 2017-225104 filed on Nov. 22, 2017, the disclosure of which is incorporated herein by reference in its entirety.

BACKGROUND

1. Technical Field

The technology of the present disclosure relates to an observation apparatus, a method of operating an observation apparatus, and an observation control program.

2. Description of the Related Art

In the related art, a method of imaging a pluripotent stem cell such as an embryonic stem (ES) cell and an induced pluripotent stem (iPS) cell and/or a differentiation-induced cell or the like by a microscope apparatus or the like, and determining a differentiation state or the like of the cell by obtaining a feature of an image of the cell has been suggested.

The pluripotent stem cell such as an ES cell and an iPS cell has an ability to differentiate into cells of various tissues and has drawn attention as a cell that can be applied to regenerative medicine, drug development, disease identification, and the like.

The microscope apparatus used in the case of imaging the cell as described above is, for example, a phase difference microscope. In the phase difference microscope, in a case where the bottom surface of a cultivation container such as a well plate is horizontal across the whole region, illumination light that passes through a phase difference ring matches a physical position of the phase difference ring in an image-forming optical system. However, in a case where the bottom surface of the cultivation container is curved and/or inclined, the illumination light passing through the phase difference ring is shifted from the physical position of the phase difference ring in the image-forming optical system. Accordingly, a shift occurs between the optical axis of observation light transmitted through the cultivation container and the optical axis of an imaging optical system.

In order to resolve the shift of the optical axis, JP4909732B suggests a method of resolving the shift of the optical axis and matching the illumination light passing through the phase difference ring to the physical position of the phase difference ring in the image-forming optical system by inclining the container or inclining the phase difference microscope.

SUMMARY

In order to acquire a high magnification ratio wide-field image in a case where the microscope apparatus images the cell as described above, it is suggested to perform so-called tiling imaging of scanning the range of the cultivation container based on observation regions of the image-forming optical system, acquiring an image of each observation region, and then, combining the image of each observation region.

In the case of acquiring the image of each observation region as described above, a focal position of the image-forming optical system is generally set to the bottom surface in the cultivation container. However, in a case where the bottom surface of the cultivation container is curved and/or inclined, it is necessary to set the focal position for each observation region in the case of performing high magnification ratio imaging.

For example, as illustrated in FIG. 40, in a case where a well plate P including six wells W is used as the cultivation container, the shape of the bottom surface of the well W may not be flat and may be inclined due to manufacturing error or the like as illustrated in a lower diagram of FIG. 40. In a case where the bottom surface of the well W present in the observation region is inclined, as illustrated in FIG. 41, an image A acquired by imaging by setting the focal position to the center of the observation region is a clear image in a center vicinity A2 of the observation region to which the focal position is set, but is a blurred image in an edge part portion A1 to which the focal position is not set in the observation region. In addition, as illustrated in FIG. 42, as the inclination of the bottom surface is increased, a more blurred image is obtained.

In the technology disclosed in JP4909732B, in a case where the bottom surface of the cultivation container is curved and/or inclined, it is possible to resolve the deviation of the optical axis and match the illumination light passing through the phase difference ring to the physical position of the phase difference ring in the image-forming optical system. However, then, in the case of setting the focal position for each observation region, a blurred image in which the focal position is not set to the edge part portion in the observation region is obtained even in a case where imaging is performed by setting the focal position to the center of the observation region.

One embodiment of the present disclosure provides an observation apparatus, a method of operating an observation apparatus, and an observation control program capable of reducing blurriness of an image of an edge part portion in an observation region of an imaging optical system even in a case where a bottom surface of a support for supporting an observation target is inclined.

An observation apparatus according to a first aspect includes an acquisition unit that acquires positional information indicating a position of a bottom surface of a support for supporting an observation target, an imaging optical system that forms an optical image showing the observation target supported by the support on an image plane, a focus adjustment unit that adjusts a focal position of the imaging optical system based on the positional information acquired by the acquisition unit, and a control unit that performs control for matching an inclination of the image plane on which the optical image is formed to an inclination of an imaging surface of an imaging element based on the positional information acquired by the acquisition unit.

An observation apparatus according to a second aspect is such that in the observation apparatus according to the first aspect, the acquisition unit includes a displacement sensor that acquires the positional information.

An observation apparatus according to a third aspect is such that the observation apparatus according to the second aspect further comprises a drive unit that relatively moves at least one of the support or the imaging optical system in a specific intersection plane intersecting with an optical axis of the imaging optical system, in which the control unit performs control for causing the displacement sensor to acquire the positional information indicating the position of the bottom surface of the support corresponding to a position prior to the imaging optical system in a direction in which an observation region of the imaging optical system is moved in accordance with relative movement between the support and the imaging optical system.

An observation apparatus according to a fourth aspect is such that in the observation apparatus according to any one of the first aspect to the third aspect, the control unit performs at least one control of first control for performing control for adjusting an inclination of the support, second control for performing control for adjusting a motion of at least one lens included in the imaging optical system, or third control for performing control for adjusting the inclination of the imaging surface.

An observation apparatus according to a fifth aspect is such that in the observation apparatus according to any one of the first aspect to the third aspect, the imaging optical system further includes a ray deflection optical system that deflects a ray, and the control unit performs fourth control for deflecting the ray by the ray deflection optical system.

An observation apparatus according to a sixth aspect is such that in the observation apparatus according to any one of the first aspect to the third aspect, the imaging optical system further includes a ray deflection optical system that deflects a ray, and the control unit performs a plurality of types of control among first control for performing control for adjusting an inclination of the support, second control for performing control for adjusting a motion of at least one lens included in the imaging optical system, third control for performing control for adjusting the inclination of the imaging surface, and fourth control for performing control for deflecting the ray by the ray deflection optical system.

An observation apparatus according to a seventh aspect is such that in the observation apparatus according to the fifth aspect or the sixth aspect, the ray deflection optical system includes a plurality of wedge prisms in an optical axis direction of the imaging optical system, and the fourth control is control for deflecting the ray by controlling a rotation mechanism that independently rotates the plurality of wedge prisms about an optical axis.

An observation apparatus according to an eighth aspect is such that in the observation apparatus according to the seventh aspect, the plurality of wedge prisms include a first wedge prism, a second wedge prism, and a third wedge prism, and the control unit performs first correction control for correcting an overall inclination of the image plane on the first wedge prism and performs second correction control for correcting a partially changing inclination of the image plane on the second wedge prism and the third wedge prism.

An observation apparatus according to a ninth aspect is such that the observation apparatus according to any one of the first aspect to the eighth aspect further includes a reduction unit that reduces an effect of a positional shift between an optical axis of light passing through the imaging optical system and a center of the imaging surface on an image that is formed on the imaging surface based on the optical image showing the observation target.

An observation apparatus according to a tenth aspect is such that in the observation apparatus according to any one of the first aspect to the ninth aspect, the positional information is acquired in advance by the acquisition unit.

An observation apparatus according to an eleventh aspect is such that in the observation apparatus according to the second aspect or the third aspect, in a case where the positional information is acquired by the displacement sensor, the control unit performs control for prohibiting matching control in a case where a value of the position of the bottom surface based on the positional information is included outside a range in which execution of the matching control for matching the inclination of the image plane to the inclination of the imaging surface is permitted, and/or a case where a displacement amount per prescribed time for the position of the bottom surface based on the positional information exceeds a predetermined threshold value.

An observation apparatus according to a twelfth aspect is such that in the observation apparatus according to the seventh aspect or the eighth aspect, in a case where the inclination of the image plane is less than a predetermined threshold value, the control unit performs control for prohibiting matching control for matching the inclination of the image plane to the inclination of the imaging surface.

A method of operating an observation apparatus according to a thirteenth aspect includes acquiring positional information indicating a position of a bottom surface of a support for supporting an observation target by an acquisition unit, forming an optical image showing the observation target supported by the support on an image plane by an imaging optical system, adjusting a focal position of the imaging optical system by a focus adjustment unit based on the positional information acquired by the acquisition unit, and performing control for matching an inclination of the bottom surface in an observation region of the imaging optical system to an inclination of a focus plane corresponding to the focus adjusted by the focus adjustment unit by a control unit based on the positional information acquired by the acquisition unit.

A non-transitory computer-readable storage medium storing an observation control program according to a fourteenth aspect is A non-transitory computer-readable storage medium storing an observation control program causing a computer to function as the acquisition unit, the focus adjustment unit, and the control unit included in the observation apparatus according to any one of the first aspect to the twelfth aspect.

According to the observation apparatus, the method of operating the observation apparatus, and the observation control program of one embodiment of the present disclosure, an effect of reducing the blurriness of the image of the edge part portion in the observation region of the imaging optical system even in a case where the bottom surface of the support for supporting the observation target is inclined is achieved.

DETAILED DESCRIPTION

DESCRIPTION OF THE PREFERRED EMBODIMENTS

Figure 1:
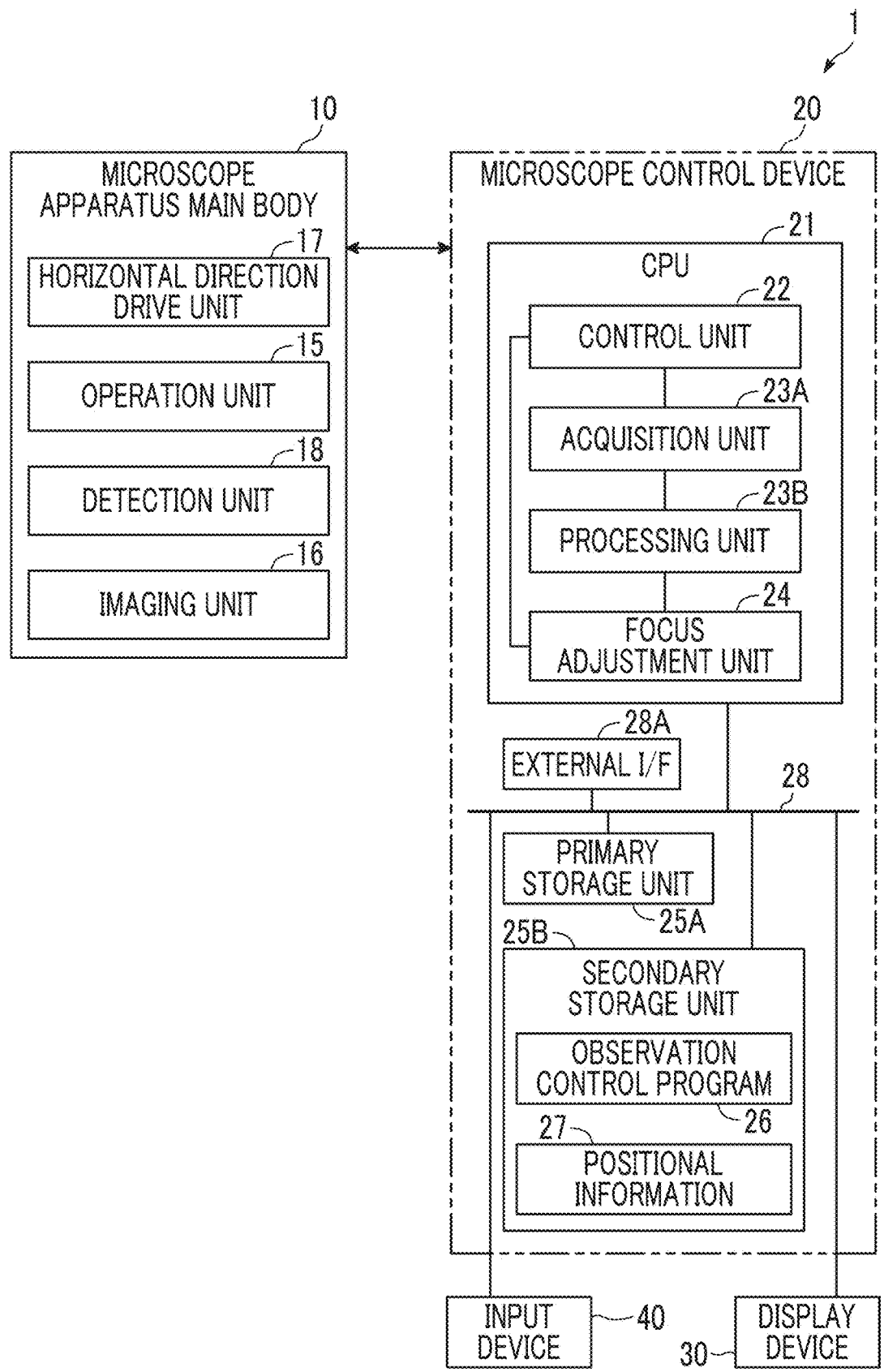
FIG. 1 is a block diagram illustrating one example of a configuration of a microscope apparatus according to a first embodiment.

Hereinafter, one example of an observation apparatus according to an embodiment of the technology of the present disclosure will be described in accordance with the appended drawings.

In the following description, "matching" refers to matching in a sense including error within an allowed range. In addition, in the following description, a "specific intersection plane" means an intersection plane that intersects with an optical axis. The angle formed between the intersection plane and the optical axis is changed in accordance with the inclination of a cultivation container and/or the inclination of the optical axis. In addition, in the following description, an "image plane" means a plane on which an optical image showing an observation target is formed by causing illumination light with which an observation target is irradiated to pass through the observation target and turn into observation light and condensing the observation light by an imaging optical system. In addition, in the following description, an "imaging surface" means a light-receiving surface, a film surface, and/or a sensor surface or the like of an imaging element that receives light of the optical image showing the observation target.

In addition, in the following description, "CPU" refers to an abbreviation for "Central Processing Unit". In addition, in the following description, "I/F" refers to an abbreviation for "Interface". In addition, in the following description, "ASIC" refers to an abbreviation for "Application Specific Integrated Circuit". In addition, in the following description, "FPGA" refers to an abbreviation for "Field-Programmable Gate Array".

In addition, in the following description, "RAM" refers to an abbreviation for "Random Access Memory". In addition, in the following description, "EEPROM" refers to an abbreviation for "Electrically Erasable Programmable Read-Only Memory". In addition, in the following description, "SSD" refers to an abbreviation for "Solid State Drive". In addition, in the following description, "PLD" refers to an abbreviation for "Programmable Logic Device".

In addition, in the following description, "CD-ROM" refers to an abbreviation for "Compact Disc Read Only Memory". In addition, in the following description, "USB" refers to an abbreviation for "Universal Serial Bus". In addition, in the following description, "DVD-ROM" refers to an abbreviation for "Digital Versatile Disc-Read Only Memory".

In addition, in the following description, "CCD" refers to an abbreviation for "Charge Coupled Device". In addition, in the following description, "CMOS" refers to an abbreviation for "Complementary Metal-Oxide-Semiconductor". In addition, in the following description, "RGB" refers to an abbreviation for "Red Green Blue".

First Embodiment

A microscope apparatus according to a first embodiment will be described in detail with reference to the drawings as one example of an observation apparatus, a method, and an observation control program according to the embodiment of the technology of the present disclosure.

For example, as illustrated in FIG. 1, a microscope apparatus 1 includes a microscope apparatus main body 10 and a microscope control device 20. The microscope apparatus 1 is one example of the observation apparatus according to the embodiment of the technology of the present disclosure.

Figure 2:
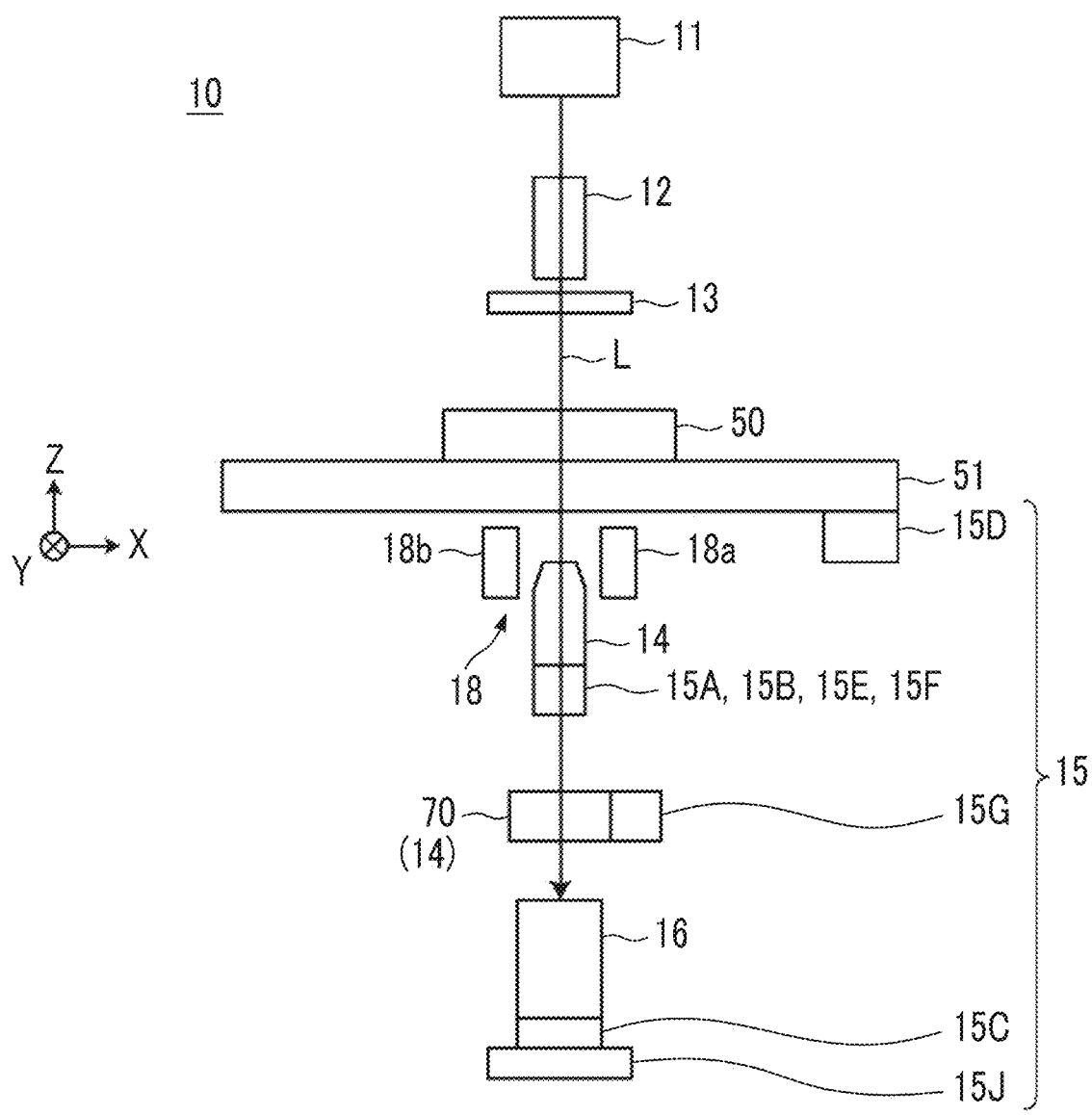
FIG. 2 is a schematic diagram illustrating one example of the configuration of the microscope apparatus according to the first embodiment.

The microscope apparatus main body 10 acquires a phase difference image by imaging a cultivated cell that is the observation target. Specifically, for example, as illustrated in FIG. 2, the microscope apparatus main body 10 comprises a white light source 11 that emits white light, a condenser lens 12, a slit plate 13, an imaging optical system 14, an operation unit 15, an imaging unit 16, and a detection unit 18.

The operation unit 15 includes a first operation unit 15A, a second operation unit 15B, a third operation unit 15C, a fourth operation unit 15D, a fifth operation unit 15E, a sixth operation unit 15F, a seventh operation unit 15G, and an eighth operation unit 15J. Operations of the first to eighth operation units 15A to 15J will be described later.

In the slit plate 13, a ring-shaped slit through which the white light is transmitted is disposed in a light screen that blocks the white light emitted from the white light source 11. Illumination light L having a ring shape is formed by causing the white light to pass through the slit.

Figure 3:
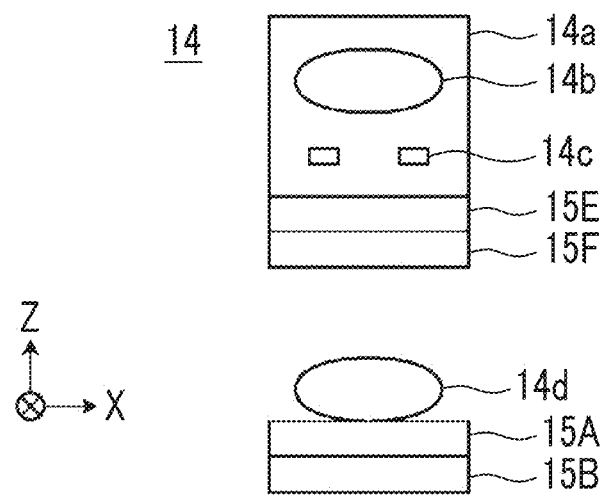
FIG. 3 is a schematic diagram illustrating one example of a configuration of an imaging optical system included in a microscope apparatus main body according to the first embodiment.

The imaging optical system 14 forms an optical image showing the observation target in a cultivation container 50 on the image plane. For example, as illustrated in FIG. 3, the imaging optical system 14 includes a phase difference lens 14a, an image-forming lens 14d, and a ray deflection optical system 70. The ray deflection optical system 70 will be described in detail later.

The phase difference lens 14a includes an objective lens 14b and a phase plate 14c. The phase plate 14c is obtained by forming a phase ring in a transparent plate that is transparent with respect to the wavelength of the illumination light L. The size of the slit of the slit plate 13 is in a conjugate relationship with the phase ring of the phase plate 14c.

The phase ring is obtained by forming a phase film shifting the phase of incident light by ¼ wavelength and a light reduction filter reducing incident light in a ring shape. Direct light incident on the phase ring has a phase shift of ¼ wavelength by passing through the phase ring, and the brightness of the direct light is decreased. Diffracted light that is diffracted by the observation target passes through the transparent plate of the phase plate 14c, and the phase and the brightness of the diffracted light do not change.

The phase difference lens 14a including the objective lens 14b is moved in an optical axis direction of the objective lens 14b by the fifth operation unit 15E included in the operation unit 15 illustrated in FIG. 2. In the present embodiment, the optical axis direction of the objective lens 14b and a Z direction (vertical direction) are the same direction. Auto focus control is performed by moving the phase difference lens 14a in the Z direction, and the contrast of the phase difference image acquired by the imaging unit 16 is adjusted.

While the fifth operation unit 15E moves the phase difference lens 14a in the Z direction, the present invention is not limited thereto and may be configured such that only the objective lens 14b is moved in the Z direction.

In addition, the magnification ratio of the phase difference lens 14a may be configured to be changeable. Specifically, the phase difference lens 14a or the imaging optical system 14 having different magnification ratios may be configured to be interchangeable. The phase difference lens 14a or the imaging optical system 14 may be automatically interchanged or may be manually interchanged by a user.

In addition, for example, the objective lens 14b of the present embodiment consists of a liquid lens having a changeable focal length. As long as the focal length is changeable, the present disclosure is not limited to the liquid lens, and any lens such as a liquid crystal lens and a shape deformation lens can be used. The focal length of the objective lens 14b is changed by changing an applied voltage by the sixth operation unit 15F included in the operation unit 15 illustrated in FIG. 2. Accordingly, the focal length of the imaging optical system 14 is changed. The auto focus control is also performed by changing the focal length of the objective lens 14b, and the contrast of the phase difference image acquired by the imaging unit 16 is adjusted.

Light showing the phase difference lens 14a that has passed through the phase difference image is incident on the image-forming lens 14d, and this light forms an image on an imaging surface 16A of the imaging unit 16. In the present embodiment, the image-forming lens 14d consists of a liquid lens having a changeable focal length. As long as the focal length is changeable, the present disclosure is not limited to the liquid lens, and any lens such as a liquid crystal lens and a shape deformation lens can be used. The focal length of the image-forming lens 14d is changed by changing an applied voltage by the first operation unit 15A included in the operation unit 15 illustrated in FIG. 2. Accordingly, the focal length of the imaging optical system 14 is changed. The auto focus control is performed by changing the focal length of the image-forming lens 14d, and the contrast of the phase difference image acquired by the imaging unit 16 is adjusted.

In addition, the image-forming lens 14d is moved in an optical axis direction of the image-forming lens 14d by the second operation unit 15B included in the operation unit 15 illustrated in FIG. 2. In the present embodiment, the optical axis direction of the image-forming lens 14d and the Z direction (vertical direction) are the same direction. The auto focus control is performed by moving the image-forming lens 14d in the Z direction, and the contrast of the phase difference image acquired by the imaging unit 16 is adjusted.

The imaging unit 16 comprises the imaging element that receives light of the image of the observation target formed by the image-forming lens 14d, images the observation target, and outputs the phase difference image as an observation image. A CCD image sensor, a CMOS image sensor, and the like can be used as the imaging element. As the imaging element, an imaging element in which RGB color filters are disposed may be used, or a monochrome imaging element may be used. The surface of the imaging element positioned on the imaging optical system 14 side is the imaging surface 16A.

The imaging unit 16 is moved in the Z direction by the third operation unit 15C included in the operation unit 15 illustrated in FIG. 2. In the present embodiment, a direction perpendicular to the imaging surface 16A of the imaging unit 16 and the Z direction are the same direction. The auto focus control is performed by moving the imaging unit 16 in the Z direction, and the contrast of the phase difference image captured by the imaging unit 16 is adjusted.

Figure 4:
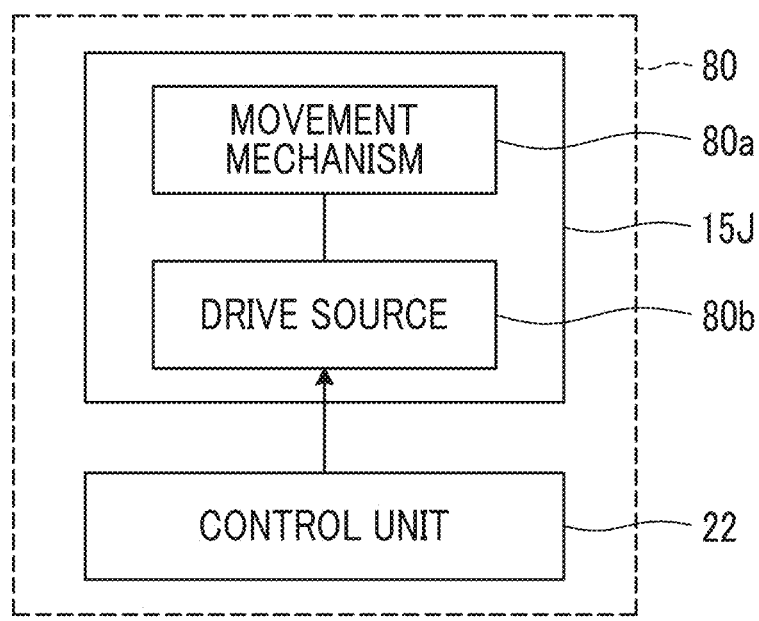
FIG. 4 is a block diagram illustrating one example of a configuration of a reduction unit included in the microscope apparatus according to the first embodiment.

In addition, the imaging unit 16 is moved in an X direction and a Y direction that are orthogonal to each other by the eighth operation unit 15J included in the operation unit 15 illustrated in FIG. 2. The X direction and the Y direction are directions orthogonal to the Z direction and are directions orthogonal to each other in a horizontal plane. For example, as illustrated in FIG. 4, the eighth operation unit 15J includes a well-known movement mechanism 80a for movement in the horizontal direction and a drive source 80b such as a motor. The eighth operation unit 15J is driven based on a control signal output from a control unit 22, described later, and the eighth operation unit 15J and the control unit 22 constitute a reduction unit 80, described later.

The reduction unit 80 reduces an effect of a positional shift between the optical axis of light passing through the imaging optical system 14 and the center of the imaging surface with respect to the image formed on the imaging surface of the imaging unit 16 based on observation target light. In the present embodiment, the control unit 22 moves the imaging unit 16 in a direction in which the positional shift is resolved by driving the eighth operation unit 15J. The configurations of the movement mechanism 80a and the drive source 80b are not limited and can use well-known configurations as long as the imaging unit 16 can be moved in the X direction and the Y direction.

The detection unit 18 detects the Z direction (vertical direction) position of the bottom surface of the cultivation container 50 installed in a stage 51. Specifically, the detection unit 18 includes a first displacement sensor 18a and a second displacement sensor 18b. The first displacement sensor 18a and the second displacement sensor 18b are linearly disposed in the X direction illustrated in FIG. 2 with the phase difference lens 14a interposed therebetween. The first displacement sensor 18a and the second displacement sensor 18b in the present embodiment are laser displacement meters and detect the Z direction position of the bottom surface of the cultivation container 50 by irradiating the cultivation container 50 with laser light and detecting reflected light. The bottom surface of the cultivation container 50 means a boundary surface between the bottom portion of the cultivation container 50 and the cell which is the observation target, that is, an installation surface for the observation target. That is, the bottom surface of the cultivation container 50 is the bottom surface in the cultivation container 50. The bottom portion of the cultivation container 50 means a bottom wall that forms the bottom of the cultivation container 50.

In the present embodiment, for example, the Z direction position of the bottom surface of the cultivation container 50 is such that the value of a signal of the reflected light detected by the detection unit 18 is set as a value representing the Z direction position of the bottom surface of the cultivation container 50 using the detection unit 18 as a reference surface.

In the present embodiment, the value of the Z direction position of the bottom surface of the cultivation container 50 is set as the value of the signal of the reflected light detected by the detection unit 18. However, the present disclosure is not limited to the present embodiment. A value obtained by converting the value of the signal of the reflected light into a distance, that is, the distance from the detection unit 18 to the bottom surface of the cultivation container 50, may be set as the Z direction position of the bottom surface of the cultivation container 50. Alternatively, by causing the detection unit 18 to further detect reflected light reflected by the lower surface of the bottom portion of the cultivation container 50, a value representing the thickness of the bottom portion of the cultivation container 50 may be calculated by subtracting the value of the reflected light reflected by the lower surface of the bottom portion of the cultivation container 50 from the value of the signal of the reflected light reflected by the bottom surface of the cultivation container 50, and this value may be set as the value representing the Z direction position of the bottom surface of the cultivation container 50. Alternatively, the value representing the Z direction position may be used by converting the value into the value of the actual distance.

A regular reflection optical system meter can be used as a laser displacement sensor. The detection unit 18 is not limited to the laser displacement sensor. For example, a confocal sensor can be used.

Z direction positional information of the bottom surface of the cultivation container 50 detected by the detection unit 18 is output to an acquisition unit 23A, described later. The acquisition unit 23A outputs the input positional information to a focus adjustment unit 24, described later. The focus adjustment unit 24 acquires a focus control amount by adjusting the focal position of the imaging optical system 14 based on the input positional information, and the control unit 22, described later, performs the auto focus control by controlling the operation unit 15 based on the focus control amount acquired by the focus adjustment unit 24. Detection of the Z direction position of the cultivation container 50 by the first displacement sensor 18a and the second displacement sensor 18b and adjustment of the focal position by the focus adjustment unit 24 will be described in detail later.

The stage 51 is disposed between the slit plate 13, and the phase difference lens 14a and the detection unit 18. The cultivation container 50 that accommodates the cell, which is the observation target, is installed on the stage 51. The cultivation container 50 of the present embodiment is one example of a support used in the observation apparatus according to the embodiment of the technology of the present disclosure. The support is not limited to the cultivation container 50 and may have any shape that can support the observation target. For example, the support may be a glass plate such as a slide glass. The observation target is not limited to the cultivated cell and, for example, may be any of blood, various particles, or fiber.

A Petri dish, a schale, a dish, a flask, a microchannel chip, a well plate in which a plurality of wells are arranged, or the like can be used as the cultivation container 50. In the present embodiment, for example, a well plate in which six wells are arranged is used. In the following description, the well plate may be collectively referred to as the cultivation container 50. The cell accommodated in the cultivation container 50 includes pluripotent stem cells such as an iPS cell and an ES cell, cells of a nerve, skin, myocardium, and a liver that are differentiation-induced from the stem cell, cells of skin, a retina, myocardium, a blood corpuscle, a nerve, and an organ extracted from a human body, and the like.

The stage 51 is moved by a horizontal direction drive unit 17 (refer to FIG. 1), described later, in the X direction and the Y direction which are orthogonal to each other. The X direction and the Y direction are directions in a specific intersection plane intersecting with the optical axis of the imaging optical system 14 and are directions orthogonal to each other in the specific intersection plane. In the present embodiment, for example, the specific intersection plane is a horizontal plane. Thus, the X direction and the Y direction are directions orthogonal to the Z direction and are directions orthogonal to each other in the horizontal plane. In the present embodiment, the X direction is set as a main scanning direction, and the Y direction is set as a sub-scanning direction.

Figure 5:
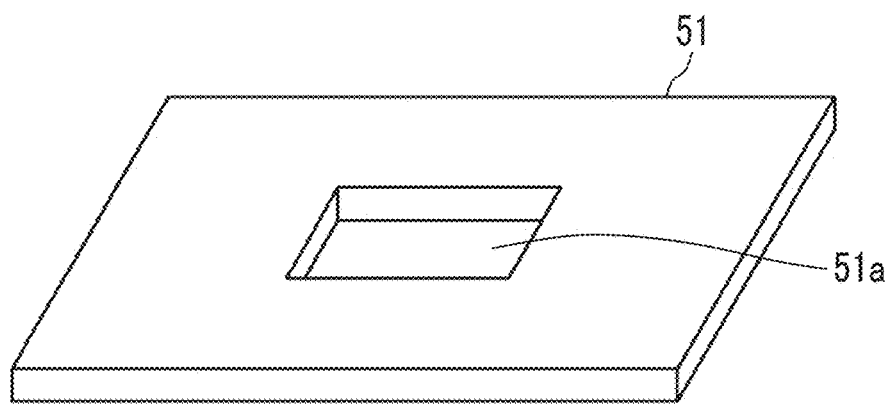
FIG. 5 is a perspective view illustrating one example of a configuration of a stage included in the microscope apparatus main body according to the first embodiment.

For example, as illustrated in FIG. 5, an opening 51a having a rectangular shape is formed at the center of the stage 51. It is configured that the cultivation container 50 is installed on a member forming the opening 51a and the phase difference image of the cell in the cultivation container 50 passes through the opening 51a.

In addition, the stage 51 is moved in the Z direction by the fourth operation unit 15D. Accordingly, the cultivation container 50 is moved in the Z direction. In the present embodiment, a direction perpendicular to the surface of the stage 51 on which the cultivation container 50 is installed and the Z direction are the same direction. The auto focus control is also performed by moving the stage 51 in the Z direction, and the contrast of the phase difference image acquired by the imaging unit 16 is adjusted.

For example, the first operation unit 15A and the sixth operation unit 15F include voltage variable circuits. The first operation unit 15A changes the voltage applied to the image-forming lens 14d based on the control signal output from the control unit 22, described later. The sixth operation unit 15F changes the voltage applied to the objective lens 14b based on the control signal output from the control unit 22, described later.

For example, the second operation unit 15B, the third operation unit 15C, the fourth operation unit 15D, and the fifth operation unit 15E include piezoelectric elements and drive sources applying a high voltage and are driven based on the control signal output from the control unit 22, described later. The operation unit 15 is configured to pass the phase difference image which has passed through the phase difference lens 14a and the image-forming lens 14d. In addition, the configurations of the second operation unit 15B, the third operation unit 15C, the fourth operation unit 15D, and the fifth operation unit 15E are not limited to the piezoelectric elements and, for example, may include various motors and/or solenoids or can use other well-known configurations as long as the image-forming lens 14d, the imaging unit 16, the stage 51, and the objective lens 14b (phase difference lens 14a) can be moved in the Z direction.

Figure 6:
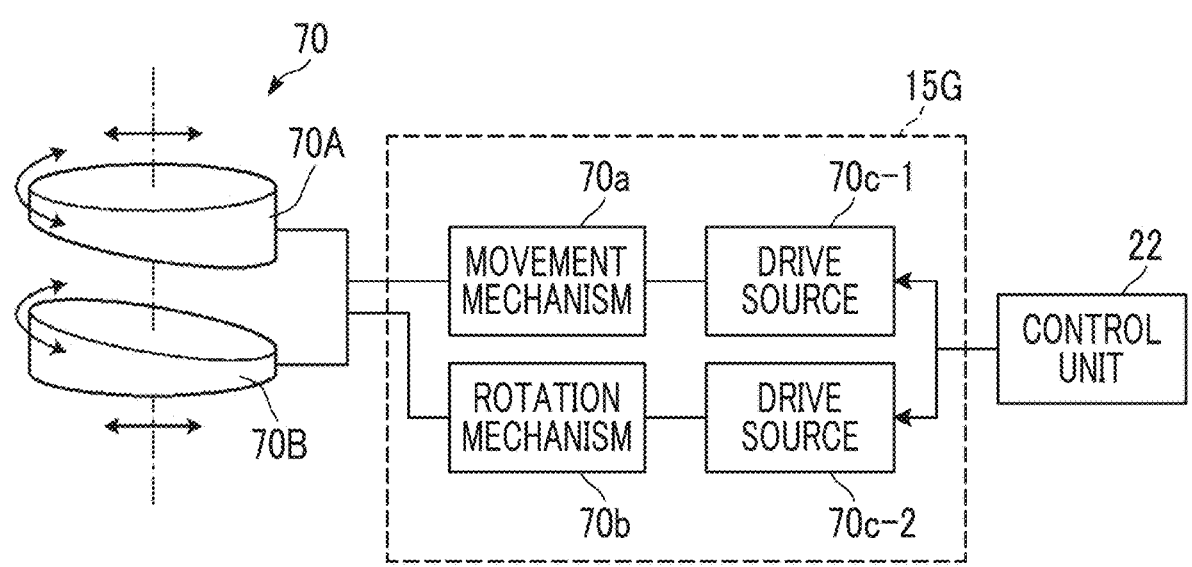
FIG. 6 is a schematic diagram illustrating one example of a configuration of a ray deflection optical system included in the microscope apparatus according to the first embodiment.

For example, as illustrated in FIG. 6, the ray deflection optical system 70 includes a first wedge prism 70A having a circular shape and a second wedge prism 70B having a circular shape. The first and second wedge prisms 70A and 70B are prisms in which two surfaces that may be used as an incidence surface and an emitting surface of light are not parallel, that is, one surface is inclined with respect to the other surface. In the following description, a surface arranged perpendicular to the optical axis will be referred to as a right angle surface, and a surface arranged at an inclination with respect to the optical axis will be referred to as a wedge surface. The wedge prisms 70A and 70B are prisms that deflect a ray perpendicularly incident on the right angle surface. In the present embodiment, a ray emitted from the image-forming lens 14d is deflected.

For example, the seventh operation unit 15G includes a well-known movement mechanism 70a for moving the first wedge prism 70A and the second wedge prims 70B in directions opposite to each other while maintaining the first wedge prism 70A and the second wedge prism 70B in parallel with the right angle surface, and a drive source 70c-1 such as a motor. The seventh operation unit 15G synchronously moves the first wedge prism 70A and the second wedge prism 70B in directions opposite to each other while maintaining the first wedge prism 70A and the second wedge prism 70B in parallel with the right angle surface based on the control signal output from the control unit 22, described later. In the case of moving the first wedge prism 70A in the rightward direction in FIG. 6, the seventh operation unit 15G moves the second wedge prism 70B in the leftward direction. Conversely, in the case of moving the first wedge prism 70A in the leftward direction in FIG. 6, the second wedge prism 70B is moved in the rightward direction. By moving the first and second wedge prisms 70A and 70B, the optical path length of light emitted from the image-forming lens 14d is changed. Accordingly, the focal length of the imaging optical system 14 can be changed. Accordingly, the auto focus control is performed, and the contrast of the phase difference image captured by the imaging unit 16 is adjusted.

The seventh operation unit 15G further includes a rotation mechanism 70b that rotates each of the first wedge prism 70A and the second wedge prism 70B about the optical axis of the imaging optical system 14, and a drive source 70c-2 such as a motor for rotating the rotation mechanism 70b. The drive sources 70c-1 and 70c-2 are driven based on the control signal output from the control unit 22, described later. The control unit 22 deflects the ray emitted from the image-forming lens 14d by rotating at least one of the first wedge prism 70A or the second wedge prism 70B. A method of rotating the first wedge prism 70A and the second wedge prism 70B will be described in detail later.

The configurations of the movement mechanism 70a and the drive source 70c-1 are not particularly limited and can use well-known configurations as long as it is possible to move the first wedge prism 70A and the second wedge prism 70B in directions opposite to each other while maintaining the first wedge prism 70A and the second wedge prism 70B in parallel with the right angle surface. The configurations of the rotation mechanism 70b and the drive source 70c-2 are not particularly limited and can use well-known configurations as long as it is possible to independently rotate the first wedge prism 70A and the second wedge prism 70B about the optical axis.

Next, a configuration of the microscope control device 20 controlling the microscope apparatus main body 10 will be described. For example, FIG. 1 is a block diagram illustrating a configuration of the microscope apparatus 1 of the present embodiment. A block diagram of a part of the configuration of the microscope apparatus main body 10 controlled by each unit of the microscope control device 20 is illustrated.

The microscope control device 20 comprises a CPU 21, a primary storage unit 25A, a secondary storage unit 25B, an external I/F 28A, and the like. The CPU 21 comprises the control unit 22, the acquisition unit 23A, a processing unit 23B, and the focus adjustment unit 24 and controls the entire microscope apparatus 1. The primary storage unit 25A is a volatile memory that is used as a work area or the like at the time of executing various programs. One example of the primary storage unit 25A is a RAM. The secondary storage unit 25B is a non-volatile memory prestoring various programs, various parameters, and the like. One example of an observation control program 26 according to the embodiment of the technology of the present disclosure is installed on the secondary storage unit 25B. The CPU 21 reads out the observation control program 26 from the secondary storage unit 25B and loads the read observation control program 26 into the primary storage unit 25A. The CPU 21 operates as the control unit 22, the acquisition unit 23A, the processing unit 23B, and the focus adjustment unit 24 by executing the observation control program 26 loaded in the primary storage unit 25A.

The secondary storage unit 25B stores positional information 27, described later. One example of the secondary storage unit 25B is an EEPROM or a flash memory. The external I/F 28A transmits and receives various information between the microscope apparatus main body 10 and the microscope control device 20. The CPU 21, the primary storage unit 25A, and the secondary storage unit 25B are connected to a busline 28. The external I/F 28A is also connected to the busline 28.

The observation control program 26 is distributed as a recording on a recording medium such as a DVD and a CD-ROM and is installed on a computer from the recording medium. Alternatively, the observation control program 26 may be stored in a storage device of a server computer or a network storage connected to a network in an externally accessible state, be downloaded to the computer in response to an external request, and then, be installed.

The positional information 27 is the Z direction positional information of the bottom surface of the cultivation container 50 acquired by the acquisition unit 23A.

While a case where a general-purpose computer functions as the microscope control device 20 has been described above, the microscope control device 20 may be embodied by a dedicated computer. The dedicated computer may be firmware that executes a program recorded on a non-volatile memory such as an incorporated ROM and/or a flash memory. Furthermore, a dedicated circuit such as an ASIC and/or an FPGA permanently storing a program for executing at least a part of the function of the microscope control device 20 may be disposed. Alternatively, a program instruction stored in the dedicated circuit may be combined with a program instruction that is executed by a general-purpose CPU and is programmed to use the program of the dedicated circuit. As described above, the program instruction may be executed by any combination of the hardware configurations of the computer.

The acquisition unit 23A acquires the positional information indicating the position of the bottom surface of the cultivation container 50. Specifically, the Z direction positional information of the bottom surface of the cultivation container 50 detected by the detection unit 18 is acquired. In the present embodiment, the acquisition unit 23A includes the detection unit 18.

The processing unit 23B performs various types of processing such as gamma correction, brightness and color difference conversion, and compression processing on an image signal acquired by the imaging unit 16. In addition, the processing unit 23B outputs the image signal obtained by performing various types of processing to the control unit 22, described later, one frame at a time at a specific frame rate. In addition, the processing unit 23B generates one combined phase difference image by combining the phase difference image of each observation region imaged by the microscope apparatus main body 10.

The focus adjustment unit 24 adjusts the focal position of the imaging optical system 14 based on the Z direction positional information of the bottom surface of the cultivation container 50 acquired by the acquisition unit 23A. Based on the positional information of the bottom surface, the focus adjustment unit 24 acquires a movement amount, that is, the focus control amount, for each of the first operation unit 15A to the seventh operation unit 15G and outputs each focus control amount to the control unit 22. Specifically, a table that is one example showing a relationship among the Z direction positional information of the bottom surface of the cultivation container 50, the voltage applied to the image-forming lens 14d for changing the focal length of the image-forming lens 14d, the movement amount of the image-forming lens 14d in the optical axis direction, the movement amount of the imaging unit 16 in the optical axis direction, the movement amount of the stage 51 in the optical axis direction, the movement amount of the objective lens 14b in the optical axis direction, the voltage applied to the objective lens 14b for changing the focal length of the objective lens 14b, and the movement amount of the ray deflection optical system 70 is prestored in the secondary storage unit 25B.

By referring to the table, the focus adjustment unit 24 acquires each of the voltage applied to the image-forming lens 14d, the movement amount of the image-forming lens 14d in the optical axis direction, the movement amount of the imaging unit 16 in the optical axis direction, the movement amount of the stage 51 in the optical axis direction, the movement amount of the objective lens 14b in the optical axis direction, the voltage applied to the objective lens 14b, and the movement amount of the ray deflection optical system 70 based on the Z direction positional information of the cultivation container 50 acquired by the acquisition unit 23A. In the following description, the voltage applied to the image-forming lens 14d, the movement amount of the image-forming lens 14d in the optical axis direction, the movement amount of the imaging unit 16 in the optical axis direction, the movement amount of the stage 51 in the optical axis direction, the movement amount of the objective lens 14b in the optical axis direction, the voltage applied to the objective lens 14b, and the movement amount of the ray deflection optical system 70 will be referred to as the focus control amount.

A manner of showing the relationship among the Z direction positional information of the bottom surface of the cultivation container 50, the voltage applied to the image-forming lens 14d, the movement amount of the image-forming lens 14d in the optical axis direction, the movement amount of the imaging unit 16 in the optical axis direction, the movement amount of the stage 51 in the optical axis direction, the movement amount of the objective lens 14b in the optical axis direction, the voltage applied to the objective lens 14b, and the movement amount of the ray deflection optical system 70 is not limited to the table and, for example, may be an expression. Any method may be used for showing the relationship as long as the voltage applied to the image-forming lens 14d, the movement amount of the image-forming lens 14d in the optical axis direction, the movement amount of the imaging unit 16 in the optical axis direction, the movement amount of the stage 51 in the optical axis direction, the movement amount of the objective lens 14b in the optical axis direction, the voltage applied to the objective lens 14b, and the movement amount of the ray deflection optical system 70 can be derived from the positional information.

The control unit 22 outputs the control signal based on the focus control amount of each of the first operation unit 15A to the seventh operation unit 15G acquired by the focus adjustment unit 24 to each of the first operation unit 15A to the seventh operation unit 15G. Accordingly, the focal length of the image-forming lens 14d is changed by the first operation unit 15A, and the focal length of the imaging optical system 14 is changed. The image-forming lens 14d is moved in the optical axis direction by the second operation unit 15B. The imaging unit 16 is moved in the optical axis direction by the third operation unit 15C. The stage 51 is moved in the optical axis direction by the fourth operation unit 15D. The objective lens 14b is moved in the optical axis direction by the fifth operation unit 15E. The focal length of the objective lens 14b is changed by the sixth operation unit 15F, and the focal length of the imaging optical system 14 is changed. Furthermore, the focal position of the imaging optical system 14 is changed by the seventh operation unit 15G, and the focal length of the imaging optical system 14 is changed. The auto focus control is performed by these seven operations.

The control unit 22 controls driving of the horizontal direction drive unit 17. Accordingly, the control unit 22 moves the stage 51 in the X direction and the Y direction and moves the cultivation container 50 in the X direction and the Y direction. The horizontal direction drive unit 17 includes a well-known movement mechanism for movement in the horizontal direction and a drive source such as a motor. For example, the horizontal direction drive unit 17 can be configured in the same manner as the eighth operation unit 15J.

The control unit 22 functions as a display control unit that displays one combined phase difference image generated by combining the phase difference image of each observation region imaged by the microscope apparatus main body 10 on a display device 30.

Figure 7:
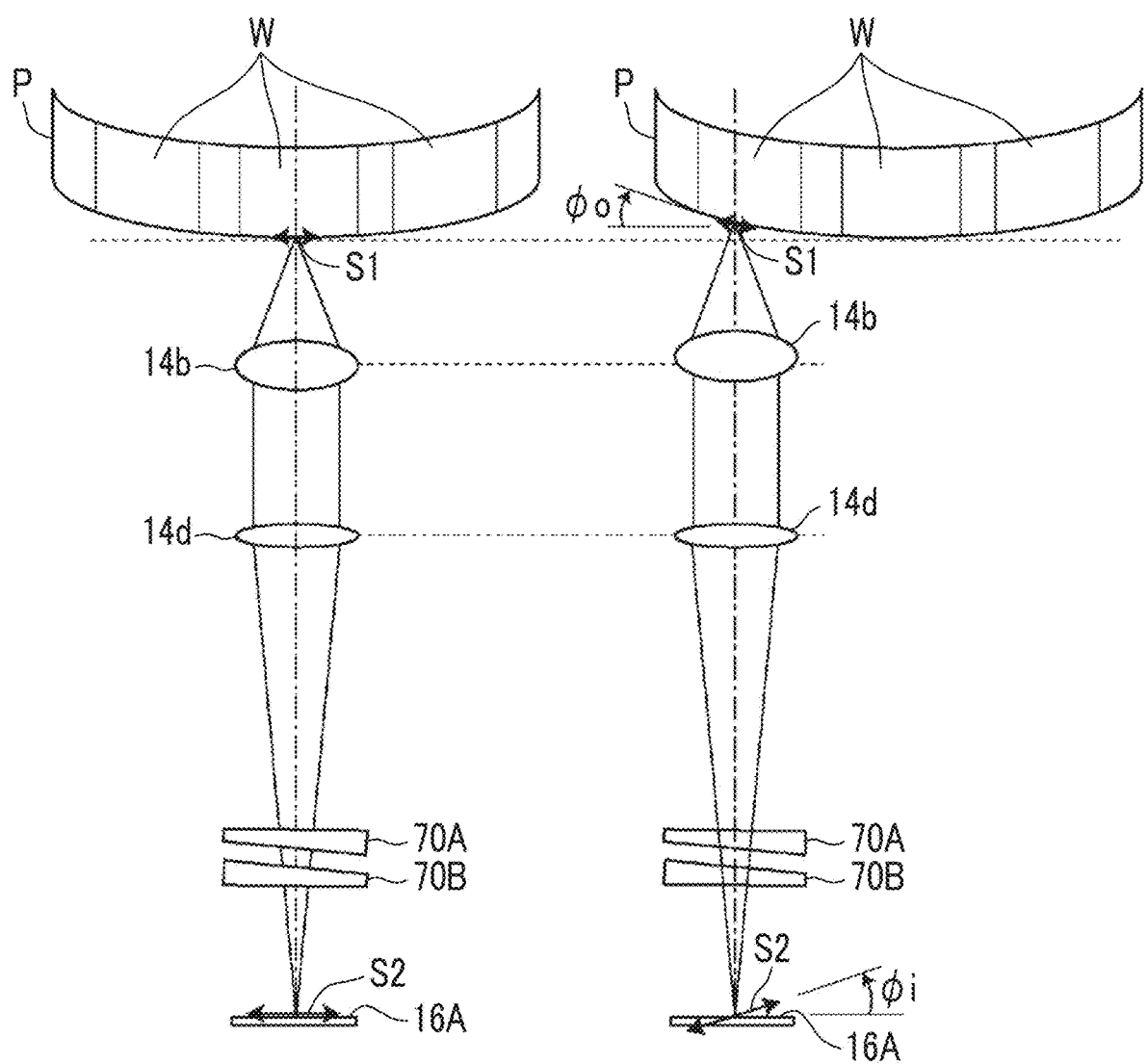
FIG. 7 is a diagram for describing occurrence of blurriness of an image of an edge part portion in an observation region of the imaging optical system included in the microscope apparatus according to the first embodiment.

For example, as illustrated in FIG. 7, in the well plate P, a bottom surface S1 in the center vicinity of the well plate P is generally flat as illustrated in the left diagram of FIG. 7. In a case where the bottom surface S1 is flat in the observation region of the imaging optical system 14, an image plane S2 on which the optical image showing the observation target, that is, the bottom surface S1, is formed by causing the illumination light L with which the well plate P is irradiated to pass through the bottom surface S1 and be condensed by the imaging optical system 14 is also flat.

However, as illustrated in the right diagram of FIG. 7, the bottom surface S1 at a position away from the center of the well plate P may be inclined. In a case where the bottom surface S1 is inclined in the observation region of the imaging optical system 14, the image plane S2 on which the optical image showing the observation target, that is, the bottom surface S1, is formed by causing the illumination light L with which the well plate P is irradiated to pass through the bottom surface S1 and be condensed by the imaging optical system 14 is also inclined. At this point, an inclination amount φo of the bottom surface S1 of the well plate P and an inclination amount φi of the image plane S2 show a relationship of Expression (1) below by the Scheimpflug principle. As illustrated in the right diagram of FIG. 7, the bottom surface S1 and the image plane S2 are inclined in the opposite directions.

$$\varphi i = \beta \times \varphi o \qquad (1)$$

Here, β is a lateral magnification ratio. The lateral magnification ratio β is the ratio of the size of the bottom surface S1 to the size of the image plane S2 and is a magnification ratio with respect to a length forming a right angle with the optical axis. The lateral magnification ratio β can be calculated by dividing a focal length fi of the image-forming lens 14d by a focal length fo of the objective lens 14b. In the present embodiment, the lateral magnification ratio β is stored in the secondary storage unit 25B by the control unit 22.

The image plane S2 is inclined at an angle corresponding to the inclination of the bottom surface S1. Thus, the image plane S2 is inclined at an angle of the image plane inclination amount φi with respect to the imaging surface 16A of the imaging element of the imaging unit 16. In a case where the inclinations of the image plane S2 and the imaging surface 16A are different, it is difficult to set the focal position on the entire bottom surface S1. Blurriness occurs in an edge part portion in the image acquired by imaging the bottom surface S1, that is, the observation target, by the imaging unit 16, and the edge part portion is a blurred image in the acquired image.

Therefore, in the present embodiment as one example of the technology of the present disclosure, the control unit 22 performs control for matching the inclination of the image plane S2 on which the optical image showing the observation target is formed to the inclination of the imaging surface 16A based on the positional information acquired by the acquisition unit 23A. Accordingly, occurrence of blurriness in the edge part portion in the image acquired by imaging performed by the imaging unit 16 can be reduced.

Specifically, the control unit 22 rotates each of the first wedge prism 70A and the second wedge prism 70B of the ray deflection optical system 70 by controlling the rotation mechanism 70b of the seventh operation unit 15G through the drive source 70c-2. By rotating the first wedge prism 70A and the second wedge prism 70B, the control unit 22 matches the inclination of the image plane on which the optical image showing the observation target is formed to the inclination of the imaging surface 16A of the imaging element of the imaging unit 16 by deflecting the ray emitted from the image-forming lens 14d. Control for deflecting the ray by the control unit 22 using the ray deflection optical system 70 in the present embodiment is one example of fourth control in the observation apparatus according to the embodiment of the technology of the present disclosure. A method of inclination control performed by the control unit 22 will be described in detail later.

An input device 40 and the display device 30 are connected to the microscope control device 20 through the busline 28.

As described above, the display device 30 displays the combined phase difference image generated by the control unit 22 and, for example, comprises a liquid crystal display. The display device 30 may be configured as a touch panel and double as the input device 40.

For example, the input device 40 comprises a mouse and a keyboard and receives various setting inputs from the user. The input device 40 of the present embodiment receives setting inputs such as an instruction to change the magnification ratio of the phase difference lens 14a and an instruction to change the movement speed of the stage 51.

Next, an effect of a part of the microscope apparatus 1 according to the embodiment of the technology of the present disclosure will be described.

Figure 8:
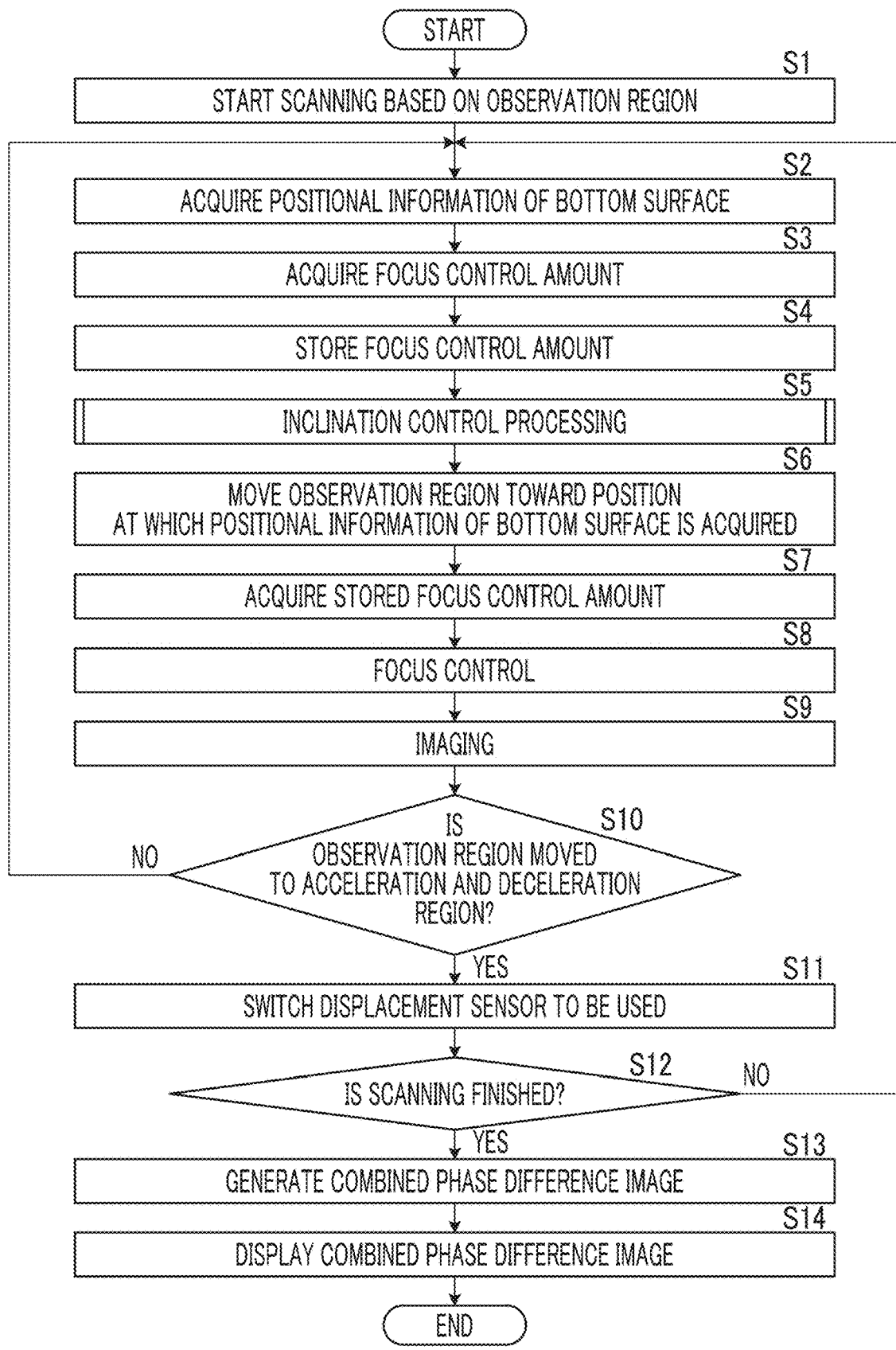
FIG. 8 is a flowchart illustrating one example of an effect of the microscope apparatus according to the first embodiment.

For example, as illustrated in FIG. 8, first, in step S1, the control unit 22 moves the stage 51 on which the cultivation container 50 accommodating the cell, which is the observation target, is placed by driving the horizontal direction drive unit 17. Accordingly, for example, the control unit 22 starts scanning the cultivation container 50 based on the observation region by positioning the observation region of the imaging optical system 14 at a scanning start point S illustrated in FIG. 9.

Figure 9:
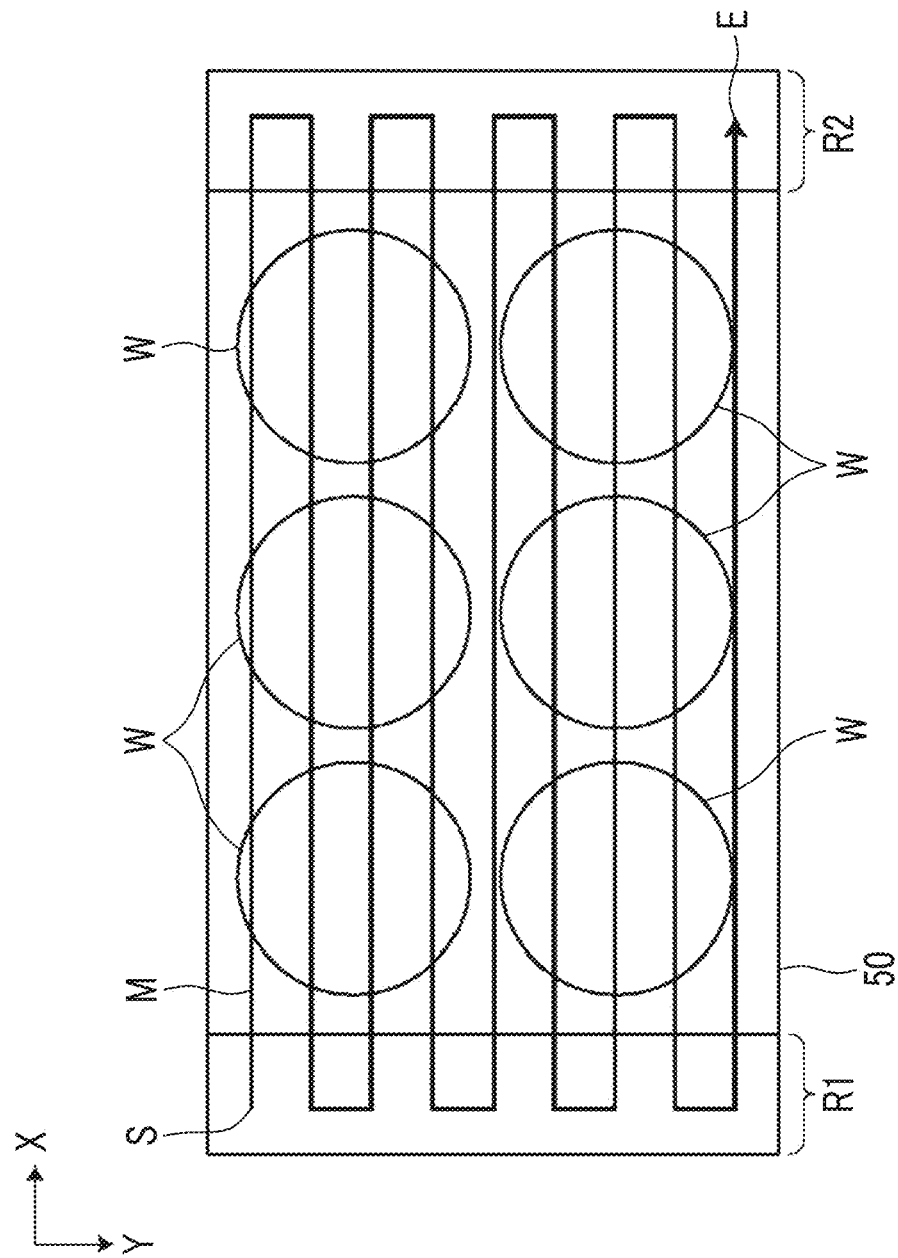
FIG. 9 is a diagram illustrating one example of a scanning position of the observation region in a cultivation container of the microscope apparatus according to the first embodiment.

In the present embodiment, under control of the control unit 22, the stage 51 is moved in the X direction and the Y direction under control of the control unit 22, and the cultivation container 50 is scanned by moving the observation region of the imaging optical system 14 in two dimensions in the cultivation container 50. The phase difference image of each observation region is acquired. In FIG. 9, solid line M illustrates a scanning position based on the observation region in the cultivation container 50.

As illustrated in FIG. 9, the observation region of the imaging optical system 14 is moved along solid line M from the scanning start point S to a scanning end point E by movement of the stage 51. That is, the observation region is moved in the positive direction (rightward direction in FIG. 9) of the X direction and then, is moved in the Y direction (downward direction in FIG. 9) and is moved in the opposite negative direction (leftward direction in FIG. 9). Next, the observation region is moved in the Y direction again and is moved in the positive direction again. By repeating reciprocation of the observation region in the X direction and movement of the observation region in the Y direction, the cultivation container 50 is scanned in two dimensions.

Figure 10:
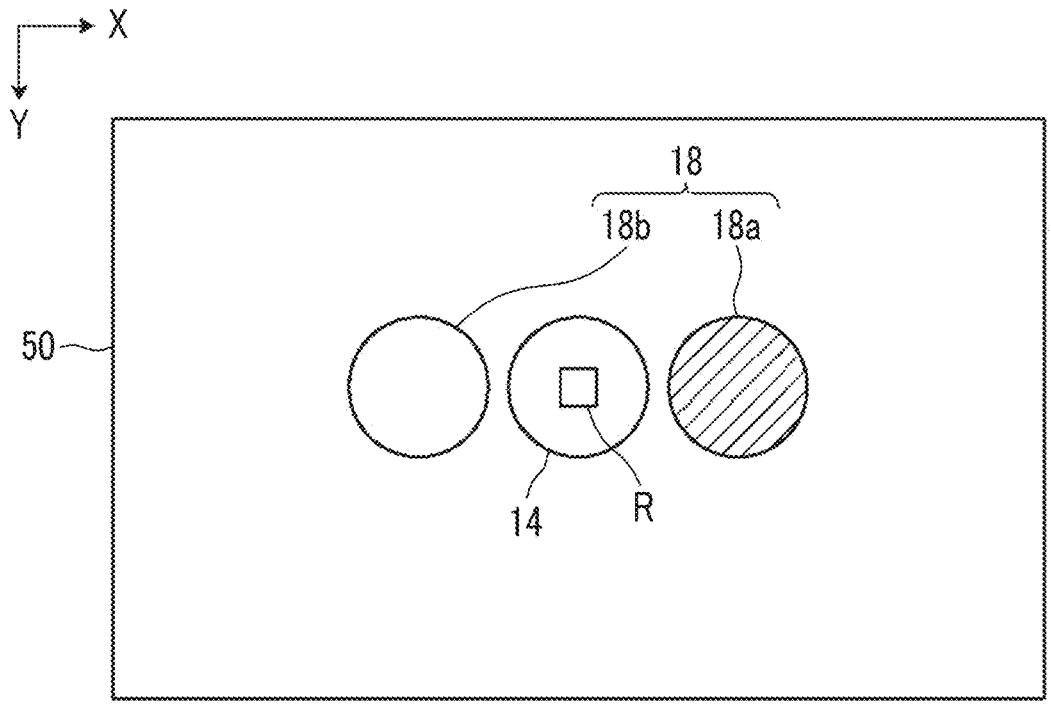
FIG. 10 is a diagram illustrating one example of a configuration of a detection unit of the microscope apparatus according to the first embodiment.
Figure 11:
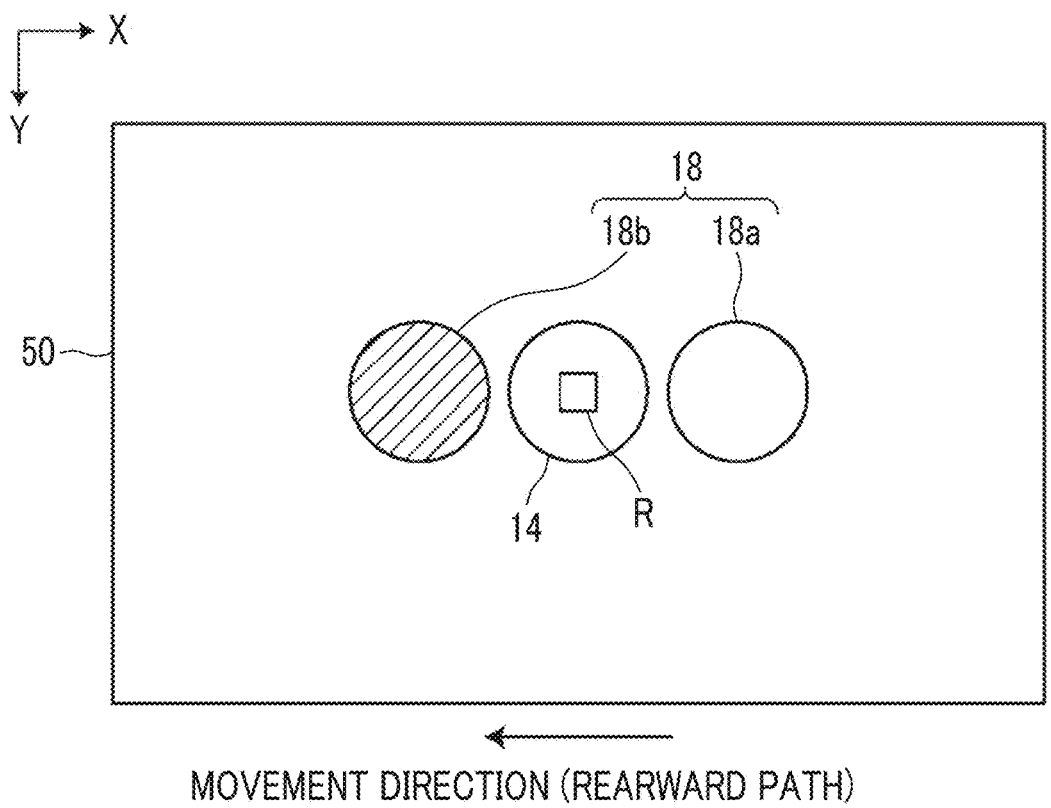
FIG. 11 is a diagram for describing one example of switching between a first displacement sensor and a second displacement sensor in the microscope apparatus according to the first embodiment.

In subsequent step S2, the control unit 22 causes the detection unit 18 to detect the positional information of the bottom surface of the cultivation container 50, and the acquisition unit 23A acquires the positional information detected by the detection unit 18. In the present embodiment, for example, as illustrated in FIG. 10 and FIG. 11, the first displacement sensor 18a and the second displacement sensor 18b are linearly disposed in the X direction with the imaging optical system 14 interposed therebetween. As described above, an observation region R of the imaging optical system 14 is moved in two dimensions in the cultivation container 50. At this point, the control unit 22 performs control for causing a displacement sensor 18 to acquire the positional information indicating the position of the bottom surface of the cultivation container 50 corresponding to a position prior to the imaging optical system 14 in a movement direction of the observation region R in accordance with relative movement between the cultivation container 50 and the imaging optical system 14.

That is, the Z direction position of the cultivation container 50 is detected at a position on the forward side of the movement direction of the observation region R from the position of the observation region R of the imaging optical system 14 with respect to the cultivation container 50. Specifically, in a case where the observation region R is moving in an arrow direction illustrated in FIG. 10 (rightward direction in FIG. 10), the Z direction position of the cultivation container 50 is detected by the first displacement sensor 18a that is on the forward side of the movement direction of the observation region R between the first displacement sensor 18a and the second displacement sensor 18b.

In a case where the observation region R is moving in an arrow direction in FIG. 11 (leftward direction in FIG. 11), the Z direction position of the cultivation container 50 is detected by the second displacement sensor 18b that is on the forward side of the movement direction of the observation region R between the first displacement sensor 18a and the second displacement sensor 18b.

The control unit 22 switches between detection using the first displacement sensor 18a and detection using the second displacement sensor 18b depending on the movement direction of the observation region R.

Next, in step S3, the focus adjustment unit 24 acquires the focus control amount based on the positional information acquired by the acquisition unit 23A in step S2. As described above, the focus adjustment unit 24 acquires each of the voltage applied to the image-forming lens 14d, the movement amount of the image-forming lens 14d in the optical axis direction, the movement amount of the imaging unit 16 in the optical axis direction, the movement amount of the stage 51 in the optical axis direction, the movement amount of the objective lens 14b in the optical axis direction, the voltage applied to the objective lens 14b, and the movement amount of the ray deflection optical system 70 as the focus control amount by referring to the table stored in the secondary storage unit 25B.

Next in step S4, the control unit 22 stores the focus control amount acquired by the focus adjustment unit 24 in step S3 in the secondary storage unit 25B in association with the X-Y coordinate position of the detected position of the positional information of the bottom surface of the cultivation container 50.

Next, in step S5, the control unit 22 performs the inclination control for matching the inclination of the image plane S2 on which the optical image showing the observation target is formed to the inclination of the imaging surface 16A based on the positional information acquired by the acquisition unit 23A. Inclination control processing of step S6 performed by the control unit 22 is performed in parallel with acquisition and storage processing of the focus control amount of steps S3 and S4.

Figure 12:
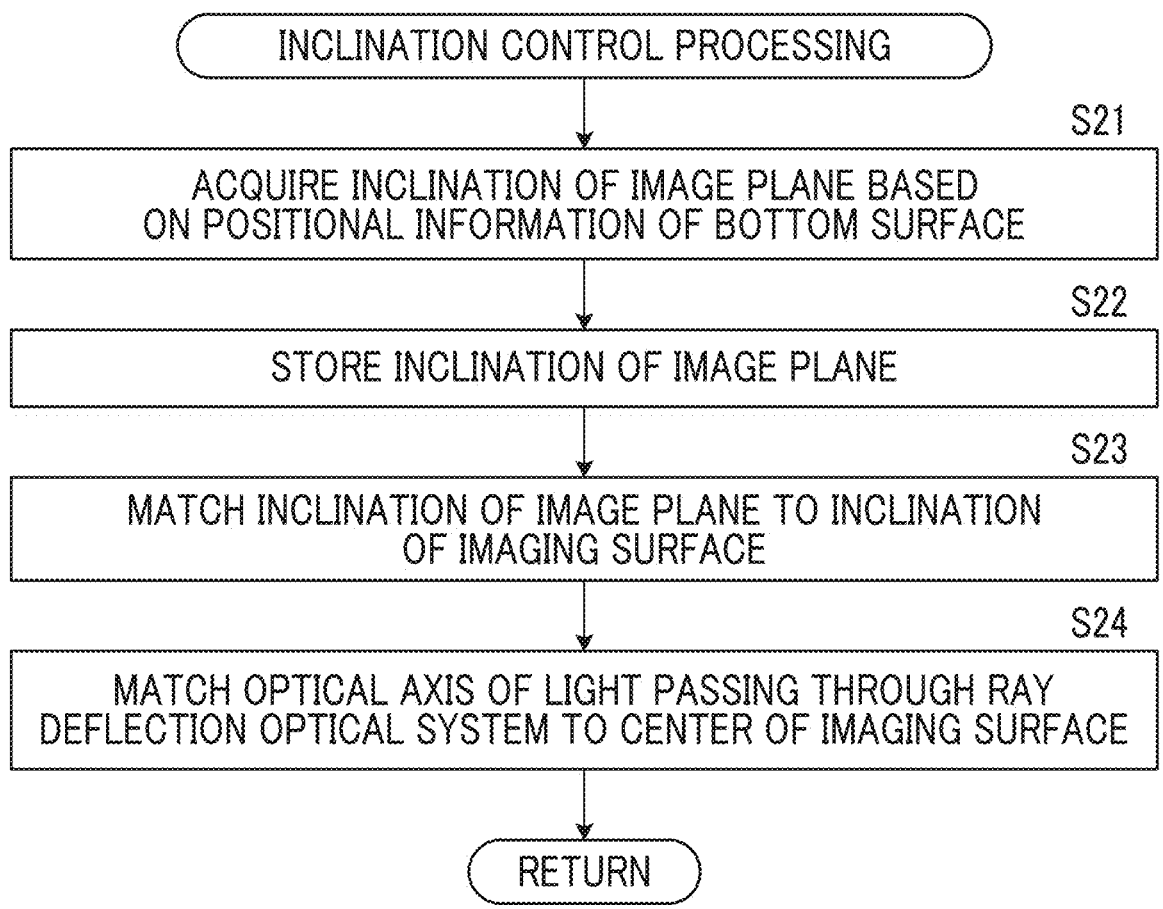
FIG. 12 is a flowchart illustrating one example of inclination control processing of the microscope apparatus according to the first embodiment.

One example of the inclination control processing according to the embodiment of the technology of the present disclosure will be described. For example, as illustrated in FIG. 12, in step S21, the control unit 22 acquires the inclination of the image plane S2 based on the positional information of the bottom surface stored in the secondary storage unit 25B.

Figure 13:
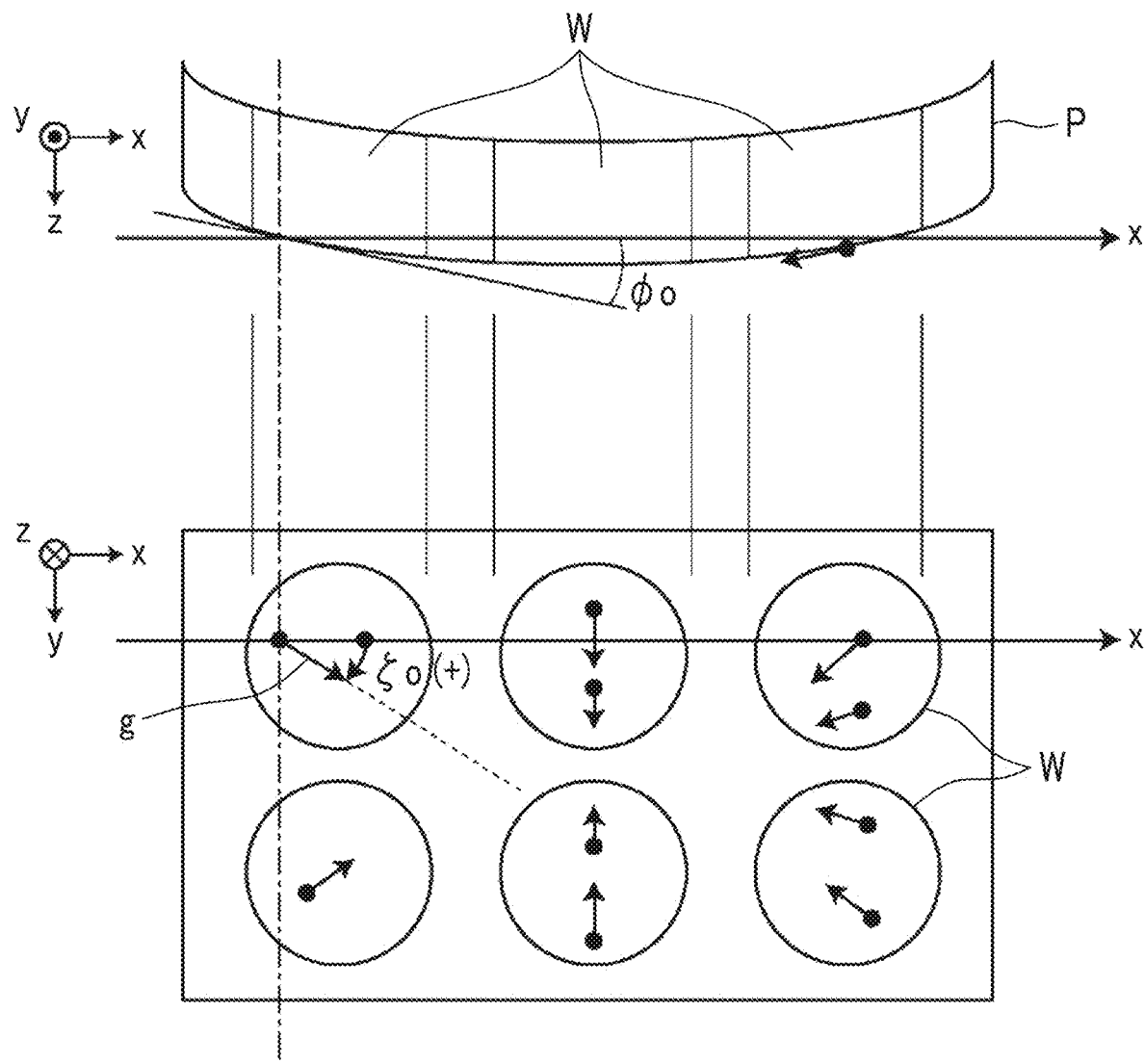
FIG. 13 is a diagram for describing one example of an inclination of a bottom surface of the cultivation container of the microscope apparatus according to the first embodiment.

Specifically, for example, as illustrated in FIG. 13, first, the control unit 22 acquires the inclination of the bottom surface from the Z direction positional information of the bottom surface of the cultivation container 50 based on the positional information acquired by the acquisition unit 23A in step S2 in FIG. 8. That is, the Z direction position of the bottom surface of the cultivation container 50 is acquired in each of the X direction and the Y direction in time series by the detection unit 18.

Accordingly, for example, in a case where the observation region R is moved from the position illustrated in FIG. 10 to the position at which the Z direction position of the cultivation container 50 is detected by the first displacement sensor 18a, the inclination of the bottom surface is acquired from a difference in height between the Z direction position of the cultivation container 50 detected in advance at the position of the first displacement sensor 18a illustrated in FIG. 10 and the Z direction position of the cultivation container 50 detected in advance at the position of the observation region R illustrated in FIG. 10. A table that shows a relationship between the difference in height and the inclination of the bottom surface is prestored in the secondary storage unit 25B. The control unit 22 acquires the inclination by referring to the table.

A manner of showing the relationship between the difference in height and the inclination of the bottom surface is not limited to the table and, for example, may be an expression. Any method may be used for showing the relationship as long as the inclination of the bottom surface can be derived from the difference in height.

In a case where only one piece of Z direction positional information is present in the X direction and the Y direction as in the case of initially acquiring the inclination, the user prestores an initial value in the secondary storage unit 25B using the input device 40. The inclination of the bottom surface is acquired based on the stored initial value and the initially acquired Z direction position.

As illustrated in the upper diagram of FIG. 13, the inclination of the bottom surface S1 is set as an inclination into which the X direction inclination of the bottom surface and the Y direction inclination of the bottom surface acquired by the control unit 22 are combined. This inclination is set as the plate surface inclination amount $\varphi o$. Here, plate surface inclination amount $\varphi o \geq 0$ is assumed.

In addition, in the lower diagram of FIG. 13, the length of arrow g illustrated by an inclined downward arrow represents the magnitude of the plate surface inclination amount $\varphi o$, and the direction of arrow g represents the inclination direction of the plate P in the X-Y plane. That is, the plate inclination vector g is represented by Expression (2) below.

$$|g|=\varphi o \qquad (2)$$

In step S21 in FIG. 12, the control unit 22 acquires the image plane inclination amount $\varphi i$ derived from Expressions (1) and (2) as the inclination of the image plane S2. In step S22, the control unit 22 stores the acquired inclination of the image plane S2 in the secondary storage unit 25B.

Next, in step S23, the control unit 22 performs control for matching the inclination of the image plane S2 to the inclination of the imaging surface 16A. Hereinafter, a specific example as one example of the inclination control processing will be described.

First, as illustrated in the lower diagram of FIG. 13, the inclination direction of the plate P, that is, a direction indicated by the plate inclination vector g, is set as a plate surface inclination azimuthal angle $\zeta o$.

Figure 14:
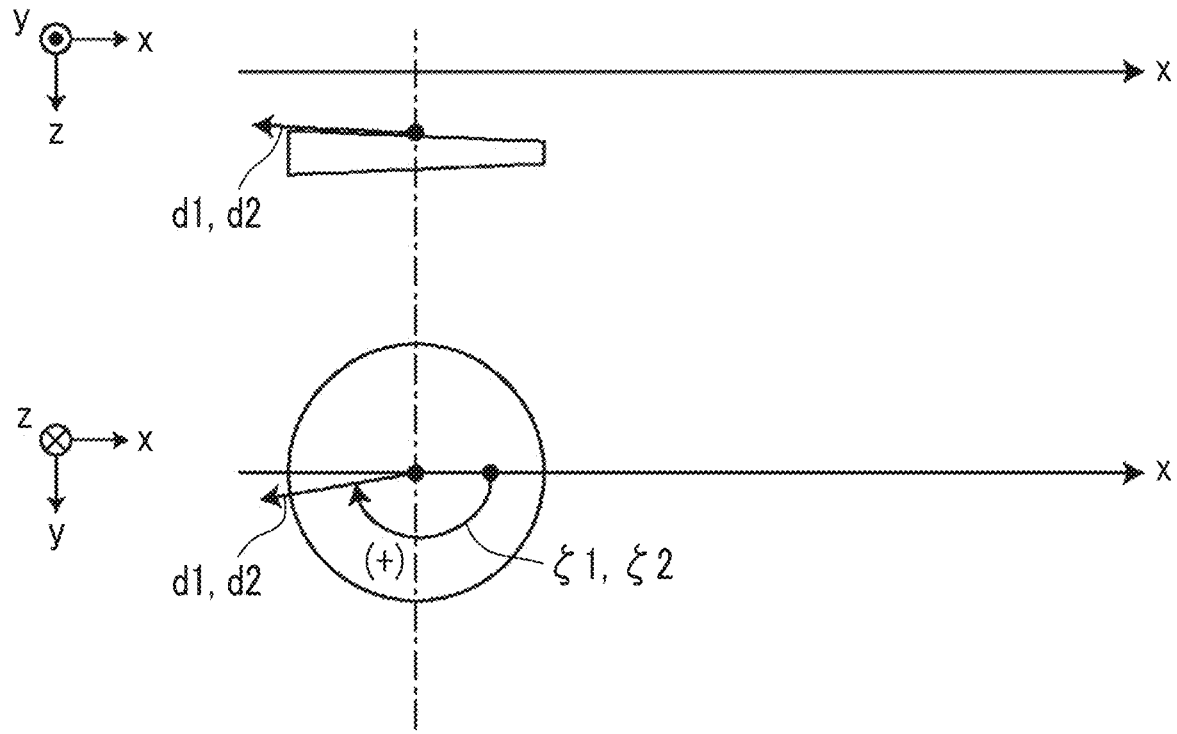
FIG. 14 is a diagram for describing one example of a definition of an angle of the ray deflection optical system included in the microscope apparatus according to the first embodiment.

In addition, for each of the first and second wedge prisms 70A and 70B, as illustrated in the upper diagram of FIG. 14, the inclination of the right angle surface of each of the first and second wedge prisms 70A and 70B is set as a wedge prism direction, and the wedge prism direction is set as a ray deflection direction.

The rotation angles of the first and second wedge prisms 70A and 70B in a case where a position in the lower diagram of FIG. 14 is set from a position in the upper diagram of FIG. 14 by rotating the first and second wedge prisms 70A and 70B are denoted by $\xi 1$ and $\xi 2$, respectively.

The lengths of vectors d1 and d2 illustrated by inclined downward arrows in the lower diagram of FIG. 14 represent the magnitudes of deflection amounts $\theta 1$ and $\theta 2$ of the first and second wedge prisms 70A and 70B, respectively. The directions of the vectors d1 and d2 illustrated by the arrows represent directions corresponding to the deflection directions of the first and second wedge prisms 70A and 70B, respectively, in the X-Y plane. That is, each of the deflection vectors d1 and d2 of the first and second wedge prisms 70A and 70B is represented by Expression (3) below.

$$|d1|=|d2|=\theta 1=\theta 2=\theta wp \qquad (3)$$

Here, $\theta wp$ denotes the deflection amount of the wedge prism.

In the present embodiment, by setting the deflection amounts $\theta 1$ and $\theta 2$ of the first and second wedge prisms 70A and 70B to the same value, the first and second wedge prisms 70A and 70B are set as prisms having the same specifications, and cost is reduced. However, the technology of the present disclosure is not limited thereto. The deflection amounts $\theta 1$ and $\theta 2$ of the first and second wedge prisms 70A and 70B may be set to different values.

Figure 15:
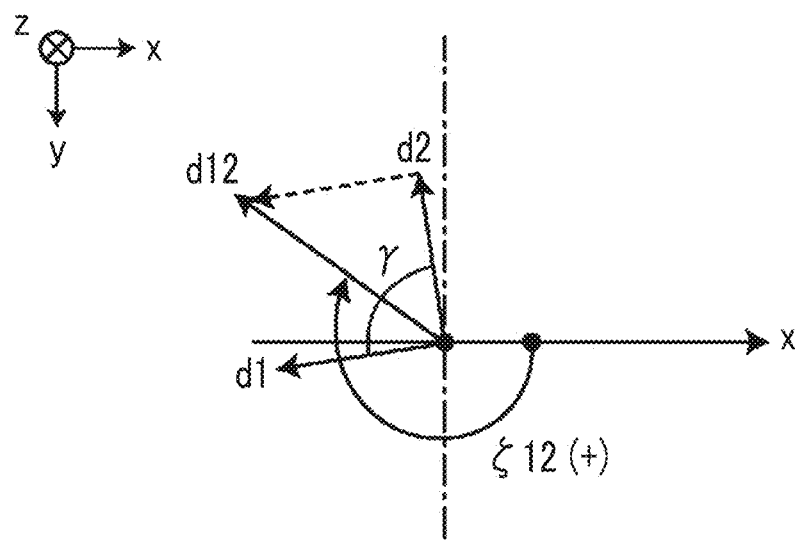
FIG. 15 is a diagram for describing one example of a deflection vector of the ray deflection optical system included in the microscope apparatus according to the first embodiment.

For example, as illustrated in FIG. 15, in a case where the deflection vectors d1 and d2 of the first and second wedge prisms 70A and 70B show directions and magnitudes illustrated in FIG. 15, a wedge prism pair deflection vector d12 into which the deflection vectors d1 and d2 of the first and second wedge prisms 70A and 70B are combined is represented by Expression (4) below. The wedge prism pair includes the first and second wedge prisms 70A and 70B.

$$d12=d1+d2 \quad (4)$$

In addition, as illustrated in the left diagram of FIG. 7, the bottom surface S1 and the image plane S2 are inclined in the opposite directions. Thus, the wedge prism pair deflection vector d12 is represented by Expression (5) below.

$$d12=-\beta \times g \quad (5)$$

The length of the wedge prism pair deflection vector d12 indicates a wedge prism pair deflection amount θ12 and thus, is represented by Expression (6) below.

$$|d12|=\theta 12 \quad (6)$$

From Expressions (2), (5), and (6), the deflection amount θ12 of the wedge prism pair is represented by Expression (7) below.

$$\theta 12=\beta \times \varphi o \quad (7)$$

Here, $\theta 12 \geq 0$ is assumed.

The deflection amount θ12 of the wedge prism pair acquired using Expression (7) is the same value as the inclination amount φi of the image plane S2 shown by Expression (1). Thus, the control unit 22 acquires the value of the deflection amount θ12 of the wedge prism pair by acquiring the value of the image plane inclination amount φi of the image plane S2 and the value of the lateral magnification ratio β stored in the secondary storage unit 25B.

In a case where the inclination direction of the wedge prism pair, that is, the direction indicated by the wedge prism pair deflection vector d12, is set as a wedge prism pair deflection azimuthal angle ξ12, the wedge prism pair deflection azimuthal angle ξ12 is represented by Expression (8) below.

$$\xi 12=\zeta o+\pi \quad (8)$$

Here, π is the ratio of circumference to diameter that is defined as the ratio of the circumference of a circle to the diameter of the circle.

That is, as illustrated in FIG. 7, it is shown that the wedge prism pair deflection azimuthal angle ξ12 is positioned in an opposite direction to the plate surface inclination azimuthal angle ζo with respect to the optical axis by the Scheimpflug principle.

From Expressions (3), (4), and (6), the deflection amount θ12 of the wedge prism pair is represented by Expression (9) below.

$$\theta 12=2 \times \theta wp \times \cos(\gamma/2) \quad (9)$$

Here, γ is the angle formed between the deflection vectors d1 and d2 of the first and second wedge prisms 70A and 70B.

From Expression (9), the angle γ formed between the deflection vectors d1 and d2 of the first and second wedge prisms 70A and 70B is represented by Expression (10) below.

$$\gamma=2 \times a \, \cos(\theta 12/(2/\theta wp)) \quad (10)$$

Here, $\gamma \geq 0$ is assumed.

The rotation angles ξ1 and ξ2 of the first and second wedge prisms 70A and 70B are represented by Expressions (11) and (12), respectively, below.

$$\xi 1=\xi 12-\gamma/2 \quad (11)$$

$$\xi 2=\xi 12+\gamma/2 \quad (12)$$

Expressions (1) to (12) are prestored in the secondary storage unit 25B. The control unit 22 acquires the rotation angles ξ1 and ξ2 of the first and second wedge prisms 70A and 70B using Expressions (1) to (12). The control unit 22 rotates the first and second wedge prisms 70A and 70B based on the acquired rotation angles ξ1 and ξ2 of the first and second wedge prisms 70A and 70B by driving the drive source 70c-2 of the seventh operation unit 15G to operate the rotation mechanism 70b.

In the present embodiment, Expressions (1) to (12) are stored in the secondary storage unit 25B. However, the technology of the present disclosure is not limited thereto. For example, a correspondence table between the positional information of the bottom surface of the cultivation container 50 and the rotation angles ξ1 and ξ2 of the first and second wedge prisms 70A and 70B may be stored, or any method may be used as long as the values of the rotation angles ξ1 and ξ2 of the first and second wedge prisms 70A and 70B can be derived from the positional information of the bottom surface of the cultivation container 50.

Figure 16:
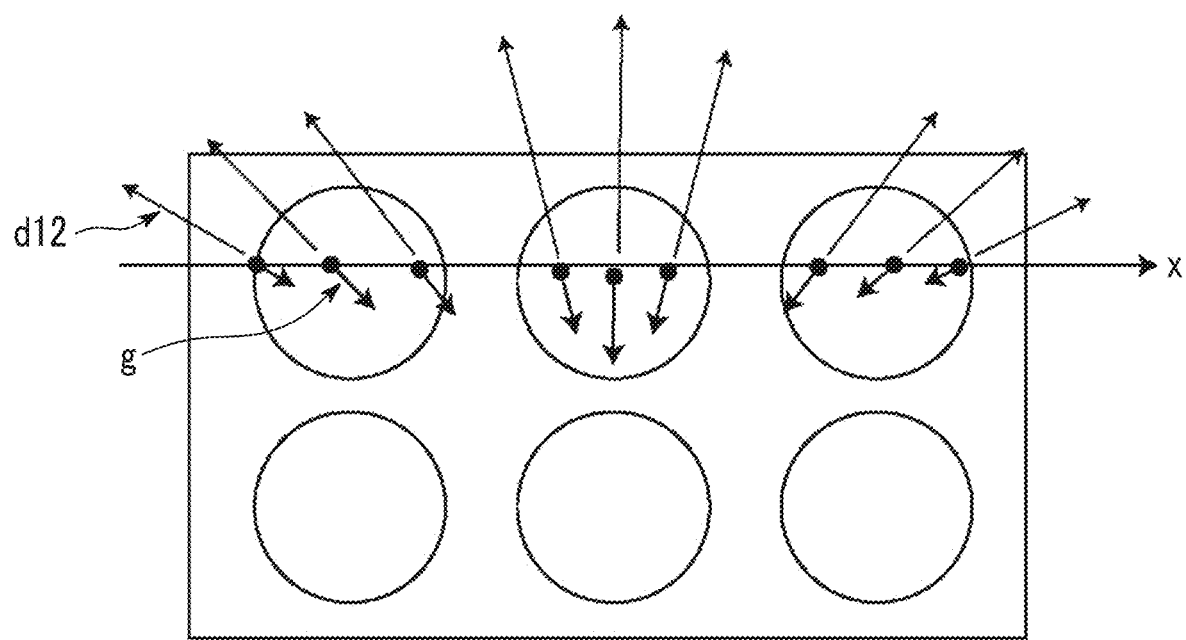
FIG. 16 is a diagram illustrating one example of a relationship between the inclination of the bottom surface of the cultivation container and the deflection vector of the ray deflection optical system of the microscope apparatus according to the first embodiment.

For example, as illustrated in FIG. 16, in the well plate P including six wells W, in a case where the plate inclination vector g at a certain position in the Y direction is large in a center vicinity in the X direction and is decreased in a direction toward an outer side, the wedge prism pair deflection vector d12 necessary for matching the inclination of the image plane S2 to the inclination of the imaging surface 16A also needs to be large in the center vicinity in the X direction and be decreased in a direction toward the outer side.

Figure 17:
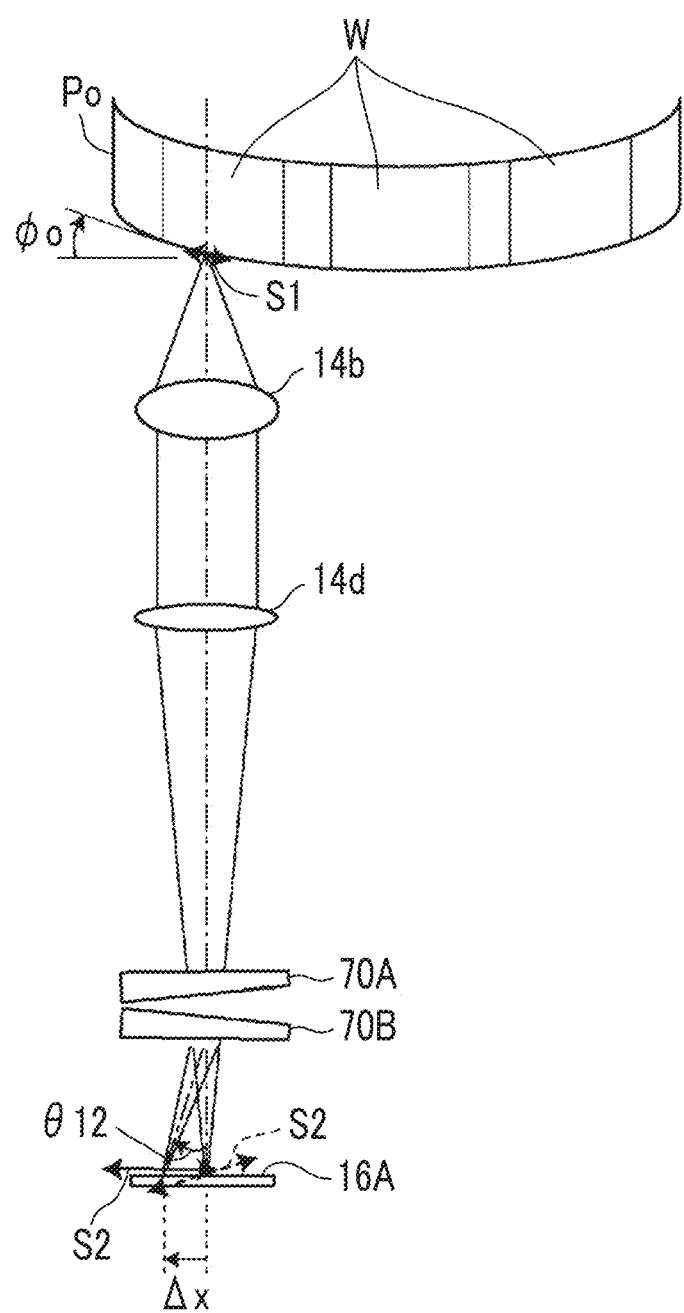
FIG. 17 is a diagram for describing a correction principle of the blurriness of the image of the edge part portion in the observation region of the imaging optical system included in the microscope apparatus according to the first embodiment.

In the above manner, the control unit 22 acquires the wedge prism pair deflection vector d12 corresponding to the inclination of the bottom surface S1, that is, the plate inclination vector g, and rotates the first and second wedge prisms 70A and 70B by acquiring the rotation angles ξ1 and ξ2 of the first and second wedge prisms 70A and 70B from the acquired wedge prism pair deflection vector d12. Accordingly, as illustrated in FIG. 17, a ray that has passed through the ray deflection optical system 70 is deflected by only the wedge prism pair deflection amount θ12. Thus, it is possible to match the inclination of the image plane S2 before deflection, that is, an inclination different from the inclination of the imaging surface 16A, to the inclination of the image plane S2 after deflection, that is, the inclination of the imaging surface 16A.

In the present embodiment, the control unit 22 performs control for prohibiting matching control for matching the inclination of the image plane S2 to the inclination of the imaging surface 16A in a case where the position of the bottom surface based on the positional information is included outside a range in which execution of the matching control for matching the inclination of the image plane S2 to the inclination of the imaging surface 16A is permitted, and/or a case where a displacement amount per prescribed time for the position of the bottom surface based on the positional information exceeds a predetermined threshold value.

Figure 18A:
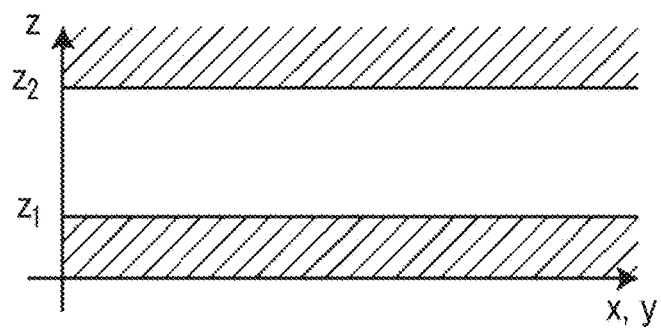
FIG. 18A is a diagram for describing one example of matching control in the microscope apparatus according to the first embodiment.

Specifically, for example, as illustrated in FIG. 18A, the control unit 22 sets a range between z1 and z2, that is, the outside of the range illustrated by diagonal lines in FIG. 18A, of the value of the position of the bottom surface based on the positional information as a range in which execution of the matching control for matching the inclination of the image plane S2 to the inclination of the imaging surface 16A is permitted, and sets a range of less than or equal to z1 and greater than or equal to z2, that is, the range illustrated by diagonal lines in FIG. 18A, as a range in which execution of the matching control for matching the inclination of the image plane S2 to the inclination of the imaging surface 16A is prohibited. In a case where the value of the position of the bottom surface of the cultivation container 50 acquired by the detection unit 18 is included outside the range in which execution of the matching control is permitted, that is, in the range in which execution of the matching control is prohibited, the control unit 22 performs control for prohibiting the matching control for matching the inclination of the image plane S2 to the inclination of the imaging surface 16A.

Figure 18B:
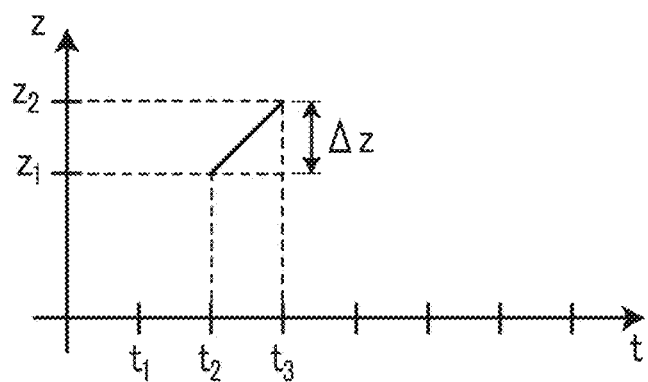
FIG. 18B is a diagram for describing another example of the matching control in the microscope apparatus according to the first embodiment.

In addition, in the present embodiment, for example, as illustrated in FIG. 18B, in a case where a displacement amount Δz of the value of the position of the bottom surface based on the positional information in the case of a change from $t_2$ to $t_3$ exceeds a predetermined threshold value, the control unit 22 performs control for prohibiting the matching control for matching the inclination of the image plane S2 to the inclination of the imaging surface 16A. In the present embodiment, a change amount Δt in time from $t_2$ to $t_3$ corresponds to a sampling cycle of the detection unit 18, and the sampling cycle is one example of a prescribed time according to the embodiment of the technology of the present disclosure. However, the technology of the present disclosure is not limited thereto. For example, the prescribed time, that is, the change amount Δt, may be set by bisecting the sampling cycle or can be appropriately set by the user.

In the present embodiment, "control for prohibiting the matching control" performed by the control unit 22 includes a case where the control unit 22 does not perform the matching control and a case where the control unit 22 does not perform the matching control and maintains immediately previously performed control.

According to the above description, for example, the control unit 22 can prevent unnecessary rotation of the ray deflection optical system 70 in a case where the value detected by the detection unit 18 is greater or less than a usually available range of the value due to any defect as in a case where a scratch or the like is present on the bottom surface of the cultivation container 50 and/or an unexpected defect is present in the detection unit 18, and/or a case where the value detected by the detection unit 18 is rapidly changed.

In the present embodiment, in a case where the value of the position of the bottom surface of the cultivation container 50 acquired by the detection unit 18 is included outside the range in which execution of the matching control is permitted, the control unit 22 performs control for prohibiting the matching control. However, the technology of the present disclosure is not limited thereto. The control unit 22 may further perform control for prohibiting adjustment of the focal position of the imaging optical system 14 performed by the focus adjustment unit 24.

Figure 19:
FIG. 19 is a diagram for describing one example of a rotation control method performed by a control unit included in the microscope apparatus according to the first embodiment.

For example, as illustrated in FIG. 19, in a case where the bottom surface S1 is flat in the center vicinity of the bottom surface of the well plate P, the image plane S2 is also flat. In a case where the image plane S2 is flat, the right angle surface and the wedge surface may be set in parallel with each other in the first and second wedge prisms 70A and 70B as illustrated in FIG. 7. In order to set the right angle surface and the wedge surface in parallel with each other, the rotation angles ξ1 and ξ2 of the first and second wedge prisms 70A and 70B can be set to +π/2 and −π/2, respectively, or +π and −π, respectively, and the number of combinations is not one.

Therefore, in the present embodiment, for example, in a case where the inclination of the image plane S2 is less than a predetermined threshold value, the control unit 22 does not perform control for matching the inclination of the image plane S2 to the inclination of the imaging surface 16A. That is, in a case where the inclination of the image plane S2, that is, the inclination of the cultivation container 50, corresponds to flatness, the inclination of the image plane S2 matches the inclination of the imaging surface 16A. Thus, it is not necessary to deflect the ray by the ray deflection optical system 70. Accordingly, by not performing the matching control, occurrence of error caused by undetermined rotation angles ξ1 and ξ2 of the first and second wedge prisms 70A and 70B can be prevented.

Returning to FIG. 12, the reduction unit 80 configured with the eighth operation unit 15J and the control unit 22 moves the imaging unit 16 in a direction of resolving positional shifts Δx and Δy by the positional shifts Δx and Δy between the optical axis of light passing through the ray deflection optical system 70 and the center of the imaging surface 16A as illustrated in FIG. 17 by causing the control unit 22 to drive the eighth operation unit 15J. Accordingly, the positional shift is resolved. Thus, the effect of the positional shift on the image formed on the imaging surface 16A based on the observation target light can be reduced. While Δy is not illustrated in FIG. 17, in actuality, the positional shift Δy may also occur in the Y direction.

Next, returning to FIG. 8, in step S6, the control unit 22 moves the observation region R toward a position at which the position of the cultivation container 50 is detected by the first displacement sensor 18a by driving the horizontal direction drive unit 17.

In step S7, the control unit 22 acquires the focus control amount stored in the secondary storage unit 25B immediately before the observation region R reaches the position at which the position of the cultivation container 50 is detected.

Next, in step S8, the control unit 22 performs the auto focus control based on the acquired focus control amount. That is, the control unit 22 changes the focal lengths of the image-forming lens 14d, the objective lens 14b, and the ray deflection optical system 70 and moves the image-forming lens 14d, the imaging unit 16, the stage 51, and the objective lens 14b in the Z direction by controlling the first operation unit 15A to the seventh operation unit 15G based on the acquired focus control amount.

After the auto focus control, in step S9, the imaging unit 16 captures the phase difference image immediately before a timing of moment at which the observation region R reaches the position at which the position of the cultivation container 50 is detected. The phase difference image of the observation region R is output to the control unit 22 from the imaging unit 16 and is stored. In the present embodiment, as described above, the position of the cultivation container 50 is detected prior to each observation region R, and the phase difference image is captured immediately before a timing of moment at which the observation region R reaches the detected position. Detection of the position of the cultivation container 50 and capturing of the phase difference image are performed while the observation region R is moved. Capturing of the phase difference image of the observation region R at a certain position is performed in parallel with detection of the position of the cultivation container 50 at a position on the forward side of the movement direction from the certain position.

That is, while focus control and capturing of the phase difference image of the observation region R are performed in steps S7 to S9, detection of the position of the cultivation container 50 by the detection unit 18 at a position on the forward side of the movement direction from the observation region R, acquisition and storage of the focus control amount by the focus adjustment unit 24, and acquisition of the rotation angles 1 and 2 of the first and second wedge prisms 70A and 70B in the inclination control processing performed by the control unit 22 are performed in parallel. Rotational driving of the first and second wedge prisms 70A and 70B based on the rotation angles ξ1 and ξ2 of the first and second wedge prisms 70A and 70B in the inclination control processing performed by the control unit 22 is performed after imaging is performed by the imaging unit 16 in step S9.

In step S10, in a case where the observation region R is not moved to a range R2 of an acceleration and deceleration region illustrated in FIG. 9 after the control unit 22 drives the horizontal direction drive unit 17, a negative determination is made, and a transition is made to step S2 illustrated in FIG. 8.

In step S10, in a case where the observation region R is moved to the range R2 of the acceleration and deceleration region illustrated in FIG. 9, is moved in the Y direction, and then, is moved in the opposite direction in the X direction after the control unit 22 drives the horizontal direction drive unit 17, that is, in a case where the movement direction of the observation region R is changed from the arrow direction in FIG. 10 to the arrow direction in FIG. 11 by the control unit 22, a positive determination is made, and a transition is made to step S11 illustrated in FIG. 8.

In step S11, the control unit 22 switches a displacement sensor to be used from the first displacement sensor 18a to the second displacement sensor 18b.

In the present embodiment, as described above, the Z direction position of the cultivation container 50 is detected in advance for each observation region R. Thus, a detection timing of the position of the cultivation container 50 in each observation region R is temporally shifted from a capturing timing of the phase difference image. Accordingly, after the position of the cultivation container 50 is detected by the first displacement sensor 18a or the second displacement sensor 18b, the auto focus control is performed before the observation region R reaches the detected position.

In a case where the timing of the auto focus control is excessively early, there is a possibility that the focus position is shifted by a shift in Z direction position of the cultivation container 50 due to any cause before the observation region R reaches the detected position after the auto focus control.

Figure 20:
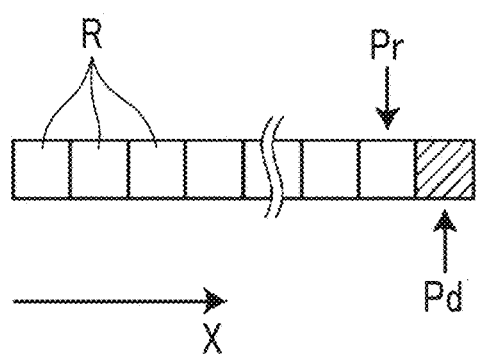
FIG. 20 is a diagram for describing one example of a timing of auto focus control performed by the control unit included in the microscope apparatus according to the first embodiment.

Accordingly, the timing of the auto focus control is desirably a timing that is immediately before the observation region R reaches the detected position and at which capturing of the phase difference image at the detected position is performed in time. For example, as illustrated in FIG. 20, in a case where the observation region R is sequentially moved in the X direction and the detected position of the detection unit 18 is a position Pd illustrated by diagonal lines, the timing immediately before the observation region R reaches the detected position is desirably between a timing immediately before a timing of moment at which the observation region R passes through a position Pr of the observation region R adjacent to the detected position Pd and a timing before the observation region R reaches the detected position Pd. The auto focus control may be performed immediately before a timing of moment at which the observation region R reaches the detected position Pd.

In the present embodiment, a time from the detection timing of the first or second displacement sensor 18a or 18b to the timing of the auto focus control using the positional information of the detected position is preset such that the timing of the auto focus control is set to the desirable timing.

For example, in a case where the movement speed of the stage 51 is changed by a change in magnification ratio of the phase difference lens 14a, the preset time may be changed in accordance with the change in movement speed of the stage 51. Alternatively, instead of changing the time, in a case where the movement speed of the stage 51 is changed, the distance between the first displacement sensor 18a or the second displacement sensor 18b and the imaging optical system 14 may be changed by moving the first displacement sensor 18a or the second displacement sensor 18b in the X direction.

As in the present embodiment, in the case of linearly disposing the first displacement sensor 18a and the second displacement sensor 18b in the X direction with the imaging optical system 14 interposed therebetween and detecting the position of the cultivation container 50 prior to capturing of the phase difference image, as illustrated in FIG. 9, it is necessary to relatively move the imaging optical system 14, the first displacement sensor 18a, and the second displacement sensor 18b to ranges R1 and R2 on the outer side of the X direction from the range of the cultivation container 50 in order to perform detection of the position of the cultivation container 50 and capturing of the phase difference image in the entire range of the cultivation container 50. In addition, it is necessary to secure at least the X direction interval between the first displacement sensor 18a and the imaging optical system 14 as the X direction width of the range R1, and it is necessary to secure at least the X direction interval between the second displacement sensor 18b and the imaging optical system 14 as the X direction width of the range R2. In addition, in order to set the movement time of the observation region R as short as possible, it is desirable to set the movement range of the observation region R as narrow as possible. Accordingly, the X direction width of the range R1 is desirably set as the X direction interval between the first displacement sensor 18a and the imaging optical system 14, and the X direction width of the range R2 is desirably set as the X direction interval between the second displacement sensor 18b and the imaging optical system 14.

In a case where the observation region R is moved in the range of the cultivation container 50 by moving the stage 51 in the X direction, the movement speed of the observation region R in the range of the cultivation container 50 is desirably constant. Accordingly, when movement of the stage 51 in the X direction is started, it is necessary to accelerate the stage 51 to a constant speed. When movement of the stage 51 in the X direction is finished, it is necessary to decelerate and stop the stage 51 from the constant speed.

In a case where the movement speed of the stage 51 in the X direction is set to the constant speed, control for setting the constant speed can be quickly performed almost without an acceleration region. However, in the case of performing such control, the liquid surface of a cultivation liquid or the like accommodated in the cultivation container 50 together with the cell fluctuates, and there is a possibility of a decrease in image quality of the phase difference image. In addition, there is a possibility of occurrence of the same problem in the case of stopping the stage 51.

Therefore, in the present embodiment, the range R1 and the range R2 illustrated in FIG. 9 are set as acceleration and deceleration regions of movement of the stage 51 in the X direction. By setting the acceleration and deceleration regions on both sides of the range of the cultivation container 50 in the X direction, the observation region R can be moved at the constant speed in the range of the cultivation container 50 without unnecessarily increasing a scanning range based on the observation region R. Furthermore, the above fluctuation of the liquid surface of the cultivation liquid can be reduced.

In step S12, the processing unit 23B determines whether or not the entire scanning is finished. In step S12, in a case where the entire scanning is not finished, a negative determination is made, and a transition is made to step S2 illustrated in FIG. 8. Each time the control unit 22 moves the observation region R to the ranges R1 and R2 of the acceleration and deceleration regions, the control unit 22 switches the displacement sensor to be used. The processing of step S2 to step S11 is repeatedly performed until the entire scanning is finished.

In step S12, in a case where the entire scanning is finished, that is, in a case where the observation region R reaches the position of the scanning end point E illustrated in FIG. 9 by the control unit 22, a positive determination is made, and the control unit 22 finishes the entire scanning.

After the control unit 22 finishes the entire scanning, in step S13, the processing unit 23B generates the combined phase difference image by combining the phase difference image of each observation region R.

Next, in step S14, the control unit 22 displays the combined phase difference image generated by the processing unit 23B on the display device 30.

In the present embodiment, by causing the control unit 22 to independently rotate each of the first and second wedge prisms 70A and 70B, control for matching the inclination of the image plane S2 on which the optical image is formed to the inclination of the imaging surface 16A is performed by deflecting the ray that has passed through the image-forming lens 14d. Accordingly, the focus adjustment unit 24 can set the focal position to even the edge part portion in the observation region. Thus, even in a case where the bottom surface of the cultivation container 50 is inclined, blurriness of the image of the edge part portion in the observation region of the imaging optical system 14 can be reduced.

Furthermore, in the present embodiment, at least one of the stage 51 on which the cultivation container 50 is installed or the imaging optical system 14 is moved in the main scanning direction and the sub-scanning direction, and at least the one reciprocates in the main scanning direction. Accordingly, a scanning time based on the observation region R can be shortened compared to the scanning time in a case where scanning based on the observation region R is performed by moving the stage 51 in only one direction.

Furthermore, in the present embodiment, the vertical direction position of the cultivation container 50 at a position on the forward side of the movement direction of the observation region from the position of the observation region of the imaging optical system 14 with respect to the cultivation container 50 is detected using at least one of the displacement sensors 18a and 18b, and the auto focus control is performed by the first to seventh operation units 15A to 15G based on the detected vertical direction position of the cultivation container 50. Thus, the auto focus control can be performed at a high speed compared to the auto focus control in a case where the auto focus control is performed based on the contrast of the captured image.

Furthermore, in the present embodiment, the displacement sensor to be used is switched in accordance with a change in movement direction of the observation region R. Thus, even in a case where the observation region reciprocates, the position of the cultivation container 50 can be always detected prior to capturing of the image.

In addition, by using a plurality of operation units among the first to seventh operation units 15A to 15G, the auto focus control can be performed at a higher speed than the auto focus control in a case where the auto focus control is performed by only one operation unit.

While the ray deflection optical system 70 is illustrated as including two wedge prisms in the first embodiment, the technology of the present disclosure is not limited thereto. For example, the ray deflection optical system 70 may include three wedge prisms or may include a plurality of wedge prism pairs. In a case where the ray deflection optical system 70 includes a first wedge prism, a second wedge prism, and a third wedge prism, the control unit 22 performs first correction control for correcting an overall inclination of the image plane S2 on the first wedge prism and performs second correction control for correcting a partially changing inclination of the image plane S2 on the second wedge prism and the third wedge prism. The first correction control and the second correction control are such that correction based on the first correction control is correction based on one fixed correction value with respect to one cultivation container 50 and correction based on the second correction control is correction based on a plurality of correction values respectively corresponding to locally changing inclinations in one cultivation container 50.

Specifically, for example, in a case where the cultivation container 50 is installed on the stage 51, the overall cultivation container 50 is inclined in a case where the stage 51 is inclined. Therefore, for example, the control unit 22 performs the first correction control for correcting the inclination of the image plane S2 caused by the overall inclination of the cultivation container 50 by rotating the first wedge prism. After performing the first correction control, the control unit 22 performs the second correction control for correcting the inclination of the image plane S2 caused by, for example, roughness, distortion, and/or bending of the bottom surface of the well W excluded from the correction based on the first correction control by further rotating the second wedge prism and the third wedge prism. A correction amount in the second correction control can be decreased by performing the correction based on the first correction control first. Thus, a time required for correcting the inclination can be shortened compared to the time for the ray deflection optical system 70 including two wedge prisms. The overall inclination of the image plane S2 includes not only an inclination caused by the overall inclination of the cultivation container 50 but also an inclination caused by an overall inclination of the imaging surface 16A and/or an inclination caused by the imaging optical system 14.

In the first embodiment, as illustrated in FIG. 17, the reduction unit 80 is illustrated as moving the imaging unit 16 in the direction of resolving the positional shifts Δx and Δy by the positional shifts Δx and Δy between the optical axis of light passing through the ray deflection optical system 70 and the center of the imaging surface 16A. However, the technology of the present disclosure is not limited thereto. For example, only the imaging element of the imaging unit 16 may be moved, or any configuration may be used as long as the imaging element can be relatively moved with respect to the cultivation container 50 and the imaging optical system 14.

In the first embodiment, the microscope apparatus main body 10 is configured to include the reduction unit 80 that reduces the effect of the positional shift between the optical axis of light passing through the ray deflection optical system 70 and the center of the imaging surface 16A on the image formed on the imaging surface 16A based on the observation target light. However, the technology of the present disclosure is not limited thereto. While including the reduction unit 80 can acquire a more suitable image by the imaging unit 16, the reduction unit 80 is not necessarily included.

In the first embodiment, the operation unit 15 includes the plurality of first to seventh operation units 15A to 15G to be used for the auto focus control. However, the technology of the present disclosure is not limited thereto as long as at least the seventh operation unit 15G is included. In a case where the operation unit 15 includes at least one of the first to sixth operation units 15A to 15F besides the seventh operation unit 15G, the seventh operation unit 15G may include only the rotation mechanism 70b and the drive source 70c-2 illustrated in FIG. 6.

In the first embodiment, the operation unit 15 includes the plurality of first to seventh operation units 15A to 15G to be used for the auto focus control and performs the auto focus control using all of the first to seventh operation units 15A to 15G. However, the technology of the present disclosure is not limited thereto. The auto focus control may be performed using at least one of the first to seventh operation units 15A to 15G.

In the first embodiment, the operation unit 15 includes the plurality of first to seventh operation units 15A to 15G to be used for the auto focus control and performs the auto focus control using all of the first to seventh operation units 15A to 15G. However, the technology of the present disclosure is not limited thereto. The operation unit 15 may include at least the rotation mechanism 70b and the drive source 70c-2 of the seventh operation unit 15G illustrated in FIG. 6 and the first to sixth operation units 15A to 15F and one or more of the movement mechanism 70a and the drive source 70c-1 of the seventh operation unit 15G illustrated in FIG. 6. In this case, the auto focus control may be performed using at least one operation unit without using all of the included operation units for the auto focus control.

In the first embodiment, the ray deflection optical system 70 is arranged between the imaging optical system 14 and the imaging unit 16. Alternatively, the ray deflection optical system 70 may be arranged between the imaging optical system 14 and the stage 51.

In the first embodiment, a focal length changing optical system that includes an optical element having a changeable focal length like a liquid lens, a liquid crystal lens, and a shape deformation lens may be arranged between the imaging optical system 14 and the stage 51. In this case, a voltage applied to the focal length changing optical system is changed by the operation unit 15, and the focal length of the focal length changing optical system is changed.

In the first embodiment, the cultivation container 50 is moved in the optical axis direction by moving the stage 51 in the optical axis direction by the fourth operation unit 15D. However, instead of moving the stage 51 in the optical axis direction, only the cultivation container 50 may be moved in the optical axis direction by disposing a mechanism that moves the cultivation container 50 in the optical axis direction.

Second Embodiment

The reduction unit 80 is configured with the eighth operation unit 15J and the control unit 22 in the first embodiment. In a second embodiment, a microscope apparatus 1-2 including a microscope control device 20-2 that includes an image processing unit 29 as one example of the reduction unit 80 will be described. In the second embodiment, the same constituents as the constituents described in the first embodiment will be designated by the same reference signs, and descriptions of the constituents will not be repeated.

Figure 21:
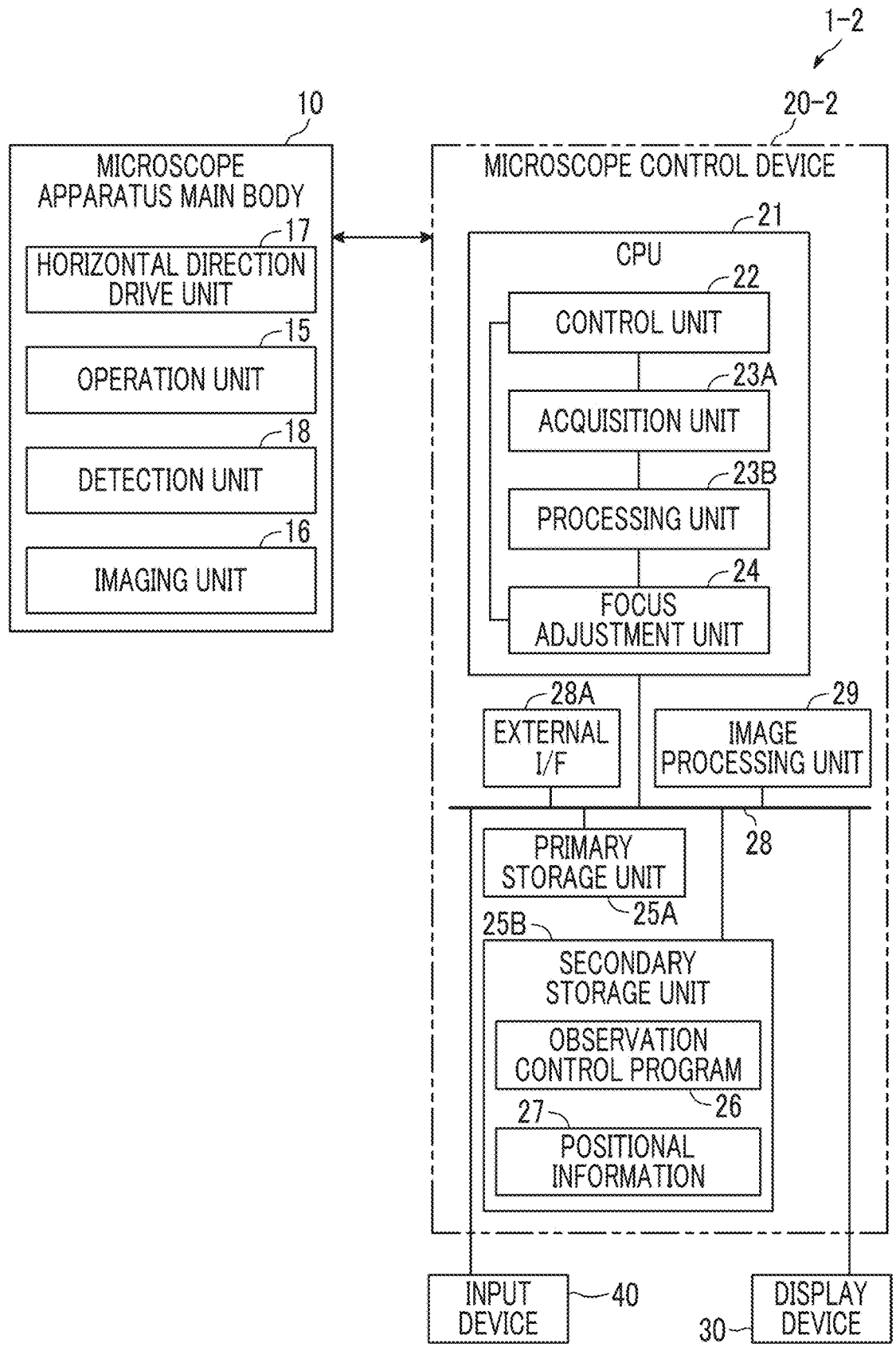
FIG. 21 is a block diagram illustrating one example of a configuration of a microscope apparatus according to a second embodiment.

For example, as illustrated in FIG. 21, in the microscope apparatus 1-2 according to the second embodiment, the image processing unit 29 is connected to the busline 28.

As illustrated in FIG. 17, the image processing unit 29 sets the range of effective pixels of the imaging element forming the image by shifting the range by the positional shifts Δx and Δy between the optical axis of light passing through the ray deflection optical system 70 and the center of the imaging surface 16A with respect to the image formed on the imaging surface 16A based on the observation target light. Accordingly, the positional shift is resolved. Thus, the effect of the positional shift on the image formed on the imaging surface 16A based on the observation target light can be reduced.

Third Embodiment

Figure 22:
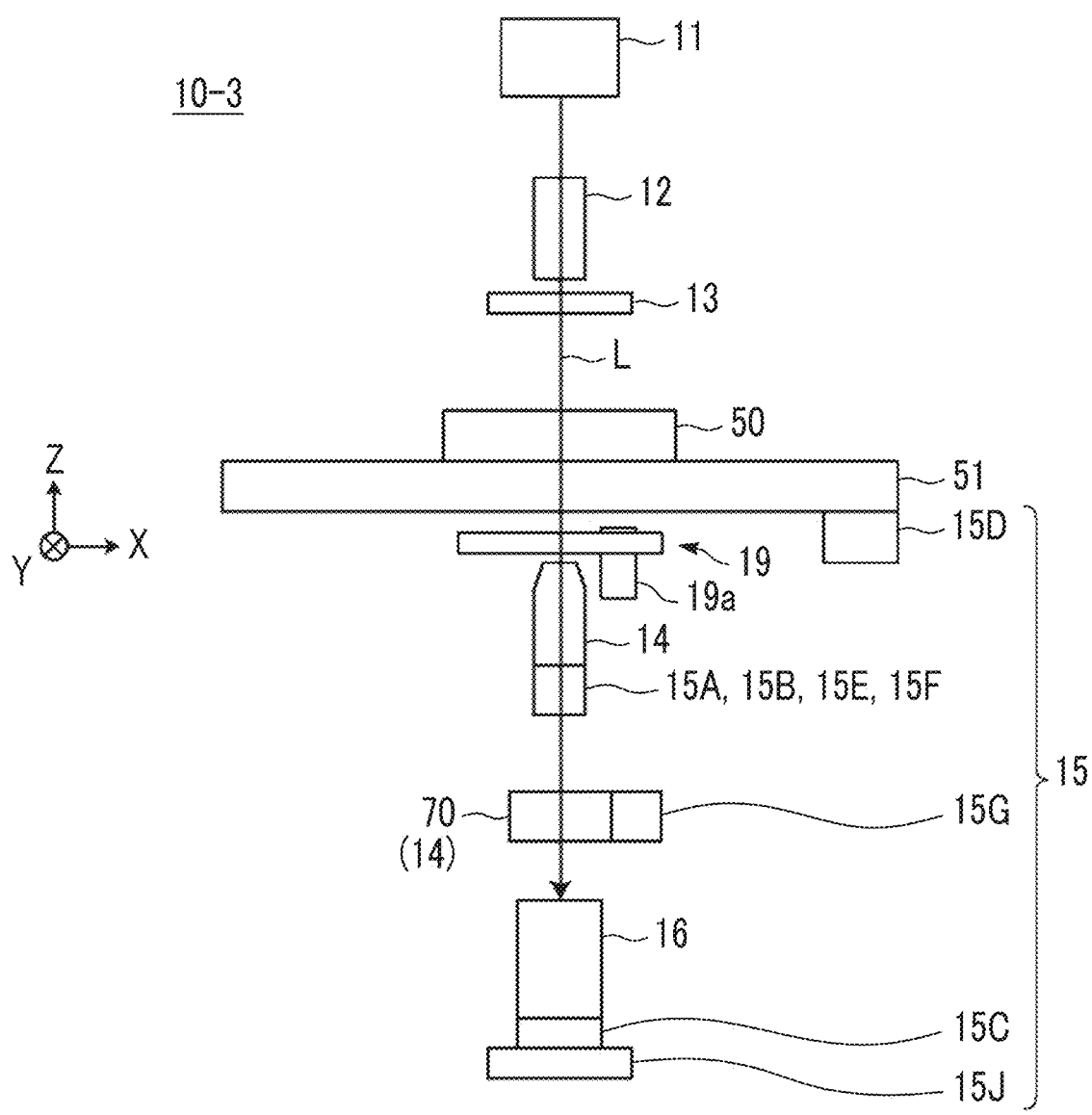
FIG. 22 is a schematic diagram illustrating one example of a configuration of a microscope apparatus according to a third embodiment.

In the first embodiment, the detection unit 18 comprises the second displacement sensors 18a and 18b, and the displacement sensors 18a and 18b to be used are switched in accordance with a change in movement direction of the observation region R. In the third embodiment, for example, as illustrated in FIG. 22, a case where a detection unit 19 of a microscope apparatus main body 10-3 includes one displacement sensor 19a and switches the position of the displacement sensor in accordance with a change in movement direction of the observation region R will be described. In the third embodiment, the same constituents as the constituents described in the first embodiment will be designated by the same reference signs, and descriptions of the constituents will not be repeated.

Figure 23:
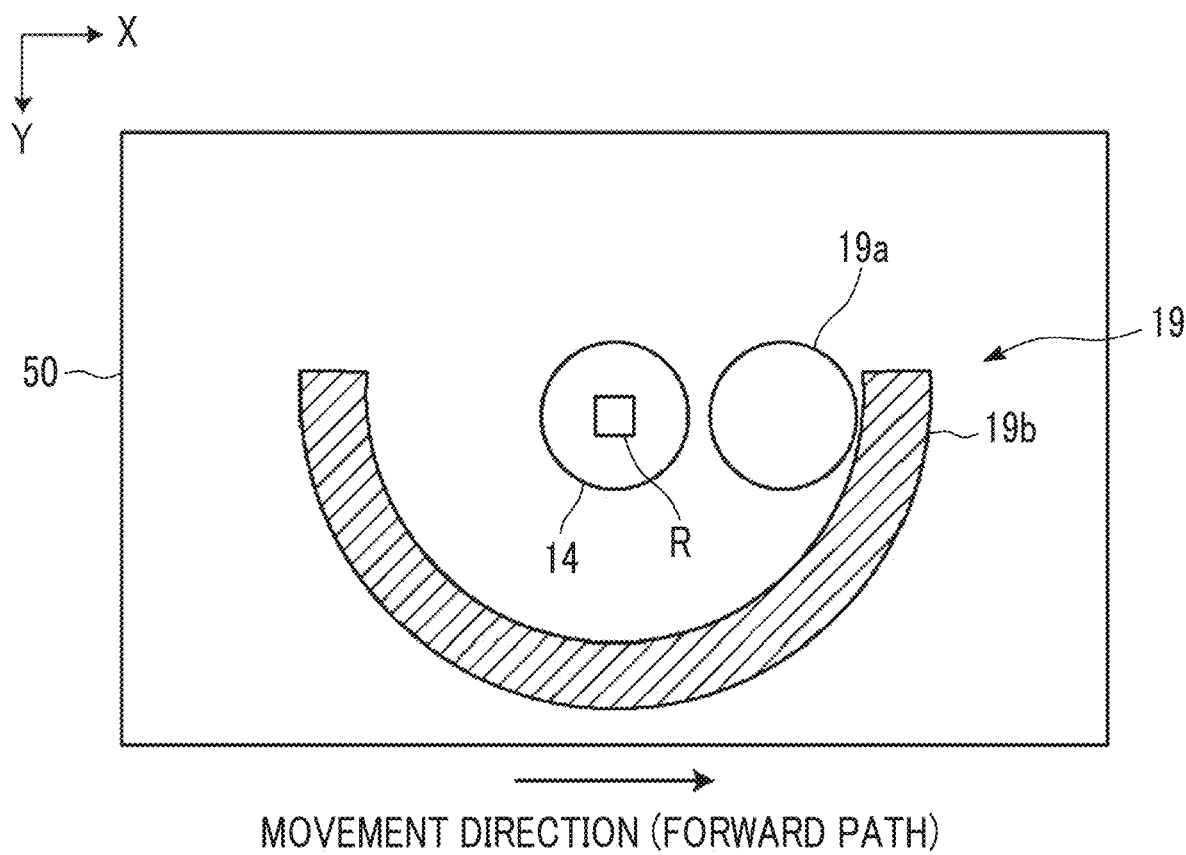
FIG. 23 is a diagram illustrating one example of a configuration of a detection unit of the microscope apparatus according to the third embodiment.
Figure 24:
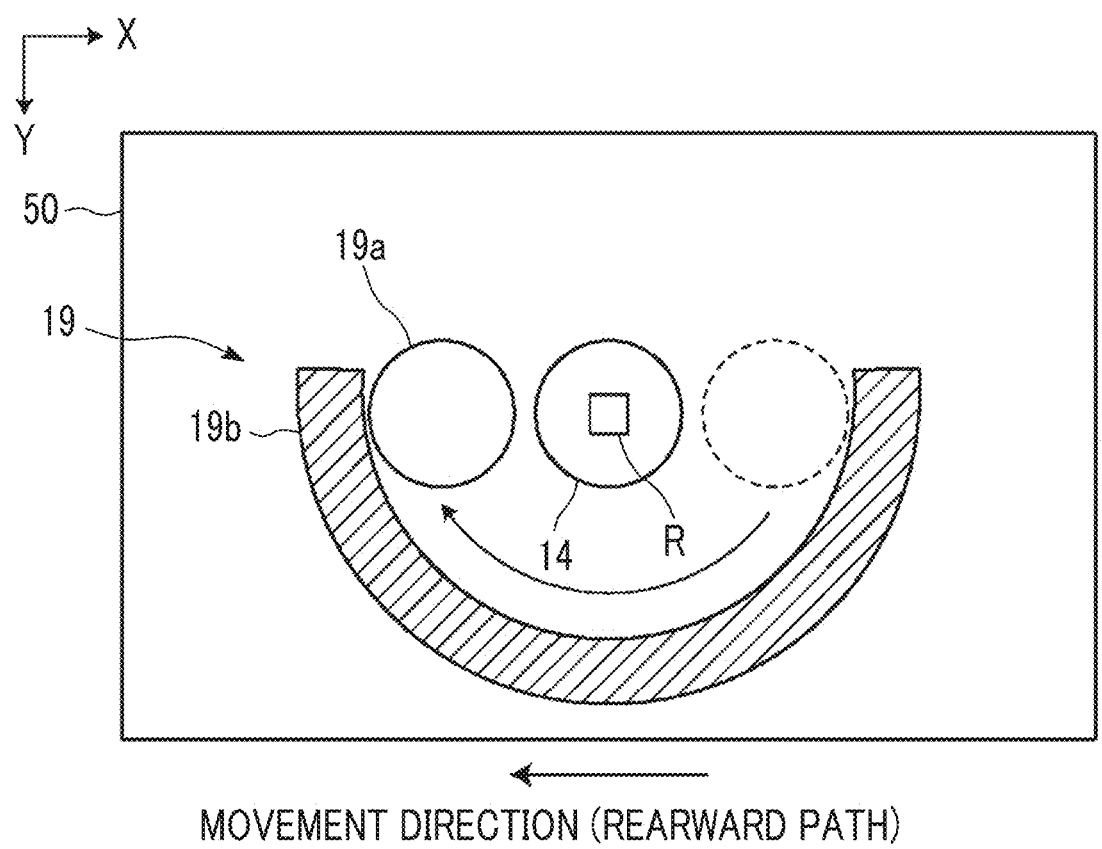
FIG. 24 is a diagram for describing one example of switching of a position of a displacement sensor in the microscope apparatus according to the third embodiment.

As illustrated in FIG. 23 and FIG. 24, the detection unit 19 comprises the displacement sensor 19a and a guide mechanism 19b that moves the position of the displacement sensor 19a by guiding the displacement sensor 19a.

The displacement sensor 19a is configured with a laser displacement sensor in the same manner as the first and second displacement sensors 18a and 18b of the first embodiment.

The guide mechanism 19b comprises a guide member having a semi-arc shape and moves the displacement sensor 19a along the guide member. The guide member moves the displacement sensor 19a from one side to the other side of the X direction with the imaging optical system 14 interposed therebetween.

FIG. 23 is a diagram illustrating the position of the displacement sensor 19a in a case where the movement direction of the observation region R is an arrow direction in FIG. 23 (rightward direction in FIG. 23). FIG. 24 is a diagram illustrating the position of the displacement sensor 19a in a case where the movement direction of the observation region R is an arrow direction in FIG. 24 (leftward direction in FIG. 24). In a case where the movement direction of the observation region R is changed from the arrow direction in FIG. 23 to the arrow direction in FIG. 24, the displacement sensor 19a is moved along the guide member of the guide mechanism 19b from the position illustrated in FIG. 23 and is switched to the position illustrated in FIG. 24.

In the present embodiment, the guide mechanism 19b is disposed as a displacement sensor movement mechanism that moves the position of the displacement sensor 19a. However, the configuration of the displacement sensor movement mechanism is not limited thereto, and other configurations may be used as long as the configuration can change the position of the displacement sensor 19a in the same manner.

Other configurations and effects of the microscope apparatus of the third embodiment are the same as the microscope apparatus of the first embodiment.

Fourth Embodiment

Figure 25:
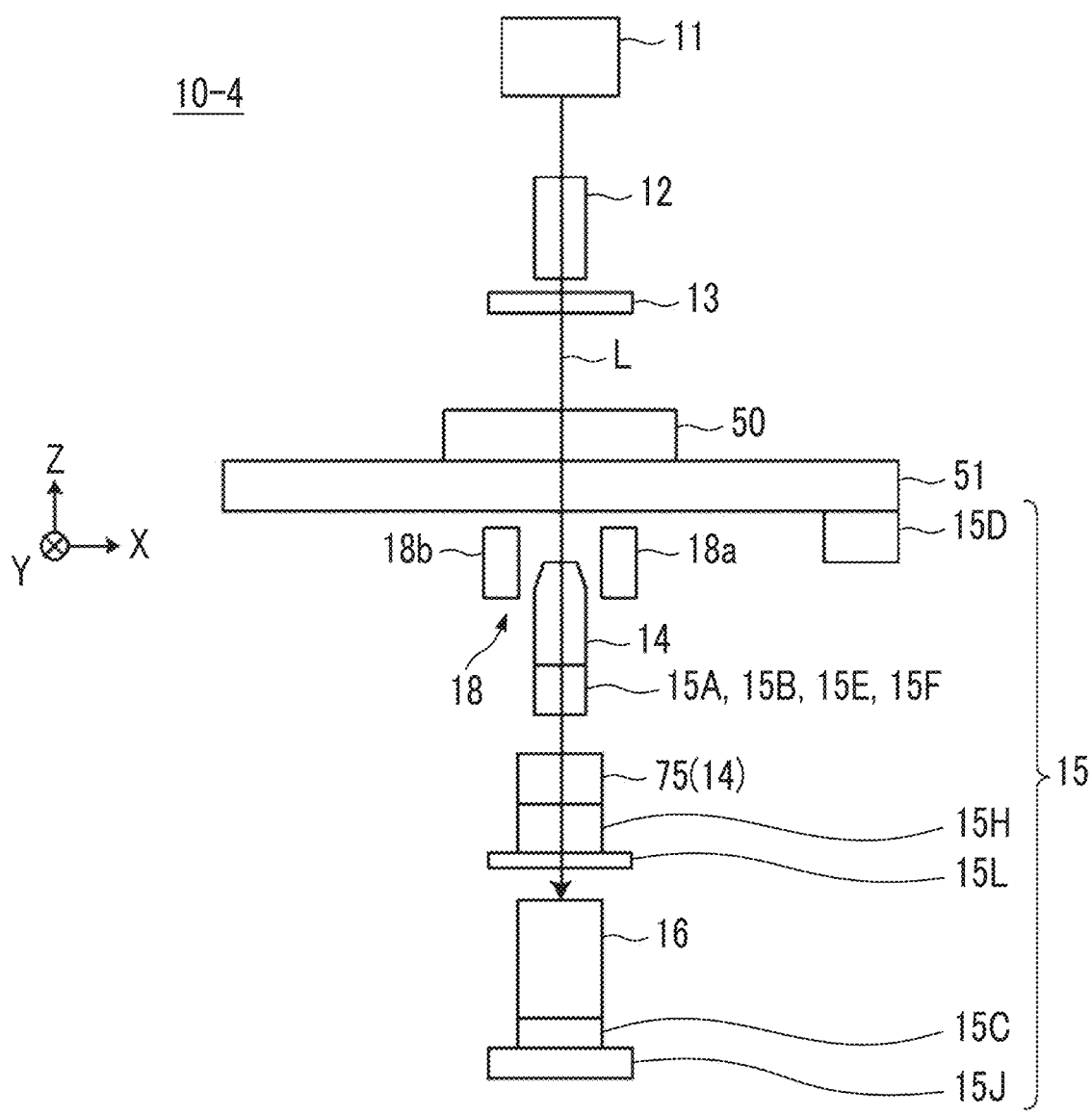
FIG. 25 is a schematic diagram illustrating one example of a configuration of a microscope apparatus according to a fourth embodiment.

In the first to third embodiments, the first and second wedge prisms 70A and 70B are used as the ray deflection optical system 70 for deflecting the ray. However, an optical element having a changeable focal length like a liquid lens, a liquid crystal lens, and a shape deformation lens may also be used as the ray deflection optical system. For example, instead of the ray deflection optical system 70 that moves the first and second wedge prisms 70A and 70B, a focal length changing optical system 75 that includes an optical element having a changeable focal length may be arranged between the imaging optical system 14 and the imaging unit 16 as illustrated in FIG. 25. In this case, a voltage applied to the focal length changing optical system 75 is changed by causing the control unit 22 to drive a ninth operation unit 15H based on the focus control amount, and the focal length is changed. For example, the ninth operation unit 15H includes a piezoelectric element and a drive source applying a high voltage and is driven based on the control signal output from the control unit 22. The configuration of the ninth operation unit 15H is not limited to the piezoelectric element as long as the focal length of the focal length changing optical system 75 can be changed. For example, various motors and/or solenoids may be included, or other well-known configurations can be used.

In addition, the ray is deflected by adjusting the motion of the lens constituting the focal length changing optical system 75 by causing the control unit 22 to drive a tenth operation unit 15L. The motion of the lens may be a motion of the inclination and/or the position or the like of the lens that can deflect the ray. For example, the tenth operation unit 15L includes a piezoelectric element and a drive source applying a high voltage and is driven based on the control signal output from the control unit 22 depending on the inclination of the image plane S2. Adjustment of the motion of the lens by the control unit 22 is one example of second control according to the embodiment of the technology of the present disclosure.

A table that shows a relationship between the inclination of the image plane S2 and an adjustment amount of the motion of the lens is prestored in the secondary storage unit 25B. The control unit 22 acquires the adjustment amount of the motion of the lens based on the inclination of the image plane S2 by referring to the table. The control unit 22 causes the tenth operation unit 15L to apply a voltage corresponding to the acquired adjustment amount of the motion of the lens. The technology of the present disclosure is not limited to the table, and any method may be used as long as the adjustment amount of the motion of the lens or an application amount of the voltage can be derived from the inclination of the image plane S2.

The ninth and tenth operation units 15H and 15L are configured to pass the phase difference image which has passed through the phase difference lens 14a and the image-forming lens 14d. The configuration of the tenth operation unit 15L is not limited to the piezoelectric element as long as the motion of the lens constituting the focal length changing optical system 75 can be adjusted. For example, various motors and/or solenoids may be included, or other well-known configurations can be used.

The focal length changing optical system 75 may be arranged between the imaging optical system 14 and the stage 51. In addition, the focal length changing optical system 75 may be arranged in addition to the ray deflection optical system 70 in the microscope apparatus 1 of the first embodiment. In the case of including both of the ray deflection optical system 70 and the focal length changing optical system 75, the control unit 22 presets a deflection amount to be deflected by the ray deflection optical system 70 and a deflection amount to be deflected by the focal length changing optical system 75 with respect to the deflection amount of the ray to be deflected based on the inclination of the image plane S2.

Fifth Embodiment

In the microscope apparatuses of the first and second embodiments, the Z direction position of the cultivation container 50 is detected by the detection units 18 and 19, and the auto focus control is performed using detected information. However, for example, in a case where the bottom portion of the cultivation container 50 is installed away from the installation surface of the stage 51, or in a case where bottom portion of the cultivation container 50 is thick, the distance between the imaging optical system 14 and the bottom surface of the cultivation container 50 is increased. Thus, even in a case where the focal lengths of the objective lens 14b and the image-forming lens 14d are adjusted as far as possible by the operation unit 15 and the image-forming lens 14d, the imaging unit 16, the stage 51, and the objective lens 14b are moved in the Z direction as far as possible, the position of the bottom surface of the cultivation container 50 may not fall in the range of the depth of field of the imaging optical system 14.

Therefore, it is desirable to perform calibration in advance such that the position of the bottom surface of the cultivation container 50 falls in the range of the depth of field of the imaging optical system 14 by the auto focus control.

Specifically, for example, in the microscope apparatus of the first embodiment, it is desirable to dispose a vertical direction movement mechanism that moves the imaging optical system 14, the operation unit 15 (that is, the first to eighth operation units 15A to 15J), the imaging unit 16, the stage 51, the first displacement sensor 18a, and the second displacement sensor 18b in the Z direction in an integrated manner.

Figure 26:
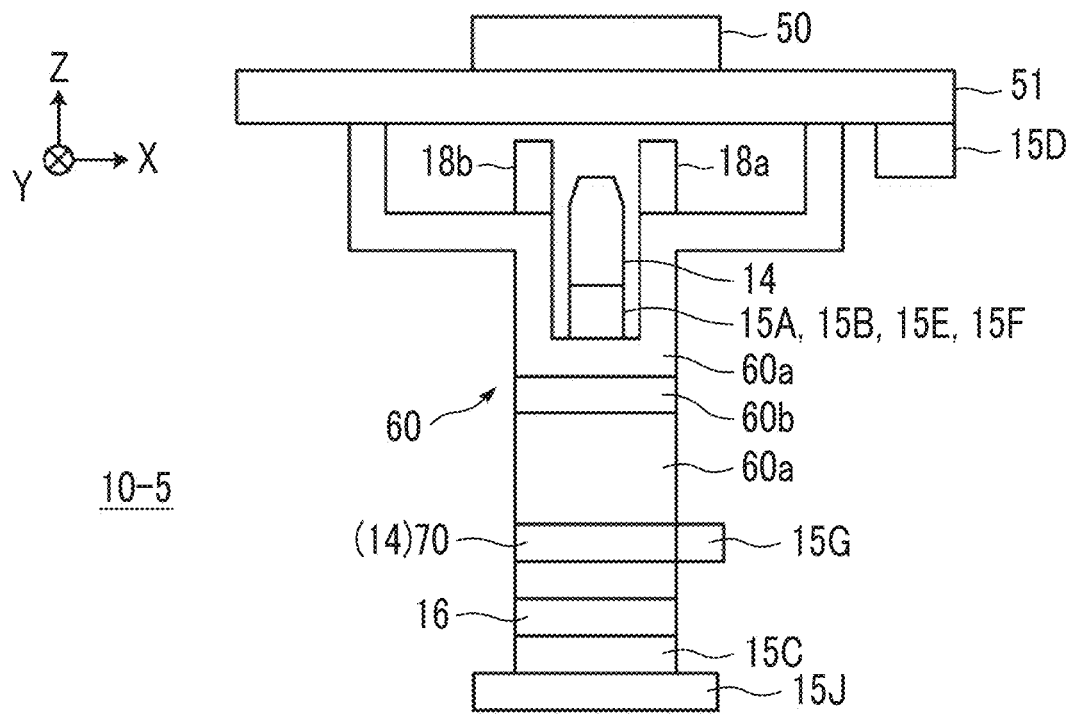
FIG. 26 is a schematic diagram illustrating one example of a configuration of a microscope apparatus according to a fifth embodiment.

In a microscope apparatus of the fifth embodiment, for example, as illustrated in FIG. 26, in a microscope apparatus main body 10-5, a vertical direction movement mechanism 60 comprises a holding unit 60a that holds the imaging optical system 14, the operation unit 15, the imaging unit 16, the stage 51, the first displacement sensor 18a, and the second displacement sensor 18b in an integrated manner, and a Z direction drive unit 60b that moves the holding unit 60a in the Z direction.

The holding unit 60a holds the imaging optical system 14, the operation unit 15, the imaging unit 16, the stage 51, the first displacement sensor 18a, and the second displacement sensor 18b in a state where a relative positional relationship therebetween is maintained. The Z direction drive unit 60b comprises an actuator such as a piezoelectric element. The vertical direction movement mechanism 60 is configured to pass the phase difference image formed by the imaging optical system 14.

Before capturing of the phase difference image, calibration of the auto focus control is performed by moving the imaging optical system 14, the operation unit 15, the imaging unit 16, the stage 51, the first displacement sensor 18a, and the second displacement sensor 18b in the Z direction in an integrated manner using the vertical direction movement mechanism 60.

In calibration, specifically, first, by driving the operation unit 15, the focal lengths of the objective lens 14b and the image-forming lens 14d are set to a reference focal length, and the Z direction positions of the image-forming lens 14d, the imaging unit 16, the stage 51, and the objective lens 14b are set to a reference position. The reference focal length is a focal length as a reference in the auto focus control and is a focal length as the center value between the maximum focal length and the minimum focal length of the objective lens 14b and the image-forming lens 14d. The Z direction reference position is a position as a reference in the auto focus control and is the center position of the Z direction movement range of the image-forming lens 14d, the imaging unit 16, the stage 51, and the objective lens 14b. In the case of calibration, the position of the ray deflection optical system 70 in a direction orthogonal to the Z direction is set as the reference position. The reference position in the direction orthogonal to the Z direction is the center position of the movement range of the first and second wedge prisms 70A and 70B constituting the ray deflection optical system 70 in the direction orthogonal to the Z direction.

Next, while the holding unit 60a is moved in the Z direction stepwise at predetermined intervals by the Z direction drive unit 60b, the image formed by the imaging optical system 14 is detected by the imaging unit 16 at each position of movement, and the phase difference image of each position is acquired. A position at which the contrast of the phase difference image is maximum is detected. As the position at which the contrast of the phase difference image is maximum, for example, a position at which the phase difference image is not focused anymore in the case of sequentially moving the holding unit 60a upward in the vertical direction, and a position at which the phase difference image is not focused anymore in the case of sequentially moving the holding unit 60a downward in the vertical direction are detected, and the center position between the detected positions may be detected as the position at which the contrast of the phase difference image is maximum. At this point, the focal lengths of the objective lens 14b and the image-forming lens 14d may be changed. In the present embodiment, calibration is performed in a state where the focal lengths of the objective lens 14b and the image-forming lens 14d are fixed at the reference focal length.

The position at which the contrast of the phase difference image is maximum is set as the reference position of the vertical direction movement mechanism 60, and calibration is finished. For example, calibration may be performed at the centroid position of the bottom portion of the cultivation container 50. Alternatively, calibration may be performed at a plurality of parts of the bottom portion of the cultivation container 50. In this case, the average of the reference positions detected at the plurality of parts, respectively, may be set as the final reference position.

Sixth Embodiment

Figure 27:
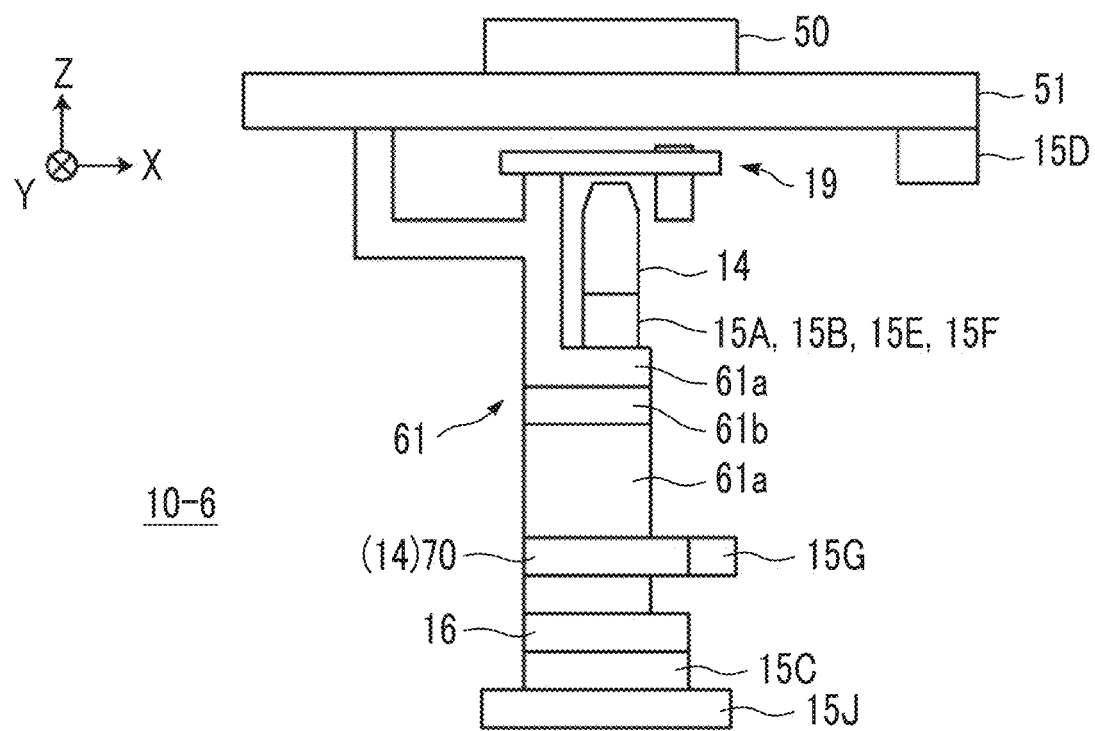
FIG. 27 is a schematic diagram illustrating one example of a configuration of a microscope apparatus according to a sixth embodiment.
Figure 28:
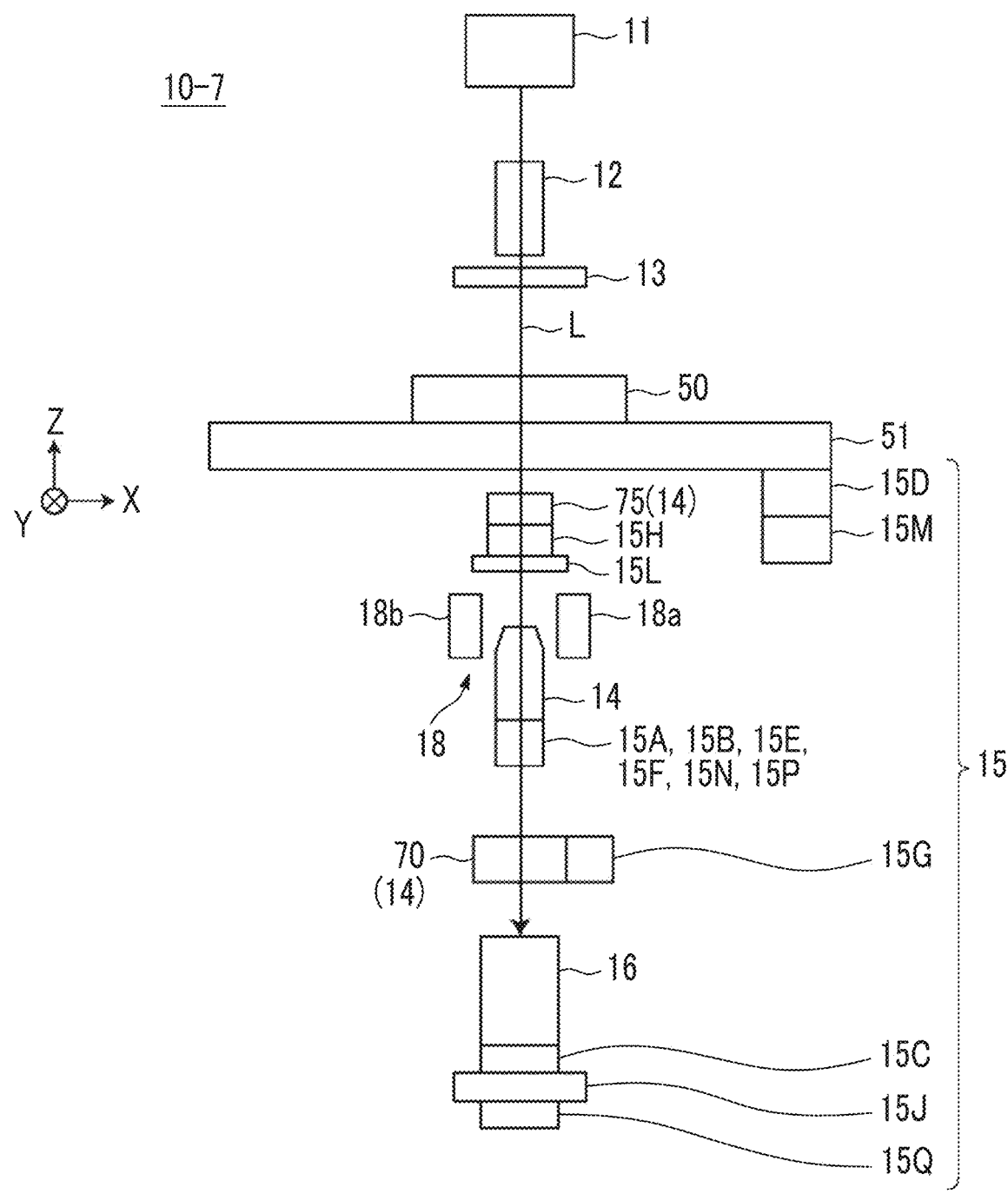
FIG. 28 is a schematic diagram illustrating one example of a configuration of a microscope apparatus according to a seventh embodiment.
Figure 29:
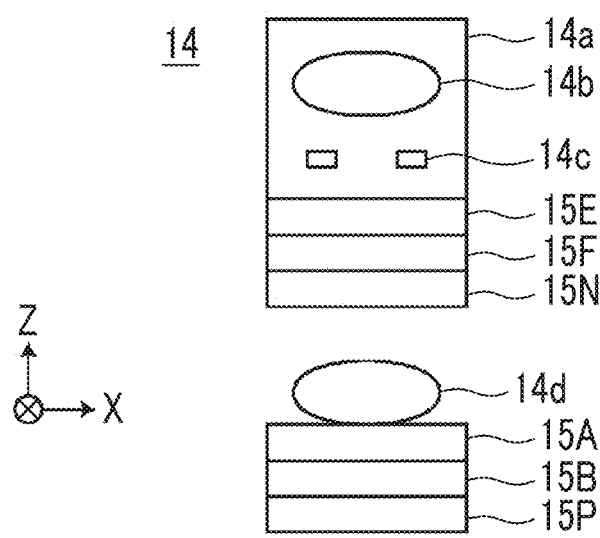
FIG. 29 is a schematic diagram illustrating one example of a configuration of an imaging optical system included in a microscope apparatus main body according to the seventh embodiment.

In a microscope apparatus of a sixth embodiment, for example, as illustrated in FIG. 27, in a microscope apparatus main body 10-6, a vertical direction movement mechanism 61 comprises a holding unit 61a that holds the imaging optical system 14, the operation unit 15, the imaging unit 16, the stage 51, and the detection unit 19 in an integrated manner, and a Z direction drive unit 61b that moves the holding unit 61a in the Z direction.

The holding unit 61a holds the imaging optical system 14, the operation unit 15, the imaging unit 16, the stage 51, and the displacement sensor 19a of the detection unit 19 in a state where a relative positional relationship therebetween is maintained. The Z direction drive unit 61b comprises an actuator such as a piezoelectric element in the same manner as the Z direction drive unit 60b.

A method of calibration in the microscope apparatus of the sixth embodiment is the same as the method of the microscope apparatus of the fifth embodiment. Thus, a detailed description of the method will not be repeated.

Seventh Embodiment

In a microscope apparatus of a seventh embodiment, the focal length changing optical system 75 is arranged between the imaging optical system 14 and the stage 51 in the microscope apparatus 1 of the first embodiment. In this case, the voltage applied to the focal length changing optical system 75 is changed by causing the control unit 22 to drive the ninth operation unit 15H based on the focus control amount, and the focal length is changed. In addition, the control unit 22 deflects the ray by adjusting the motion of the lens constituting the focal length changing optical system 75 by driving the tenth operation unit 15L based on the control signal output from the control unit 22 depending on the inclination of the image plane S2. The motion of the lens may be a motion of the lens such as the inclination and/or the position of the lens that can deflect the ray. Adjustment of the motion of the lens is one example of the second control according to the embodiment of the technology of the present disclosure. The ninth and tenth operation units 15H and 15L can be configured in the same manner as the microscope apparatus of the fourth embodiment.

Figure 30:
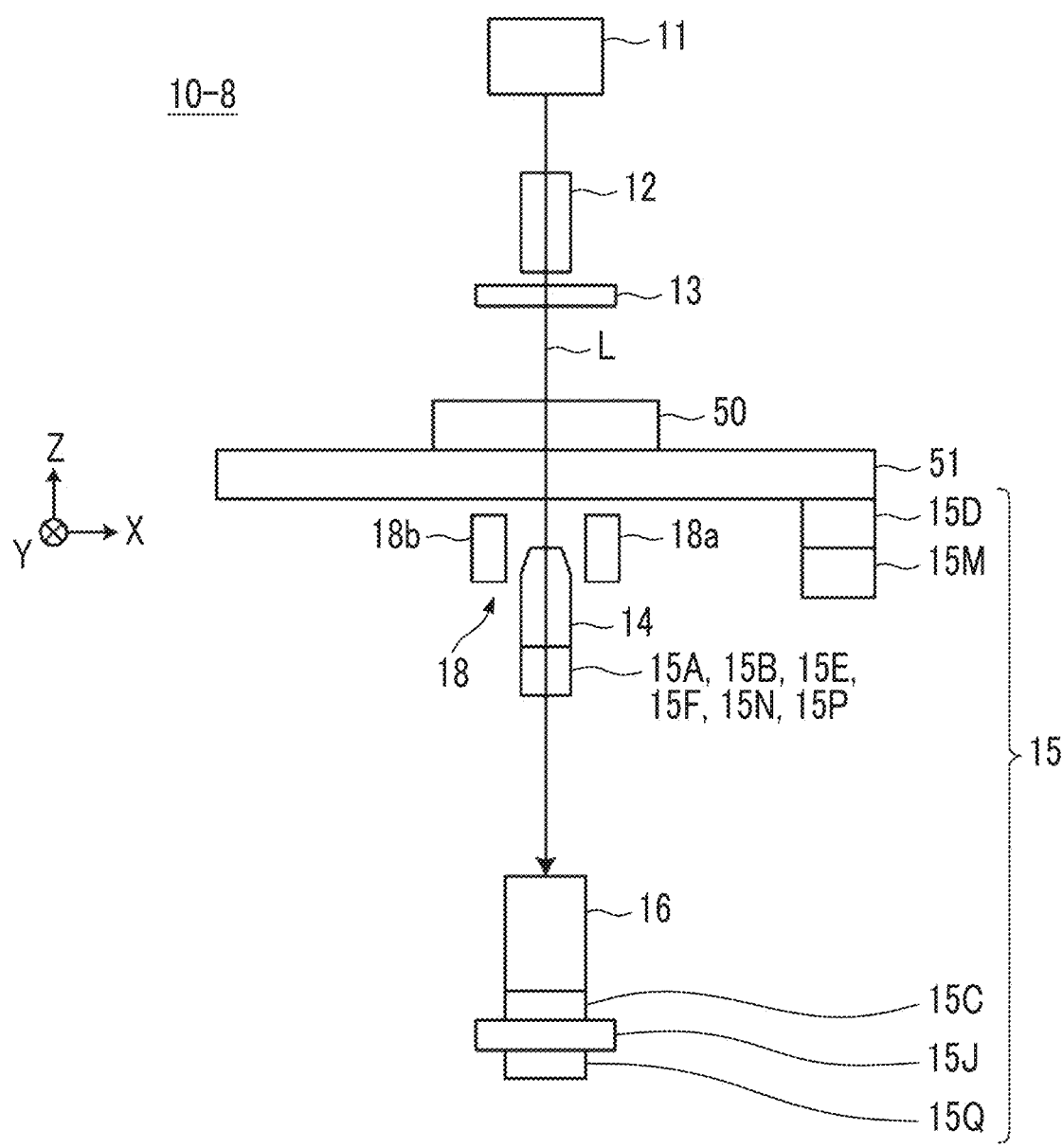
FIG. 30 is a schematic diagram illustrating one example of a configuration of a microscope apparatus according to an eighth embodiment.

In the microscope apparatus of the seventh embodiment, for example, as illustrated in FIG. 30, the operation unit 15 includes an eleventh operation unit 15N that adjusts the motion of the objective lens 14b, and a twelfth operation unit 15P that adjusts the motion of the image-forming lens 14d. The control unit 22 deflects the ray by adjusting the motion of the objective lens 14b by driving the eleventh operation unit 15N based on the control signal output from the control unit 22 depending on the inclination of the image plane S2. The control unit 22 deflects the ray by adjusting the motion of the image-forming lens 14d by driving the twelfth operation unit 15P based on the control signal output from the control unit 22 depending on the inclination of the image plane S2. The motion of each lens may be a motion of the lens such as the inclination and/or the position of the lens that can deflect the ray.

In the microscope apparatus of the seventh embodiment, the operation unit 15 includes a thirteenth operation unit 15M that adjusts the inclination of the stage 51. For example, the thirteenth operation unit 15M includes a piezoelectric element and a drive source applying a high voltage and is driven based on the control signal output by the control unit 22 depending on the inclination of the image plane S2. Adjustment of the inclination of the stage 51 by the control unit 22 is one example of first control according to the embodiment of the technology of the present disclosure. The configuration of the thirteenth operation unit 15M is not limited to the piezoelectric element as long as the stage 51 can be inclined. For example, various motors and/or solenoids may be included, or other well-known configurations can be used. In addition, while the stage 51 is inclined by the thirteenth operation unit 15M in the microscope apparatus of the seventh embodiment, the technology of the present disclosure is not limited thereto. Only the cultivation container 50 may be included by disposing a mechanism that inclines the cultivation container 50.

In the microscope apparatus of the seventh embodiment, the operation unit 15 includes a fourteenth operation unit 15Q that adjusts the inclination of the imaging unit 16. For example, the fourteenth operation unit 15Q includes a piezoelectric element and a drive source applying a high voltage and is driven based on the control signal output by the control unit 22 depending on the inclination of the image plane S2. Adjustment of the inclination of the imaging unit 16 by the control unit 22 is one example of third control according to the embodiment of the technology of the present disclosure. The configuration of the fourteenth operation unit 15Q is not limited to the piezoelectric element as long as the imaging unit 16 can be inclined. For example, various motors and/or solenoids may be included, or other well-known configurations can be used. In addition, while the imaging unit 16 is inclined by the fourteenth operation unit 15Q in the microscope apparatus of the seventh embodiment, the technology of the present disclosure is not limited thereto. Only the imaging element may be included by disposing a mechanism that inclines the imaging element.

In the microscope apparatus of the seventh embodiment, the seventh operation unit 15G, the tenth operation unit 15L, the eleventh operation unit 15N, the twelfth operation unit 15P, the thirteenth operation unit 15M, and the fourteenth operation unit 15Q are comprised in order to deflect the ray. The control unit 22 prestores a table that shows a relationship among the inclination of the image plane S2, the voltage applied to the lens constituting the focal length changing optical system 75, the voltage applied to the objective lens 14b, the voltage applied to the image-forming lens 14d, a drive amount of the inclination of the stage 51, a drive amount of the inclination of the imaging unit 16, and the rotation amount of the ray deflection optical system 70 in the secondary storage unit 25B. The control unit 22 acquires a control amount of each operation unit based on the table and drives each operation unit based on the acquired control amount.

By causing the control unit 22 to drive the plurality of operation units, the deflection amount of the ray that can be deflected can be increased compared to the deflection amount obtained by driving one operation unit.

The technology of the present disclosure is not limited to the table. For example, an expression may be used. Any method may be used for showing the relationship as long as the voltage applied to the lens constituting the focal length changing optical system 75, the voltage applied to the objective lens 14b, the voltage applied to the image-forming lens 14d, the drive amount of the inclination of the stage 51, the drive amount of the inclination of the imaging unit 16, and the rotation amount of the ray deflection optical system 70 can be derived from the inclination of the image plane S2.

In the microscope apparatus of the seventh embodiment, the ray is deflected by driving all of the seventh operation unit 15G, the tenth operation unit 15L, the eleventh operation unit 15N, the twelfth operation unit 15P, the thirteenth operation unit 15M, and the fourteenth operation unit 15Q. However, the technology of the present disclosure is not limited thereto as long as at least one operation unit is driven. In addition, in the case of driving the plurality of operation units, a combination of operation units is not particularly limited.

In the microscope apparatus of the seventh embodiment, the operation unit 15 includes the seventh operation unit 15G, the tenth operation unit 15L, the eleventh operation unit 15N, the twelfth operation unit 15P, the thirteenth operation unit 15M, and the fourteenth operation unit 15Q. However, the technology of the present disclosure is not limited thereto as long as at least one operation unit is comprised.

Eighth Embodiment

In a microscope apparatus of an eighth embodiment, the focal length changing optical system 75, the tenth operation unit 15L, the ray deflection optical system 70, and the seventh operation unit 15G are not comprised in the microscope apparatus 1 of the seventh embodiment. In the microscope apparatus of the eighth embodiment, the ray can be deflected without newly disposing the focal length changing optical system 75 and the ray deflection optical system 70. Thus, cost required for the focal length changing optical system 75, the ray deflection optical system 70, and the operation unit or driving each optical system can be reduced.

Figure 31:
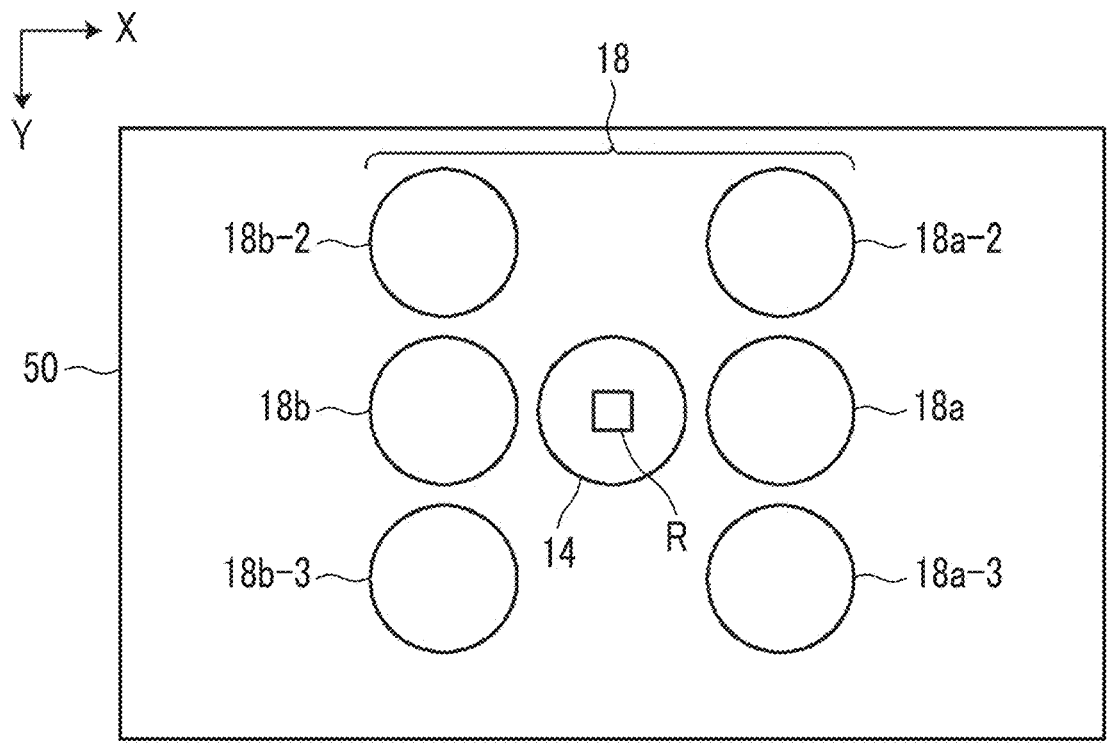
FIG. 31 is a diagram illustrating one example of a configuration of a detection unit of the microscope apparatus according to the first, second, fourth, fifth, seventh, and eighth embodiments.

In the microscope apparatuses of the first, second, fourth, fifth, seventh, and eighth embodiments, the first displacement sensor 18a and the second displacement sensor 18b are linearly disposed in the X direction with the phase difference lens 14a interposed therebetween. Furthermore, as illustrated in FIG. 31, a fifth displacement sensor 18a-2 and a sixth displacement sensor 18a-3 may be linearly disposed in the Y direction with the first displacement sensor 18a interposed therebetween, and a seventh displacement sensor 18b-2 and a eighth displacement sensor 18b-3 may be linearly disposed in the Y direction with the second displacement sensor 18b interposed therebetween. In this case, the control unit 22 causes the first, fifth, and sixth displacement sensors 18a, 18a-2, and 18a-3 to perform detection at the same time and causes the second, seventh, and eighth displacement sensors 18b, 18b-2, and 18b-3 to perform detection at the same time.

Accordingly, in a case where the observation region R reciprocates, the acquisition unit 23A can acquire a plurality of pieces of Z direction positional information of the bottom surface of the cultivation container 50 in the Y direction. Thus, the Y direction inclination of the bottom surface of the cultivation container 50 can be acquired based on the positional information acquired at the same time.

Figure 32:
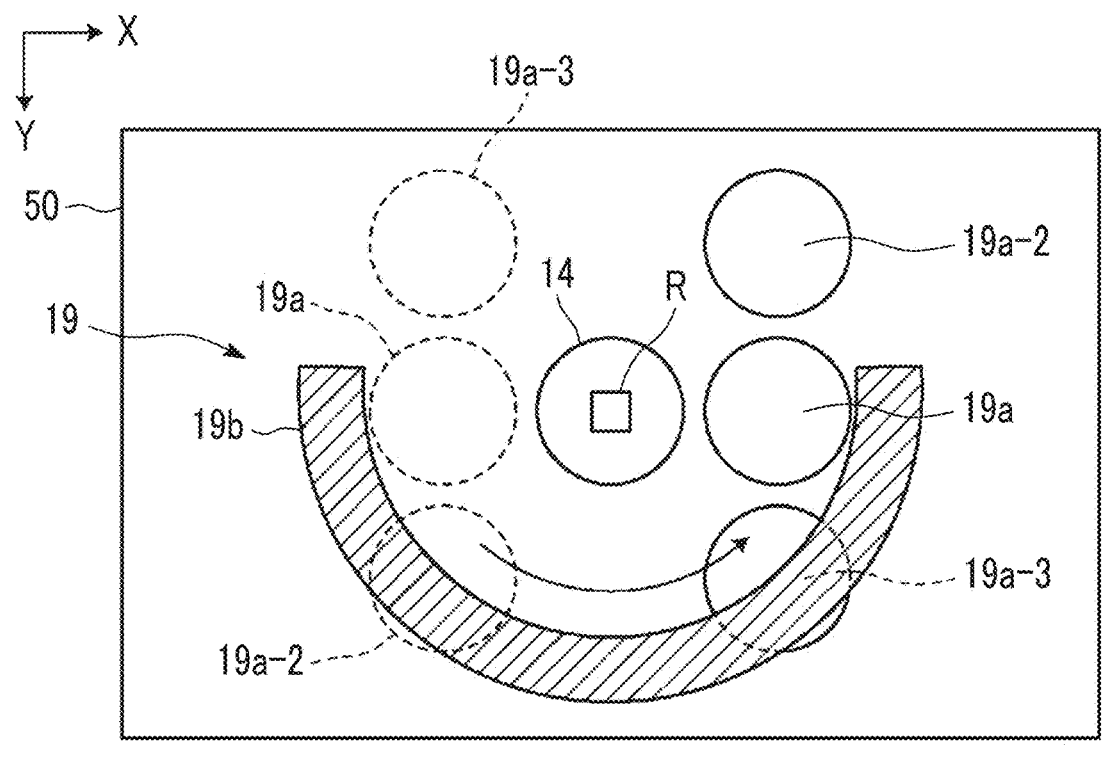
FIG. 32 is a diagram illustrating one example of a configuration of a detection unit of the microscope apparatus according to the third and sixth embodiments.

In the microscope apparatuses of the third and sixth embodiments, the detection unit 19 includes one displacement sensor 19a and switches the position of the displacement sensor in accordance with a change in movement direction of the observation region R. The detection unit 19 comprises the displacement sensor 19a and the guide mechanism 19b that moves the position of the displacement sensor 19a by guiding the displacement sensor 19a. Furthermore, as illustrated in FIG. 32, a second displacement sensor 19a-2 and a third displacement sensor 19a-3 may be linearly disposed in the Y direction with the observation region R interposed therebetween in a case where the displacement sensor 19a is positioned adjacent to the right side of the observation region R. The guide mechanism 19b moves the displacement sensor 19a and also the second displacement sensor 19a-2 and the third displacement sensor 19a-3 along the guide member. The guide member moves the displacement sensor 19a, the second displacement sensor 19a-2, and the third displacement sensor 19a-3 from one side to the other side of the X direction with the imaging optical system 14 interposed therebetween. In this case, the control unit 22 causes the displacement sensor 19a and the second and third displacement sensors 19a-2 and 19a-3 to perform detection at the same time.

Accordingly, in a case where the observation region R reciprocates, the acquisition unit 23A can acquire a plurality of pieces of Z direction positional information of the bottom surface of the cultivation container 50 in the Y direction. Thus, the Y direction inclination of the bottom surface of the cultivation container 50 can be acquired based on the positional information acquired at the same time.

Figure 33:
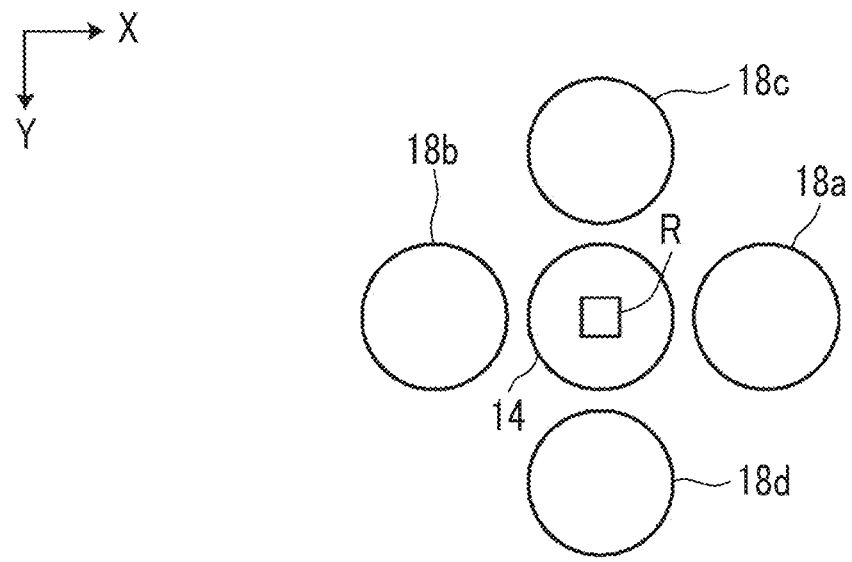
FIG. 33 is a diagram illustrating one example of a modification example of the configuration of the detection unit of the microscope apparatus according to the first embodiment.

In the microscope apparatuses of the first, second, fourth, fifth, seventh, and eighth embodiments, the first displacement sensor 18a and the second displacement sensor 18b are linearly disposed in the X direction with the phase difference lens 14a interposed therebetween. Furthermore, as illustrated in FIG. 33, a third displacement sensor 18c and a fourth displacement sensor 18d may be linearly disposed in the Y direction with the phase difference lens 14a interposed therebetween.

Figure 34:
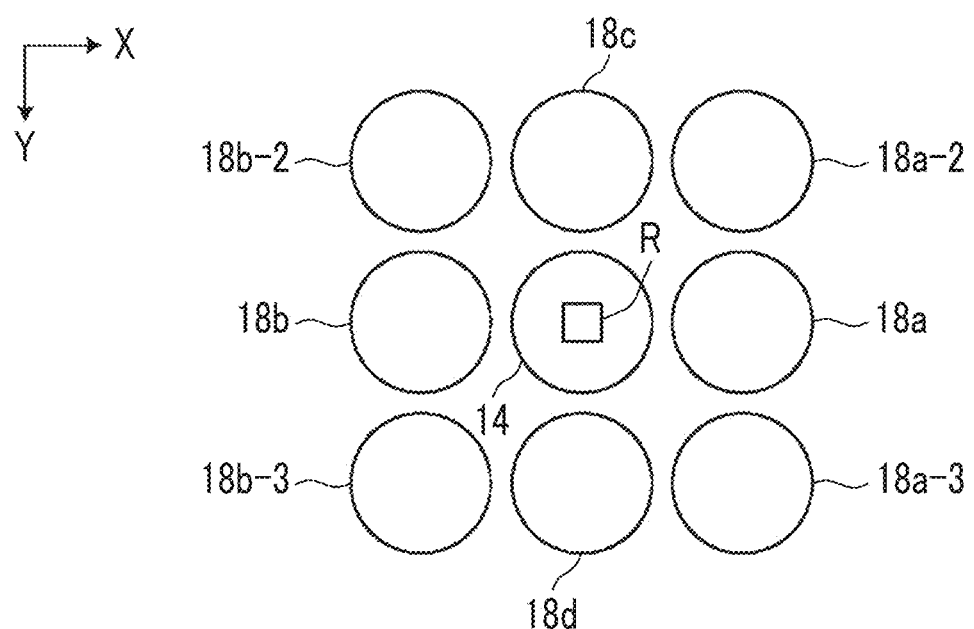
FIG. 34 is a diagram illustrating one example of another modification example of the configuration of the detection unit of the microscope apparatus according to the first embodiment.

Furthermore, as illustrated in FIG. 34, the fifth displacement sensor 18a-2 and the sixth displacement sensor 18a-3 may be linearly disposed in the Y direction with the first displacement sensor 18a interposed therebetween, and the seventh displacement sensor 18b-2 and the eighth displacement sensor 18b-3 may be linearly disposed in the Y direction with the second displacement sensor 18b interposed therebetween.

Figure 35:
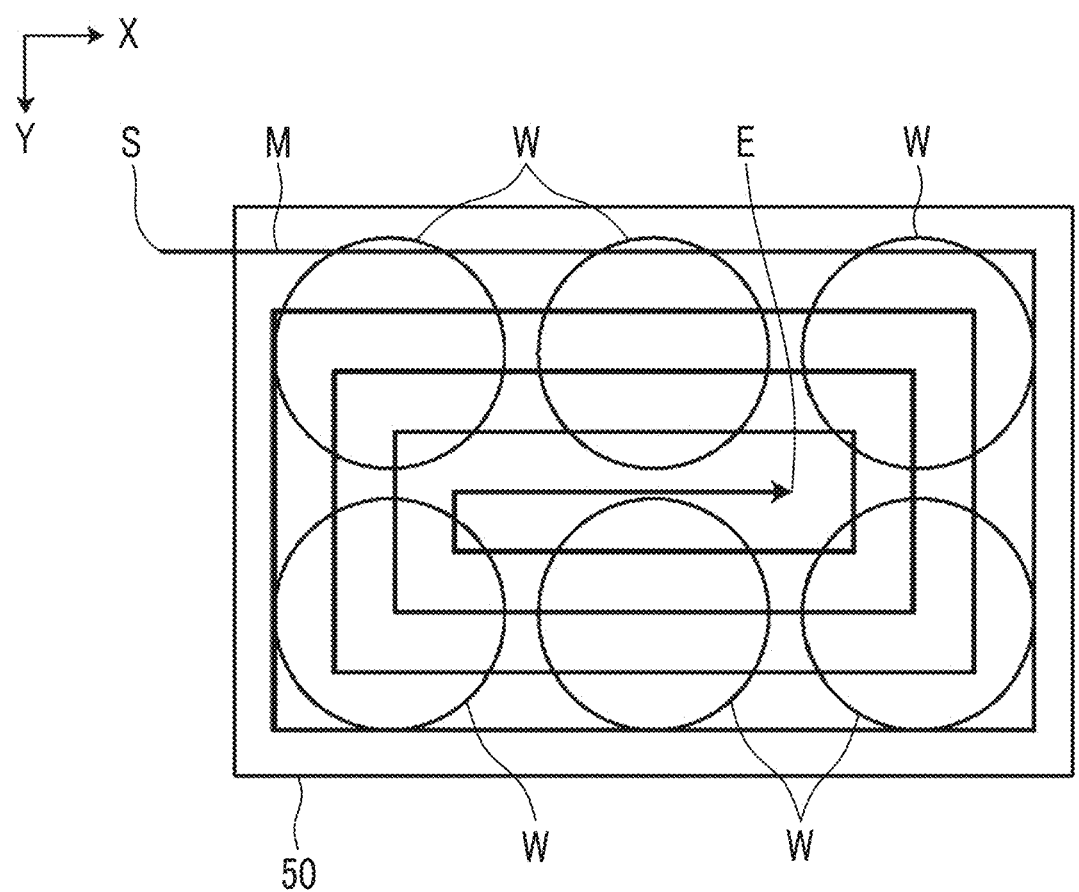
FIG. 35 is a diagram illustrating another example of the scanning position of the observation region in the cultivation container of the microscope apparatus according to the first embodiment.

Accordingly, the observation region R not only reciprocates but also can be moved in a spiral shape as illustrated in FIG. 35. That is, in FIG. 35, the observation region R is moved in the positive direction of the X direction (rightward direction in FIG. 35) from the scanning start point S and then, is moved in the positive direction of the Y direction (downward direction in FIG. 35). Next, the observation region R is moved in the negative direction of the X direction (leftward direction in FIG. 35) and is further moved in the negative direction of the Y direction (upward direction in FIG. 35). By repeating movement of the observation region R in the X direction and the Y direction, the inside of the cultivation container 50 can be scanned in two dimensions.

In the case of using the configuration illustrated in FIG. 34, in a case where the control unit 22 moves the observation region R in the positive direction of the X direction (rightward direction in FIG. 35) from the scanning start point S in FIG. 35, the control unit 22 causes the first, fifth, and sixth displacement sensors 18a, 18a-2, and 18a-3 to perform detection at the same time. In a case where the control unit 22 moves the observation region R in the negative direction of the X direction (leftward direction in FIG. 35) in FIG. 35, the control unit 22 causes the fourth, sixth, and eighth displacement sensors 18d, 18a-3, and 18b-3 to perform detection at the same time. In a case where the control unit 22 moves the observation region R in the positive direction of the Y direction (downward direction in FIG. 35) in FIG. 35, the control unit 22 causes the second, seventh, and eighth displacement sensors 18b, 18b-2, and 18b-3 to perform detection at the same time. In a case where the control unit 22 moves the observation region R in the negative direction of the Y direction (upward direction in FIG. 35) in FIG. 35, the control unit 22 causes the third, fifth, and seventh displacement sensors 18c, 18a-2, and 18b-2 to perform detection at the same time.

Accordingly, in a case where the observation region R is moved in a spiral shape as illustrated in FIG. 35, the acquisition unit 23A can acquire a plurality of pieces of Z direction positional information of the bottom surface of the cultivation container 50 in a direction orthogonal to the traveling direction of the observation region R.

Figure 36:
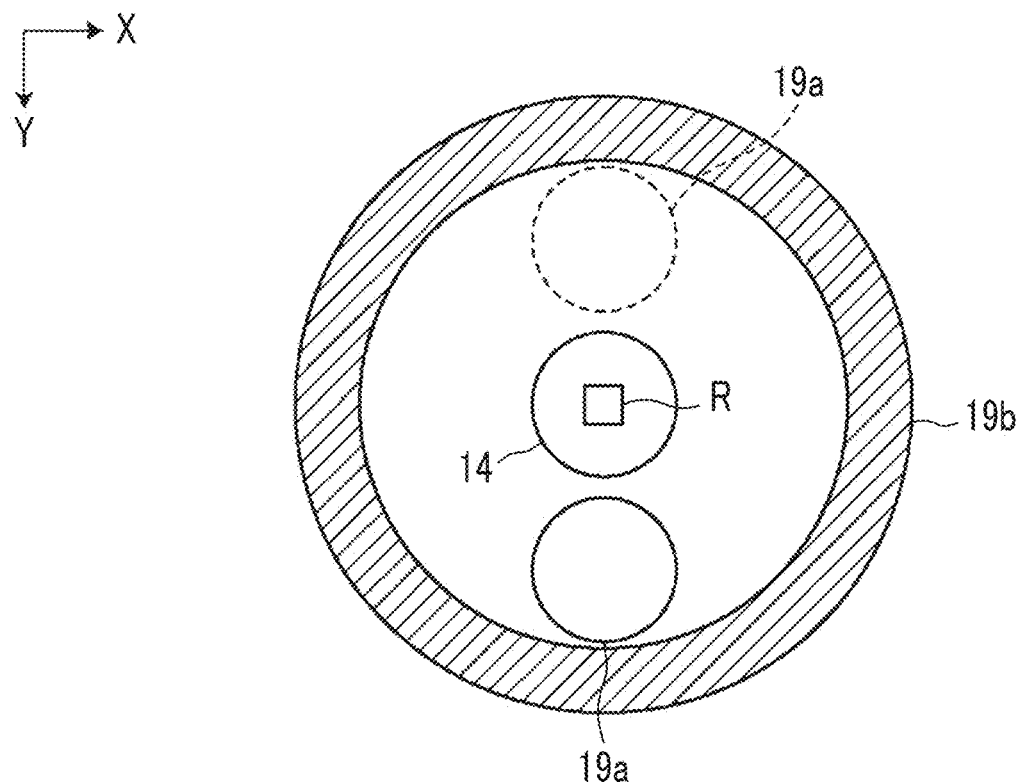
FIG. 36 is a diagram illustrating one example of a modification example of the configuration of the detection unit of the microscope apparatus according to the third embodiment.

In addition, as illustrated in FIG. 36, the guide mechanism 19b of the detection unit 19 in the third embodiment may be formed in a circular shape, and the displacement sensor 19a may be moved along the guide mechanism 19b having a circular shape. Accordingly, in the third embodiment, the control unit 22 can move the observation region R in two dimensions as illustrated in FIG. 35. In this case, in a case where the observation region R is moved in the positive direction of the X direction, the displacement sensor 19a is moved to the position illustrated in FIG. 23. In a case where the observation region R is moved in the positive direction of the Y direction, the displacement sensor 19a is moved to a position illustrated by a solid line in FIG. 36. In addition, in a case where the observation region R is moved in the negative direction of the X direction, the displacement sensor 19a is moved to the position illustrated in FIG. 24. In a case where the observation region R is moved in the negative direction of the Y direction, the displacement sensor 19a is moved to a position illustrated by a broken line in FIG. 36.

Figure 37:
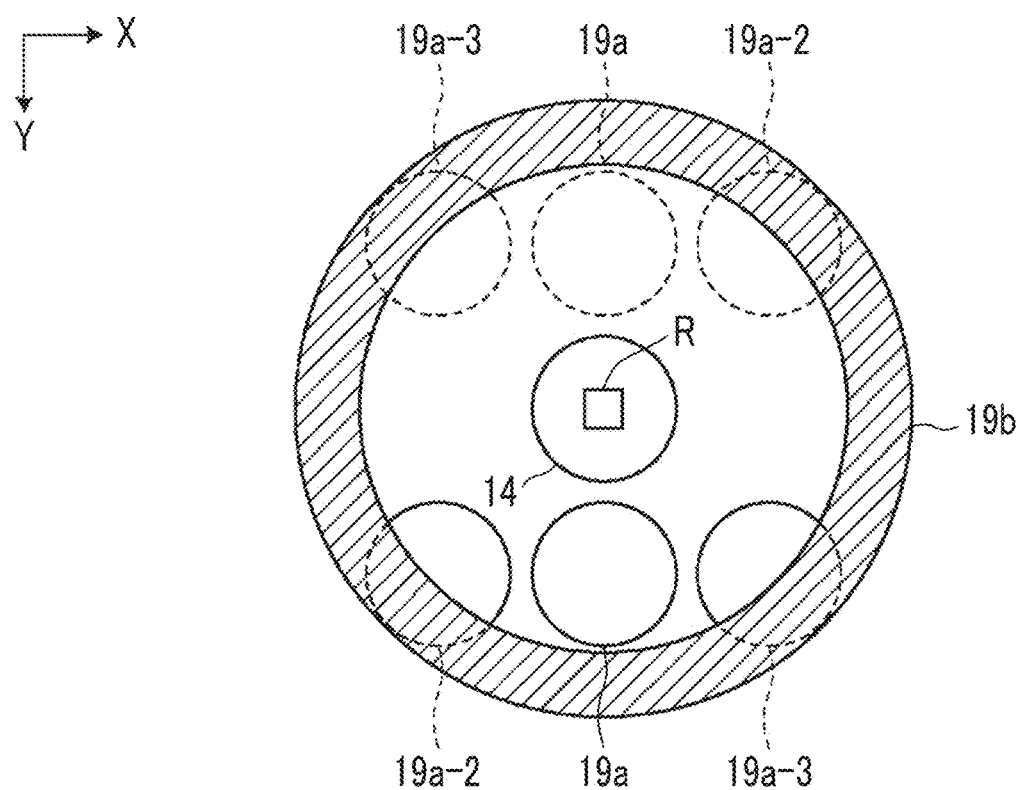
FIG. 37 is a diagram illustrating one example of another modification example of the configuration of the detection unit of the microscope apparatus according to the third embodiment.

In addition, in the configuration illustrated in FIG. 36, furthermore, as illustrated in FIG. 37, the second displacement sensor 19a-2 and the third displacement sensor 19a-3 may be linearly disposed in the X direction with the observation region R interposed therebetween in the guide mechanism 19b in a case where the displacement sensor 19a is positioned adjacent to the lower side of the observation region R.

Accordingly, in a case where the observation region R is moved in a spiral shape as illustrated in FIG. 35, the acquisition unit 23A can acquire a plurality of pieces of Z direction positional information of the bottom surface of the cultivation container 50 in a direction orthogonal to the traveling direction of the observation region R.

In each of the embodiments, the acquisition unit 23A acquires the Z direction positional information of the bottom surface of the cultivation container 50 detected by the detection unit 18. However, the technology of the present disclosure is not limited thereto. The acquisition unit 23A may acquire the Z direction positional information of the bottom surface of the cultivation container 50 in advance. Here, "in advance" means before the control unit 22 starts scanning the cultivation container 50 based on the observation region R.

Ninth Embodiment

In a ninth embodiment, the acquisition unit 23A acquires the Z direction positional information of the bottom surface of the cultivation container 50 in advance. In the ninth embodiment, the configuration of any of the first to eighth embodiments can be used, and a description of the configuration will not be repeated.

In the cultivation container 50 used in microscope observation, the cultivation container 50 is generally of a disposable type, and the manufacturing accuracy of the cultivation container 50 is not very high. Bending and/or distortion or the like (roughness) formed on the bottom surface of the cultivation container 50 varies depending on the type of cultivation container 50 such as a difference in manufacturing maker, and the range of manufacturing error may also vary.

Therefore, the Z direction positional information of the bottom surface of the cultivation container 50 is stored in the secondary storage unit 25B as the positional information 27. Specifically, the positional information of the bottom surface of the cultivation container 50 may be measured by the detection unit 18 disposed in the microscope apparatus 1 by installing the cultivation container 50 on the stage 51, or a table in which identification information of the cultivation container 50 is associated with premeasured positional information may be stored in the secondary storage unit 25B. The user may input setting of the identification information of the cultivation container 50 using the input device 40, and the positional information of the cultivation container 50 having the identification information may be read out from the secondary storage unit 25B.

In addition, setting of the identification information of the cultivation container 50 may not be input by the user. The identification information may be acquired by assigning a barcode and/or a Quick Response (QR) code (registered trademark) or the like to the cultivation container 50 and reading out the barcode and/or the QR code (registered trademark). For example, the identification information of the cultivation container 50 may be a model number of the manufacturing maker or a manufacturing number. The acquisition unit 23A may acquire the premeasured positional information from the identification information of the cultivation container 50 without necessarily storing the table in the secondary storage unit 25B.

In addition, for example, the positional information of the bottom surface of the cultivation container 50 may be measured in advance using a separate laser displacement meter from the detection unit 18. A method of measuring the positional information of the bottom surface of the cultivation container 50 is not limited to measurement by the laser displacement meter. Measurement may be performed using other methods such as a confocal method and a spectral interference method.

Figure 38:
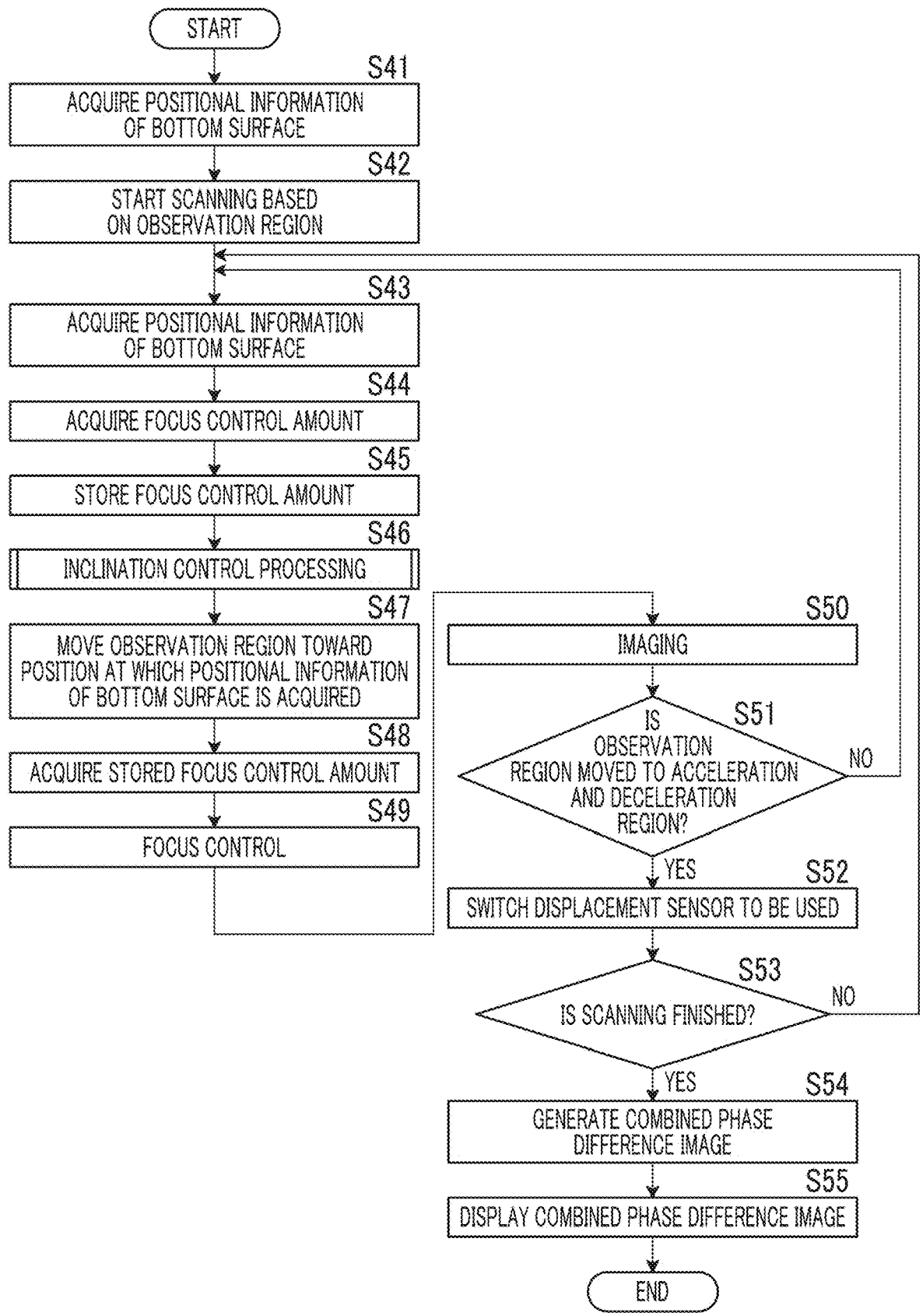
FIG. 38 is a flowchart illustrating one example of inclination control processing of a microscope apparatus according to a ninth embodiment.

An effect of a part of the microscope apparatus according to the embodiment of the technology of the present disclosure in a case where preacquired positional information is used will be described. Processing of steps S42 to S55 in FIG. 38 is approximately the same processing as the processing of steps S1 to S14 in FIG. 8. Thus, only different parts will be described.

For example, as illustrated in FIG. 38, in step S41, the acquisition unit 23A acquires the positional information of the bottom surface of the cultivation container 50 in advance as described above. The positional information acquired in step S41 is sued in the inclination control processing performed by the control unit 22 in step S46. That is, the positional information is used in the processing of step S21 illustrated in FIG. 12. The inclination control processing performed by the control unit 22 in step S46 may be performed between the processing of step S41 and processing of step S42.

By causing the acquisition unit 23A to acquire the positional information in advance, the Z direction positional information of the bottom surface of the cultivation container 50 can be acquired at a desired resolution. In addition, in the microscope apparatus, processing of acquiring the inclination of the bottom surface can also be performed in advance. Thus, a time required for the processing of acquiring the inclination of the bottom surface and/or processing performed by the CPU 21 can be reduced.

In each of the embodiments, the observation region R is moved by moving the stage 51. However, the technology of the present disclosure is not limited thereto. Scanning of the cultivation container 50 based on the observation region R may be performed by fixing the stage 51 and moving the observation region R by moving the imaging optical system 14 and other configurations related to capturing of the phase difference image. Alternatively, scanning based on the observation region R may be performed by moving both of the stage 51 and the imaging optical system 14 and other configurations related to capturing of the phase difference image.

While the present invention is applied to a phase difference microscope in each of the embodiments, the present invention is not limited to the phase difference microscope and may be applied to other microscopes such as a differential interference microscope and a bright-field microscope.

While the phase difference image formed by the imaging optical system 14 is captured by the imaging unit 16 in each of the embodiments, an observation optical system or the like may be disposed such that the user can directly observe the phase difference image of the observation target formed by the imaging optical system 14 without disposing the imaging element.

Figure 39:
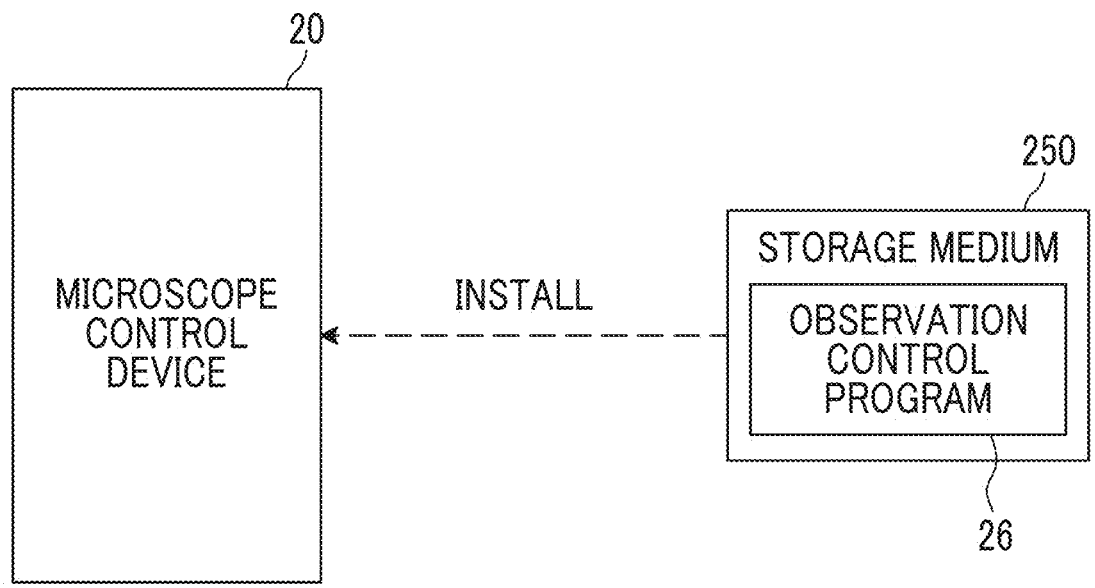
FIG. 39 is a conceptual diagram illustrating one example of an aspect in which an observation control program according to the first to ninth embodiments is installed on a microscope control device from a storage medium on which the observation control program is stored.
Figure 40:
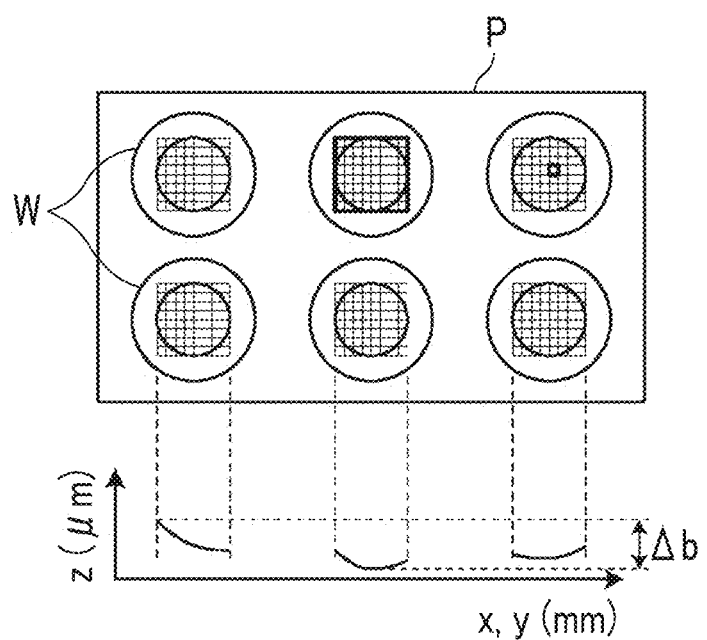
FIG. 40 is a schematic diagram illustrating a shape of a cultivation container in the related art.
Figure 41:
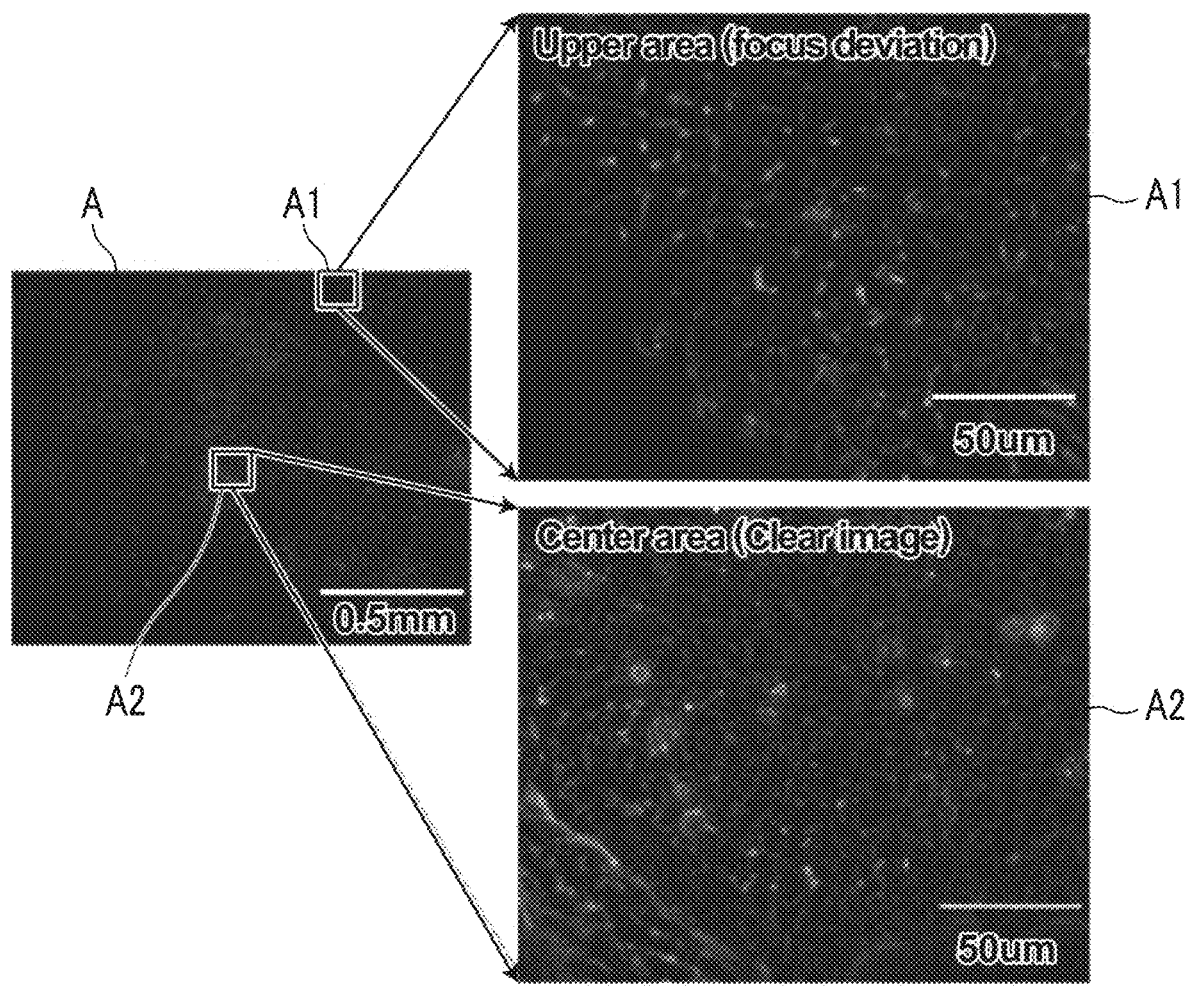
FIG. 41 is a diagram for describing a change in focal position in an observation region in a microscope apparatus in the related art.
Figure 42:
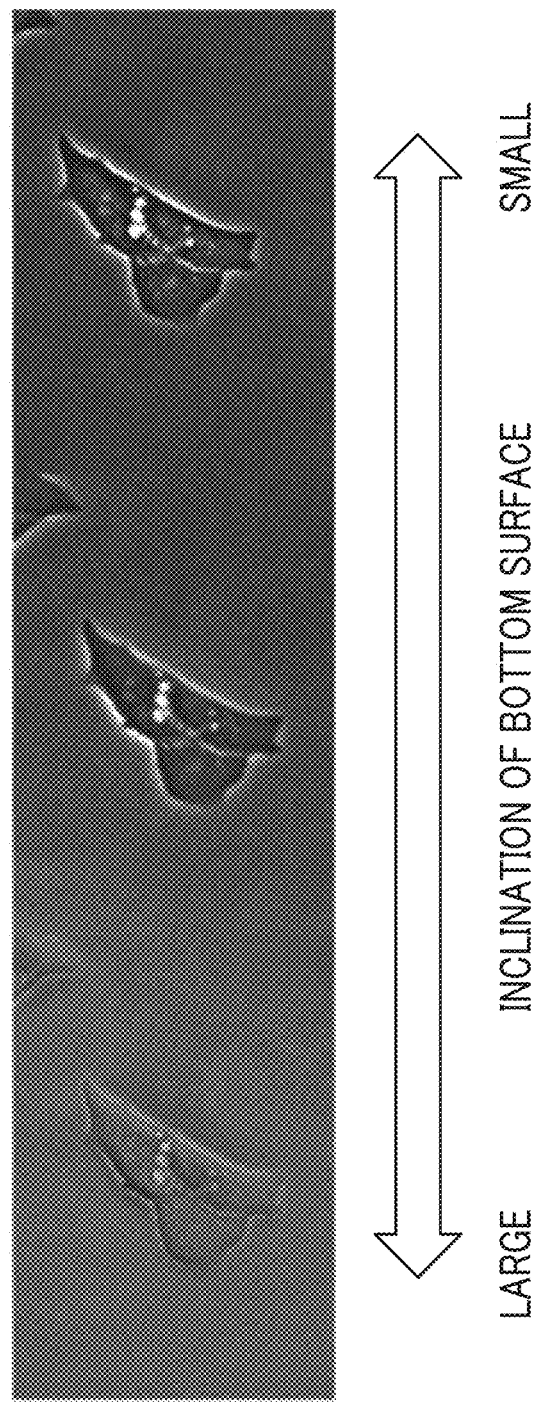
FIG. 42 is a diagram for describing a problem in the microscope apparatus in the related art.

While a case where the observation control program 26 is read out from the secondary storage unit 25B is illustrated in each of the embodiments, it is not necessary to initially store the observation control program 26 in the secondary storage unit 25B. For example, as illustrated in FIG. 39, first, the observation control program 26 may be stored in a storage medium 250 of any portable type such as an SSD, a USB memory, or a DVD-ROM. In this case, the observation control program 26 of the storage medium 250 is installed on the microscope control device 20, and the installed observation control program 26 is executed by the CPU 21.

The observation control program 26 may be stored in a storage unit of another computer, a server apparatus, or the like connected to the microscope control device 20 through a communication network (not illustrated), and the observation control program 26 may be downloaded in response to a request from the microscope control device 20. In this case, the downloaded observation control program 26 is executed by the CPU 21.

Observation control processing described in each of the embodiment is merely one example. Accordingly, without departing from the gist of the observation control processing, unnecessary steps may be removed, new steps may be added, or a processing order may be changed.

While a case where the observation control processing is implemented by a software configuration using a computer is illustrated in each of the embodiments, the technology of the present disclosure is not limited thereto. For example, instead of the software configuration using the computer, the observation control processing may be executed by only a hardware configuration such as an FPGA or an ASIC. The observation control processing may be executed by a configuration of a combination of the software configuration and the hardware configuration.

As a hardware resource executing the observation control processing described in each of the embodiments, various processors illustrated below can be used. For example, as described above, a CPU that is a general-purpose processor functioning as a hardware resource executing the observation control processing by executing software, that is, the program, is exemplified as the processor. In addition, for example, a dedicated electric circuit that is a processor such as an FPGA, a PLD, or an ASIC having a circuit configuration dedicatedly designed to execute specific processing is exemplified as the processor.

The hardware resource executing the observation control processing may be configured with one of the various processors or may be configured with a combination of processors of the same type or different types (for example, a combination of a plurality of FPGAs or a combination of a CPU and an FPGA). Alternatively, the hardware resource executing the observation control processing according to the embodiment of the technology of the present disclosure may be one processor.

As an example of a configuration as one processor, first, as represented by a computer such as a client and a server, an aspect in which one processor is configured by a combination of one or more CPUs and software and this processor functions as the hardware resource executing the observation control processing is available. Second, as represented by a system-on-a-chip (SoC) or the like, an aspect of using a processor that implements the function of the entire system including a plurality of hardware resources executing the observation control processing by one IC chip is available. Accordingly, the observation control processing is implemented using one or more of the various processors as the hardware resource.

Furthermore, as a hardware structure of the various processors, more specifically, an electric circuit into which circuit elements such as semiconductor elements are combined can be used.

An effect of the present embodiment is shown below.

By matching the inclination of the image plane S2 to the inclination of the imaging surface 16A, blurriness of the image of the edge part portion in the observation region of the imaging optical system can be reduced even in a case where the bottom surface of the cultivation container is inclined.

By performing the inclination control for adjusting the inclination of the image plane S2 or the inclination of the imaging surface 16A by the plurality of operation units, the range of the adjustable inclination can be increased compared to the range in a case where the inclination control is performed by only one operation unit.

By performing the auto focus control by the plurality of operation units, the auto focus control can be performed at a higher speed than the auto focus control in a case where the auto focus control is performed by only one operation unit.

The following appendices are further disclosed with respect to the above embodiments.

(Appendix 1)

An observation apparatus including a processor, an imaging optical system, and a focus adjustment unit,
in which the processor acquires positional information indicating a position of a bottom surface of a support for supporting an observation target,
the imaging optical system forms an optical image showing the observation target supported by the support on an image plane,
based on the positional information acquired by the processor, the focus adjustment unit
adjusts a focal position of the imaging optical system, and
the processor performs control for matching an inclination of the image plane on which the optical image is formed to an inclination of an imaging surface of an imaging element based on the acquired positional information.

(Appendix 2)

The observation apparatus according to Appendix 1, in which the processor is an electric circuit.

In the present specification, "A and/or B" has the same meaning as "at least one of A or B". That is, it is meant that "A and/or B" may be only A, may be only B, or may be a combination of A and B. In addition, in the present specification, the same manner of consideration as "A and/or B" is applied to a case where three or more matters are represented by connecting the matters with "and/or".

The present application claims the benefit of priority of the Japanese application of JP2017-225104 filed on Nov. 22, 2017, and the entire contents of this application is incorporated in the present specification by reference. In addition, all literatures, patent applications, and technical standards disclosed in the present specification are incorporated in the present specification by reference to the same extent as in a case where each of the literatures, patent applications, and technical standards is specifically and individually indicated to be incorporated by reference.

What is claimed is:

1. An observation apparatus comprising:
an acquisition unit that acquires positional information indicating a position of a bottom surface of a support for supporting an observation target;
an imaging optical system that forms an optical image showing the observation target supported by the support on an image plane;
a focus adjustment unit that adjusts a focal position of the imaging optical system based on the positional information acquired by the acquisition unit; and
a control unit that performs control for matching an inclination of the image plane on which the optical image is formed to an inclination of an imaging surface of an imaging element based on the positional information acquired by the acquisition unit,
wherein the imaging optical system further includes a ray deflection optical system that deflects a ray by a plurality of wedge prisms in an optical axis direction of the imaging optical system,
the control unit performs fourth control for deflecting the ray by controlling a rotation mechanism that independently rotates the plurality of wedge prisms about an optical axis,
the plurality of wedge prisms include a first wedge prism, a second wedge prism, and a third wedge prism, and
the control unit performs first correction control for correcting an overall inclination of the image plane on the first wedge prism and performs second correction control for correcting a partially changing inclination of the image plane on the second wedge prism and the third wedge prism.

2. The observation apparatus according to claim 1,
wherein the control unit further performs at least one of types of control among first control for performing control for adjusting an inclination of the support, second control for performing control for adjusting a motion of at least one lens included in the imaging optical system, and third control for performing control for adjusting the inclination of the imaging surface.

3. The observation apparatus according to claim 1,
wherein in a case where the inclination of the image plane is less than a predetermined threshold value, the control unit performs control for prohibiting matching control for matching the inclination of the image plane to the inclination of the imaging surface.

4. A non-transitory computer-readable storage medium storing an observation control program causing a computer to function as:

the acquisition unit, the focus adjustment unit, and the control unit included in the observation apparatus according to claim 1.

5. A method of operating an observation apparatus, the method comprising:

acquiring positional information indicating a position of a bottom surface of a support for supporting an observation target by an acquisition unit;

forming an optical image showing the observation target supported by the support on an image plane by an imaging optical system;

adjusting a focal position of the imaging optical system by a focus adjustment unit based on the positional information acquired by the acquisition unit;

performing control for matching an inclination of the image plane on which the optical image is formed to an inclination of an imaging surface of an imaging element by a control unit based on the positional information acquired by the acquisition unit, wherein the imaging optical system further includes a ray deflection optical system that deflects a ray by a plurality of wedge prisms in an optical axis direction of the imaging optical system, performing control for deflecting the ray by controlling a rotation mechanism that independently rotates the plurality of wedge prisms about an optical axis by the control unit, the plurality of wedge prisms including a first wedge prism, a second wedge prism, and a third wedge prism, and performing first correction control for correcting an overall inclination of the image plane on the first wedge prism and performing second correction control for correcting a partially changing inclination of the image plane on the second wedge prism and the third wedge prism.

* * * * *